US012720188B2

(12) United States Patent
Yi et al.

(10) Patent No.: US 12,720,188 B2
(45) Date of Patent: Aug. 25, 2026

(54) PHOTOGRAPHING METHOD AND ELECTRONIC DEVICE

(71) Applicant: Honor Device Co., Ltd., Shenzhen (CN)

(72) Inventors: Jie Yi, Shenzhen (CN); Yufei Huang, Shenzhen (CN); Mian Xiong, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 230 days.

(21) Appl. No.: 18/265,078

(22) PCT Filed: May 25, 2022

(86) PCT No.: PCT/CN2022/095032
§ 371 (c)(1),
(2) Date: Jun. 2, 2023

(87) PCT Pub. No.: WO2022/262540
PCT Pub. Date: Dec. 22, 2022

(65) Prior Publication Data

US 2024/0007736 A1 Jan. 4, 2024

(30) Foreign Application Priority Data

Jun. 16, 2021 (CN) ......................... 202110676709.3
Nov. 29, 2021 (CN) ......................... 202111437910.2
Dec. 31, 2021 (CN) ......................... 202111676237.8

(51) Int. Cl.
*H04N 23/63* (2023.01)
*G06F 3/01* (2006.01)
(Continued)

(52) U.S. Cl.
CPC ........... *H04N 23/632* (2023.01); *G06F 3/017* (2013.01); *G06V 40/113* (2022.01);
(Continued)

(58) Field of Classification Search
CPC .. H04N 23/632; H04N 5/2624; H04N 5/2628; H04N 23/53; H04N 5/772;
(Continued)

(56) References Cited

U.S. PATENT DOCUMENTS 9,549,126 B2 * 1/2017 Lee ........................ H04N 23/69
10,852,839 B1 12/2020 Ravasz et al.
(Continued)

FOREIGN PATENT DOCUMENTS

CN 106791446 A 5/2017
CN 107045390 A 8/2017
(Continued)

OTHER PUBLICATIONS

Chen, Qiang, "Image dynamic gesture recognition system based on ARM9," Electronics World, 2 pages (with English abstract) (Jun. 23, 2016).

*Primary Examiner* — Timothy J Henn
(74) *Attorney, Agent, or Firm* — Leydig, Voit & Mayer, Ltd.

(57) ABSTRACT

This application provides a photographing method and an electronic device. The electronic device can display a photographing preview interface, where the photographing preview interface includes a first image collected by a first camera and a second image collected by a second camera. If the first camera detects a first gesture, the electronic device displays a first identifier; and if the first camera detects a second gesture within a preset time after the first identifier is displayed, the electronic device continues to display the first image in the photographing preview interface, and stops displaying the second image.

17 Claims, 47 Drawing Sheets

(51) Int. Cl.

| | |
|---|---|
| ***G06V 40/10*** | (2022.01) |
| ***H04N 5/262*** | (2006.01) |
| ***H04N 23/53*** | (2023.01) |
| ***H04N 23/611*** | (2023.01) |

(52) U.S. Cl.
CPC ........... *H04N 5/2624* (2013.01); *H04N 23/53* (2023.01); *H04N 23/611* (2023.01); *H04N 23/63* (2023.01)

(58) Field of Classification Search
CPC ...... H04N 23/611; H04N 23/62; H04N 23/63; H04N 23/631; H04N 23/667; H04N 23/90; H04N 5/91; H04N 23/633; G06V 40/113; G06V 40/20; G06F 3/017; G06F 3/04817; G06F 3/0482
See application file for complete search history.

(56) References Cited

U.S. PATENT DOCUMENTS

| | | | | |
|---|---|---|---|---|
| 2014/0013417 | A1* | 1/2014 | Sakai | G06F 3/017 726/16 |
| 2014/0192232 | A1* | 7/2014 | Park | H04N 5/76 348/231.99 |
| 2014/0192245 | A1 | 7/2014 | Lee et al. | |
| 2014/0204666 | A1* | 7/2014 | Jurasek | G11C 13/0004 365/163 |
| 2015/0229837 | A1 | 8/2015 | Her et al. | |
| 2015/0346831 | A1* | 12/2015 | Nii | G11B 27/00 345/173 |
| 2018/0039387 | A1* | 2/2018 | Cheong | G06F 1/3287 |
| 2018/0063434 | A1* | 3/2018 | Seol | G06V 40/197 |
| 2019/0155561 | A1 | 5/2019 | Reeves et al. | |
| 2021/0392255 | A1* | 12/2021 | Zhu | H04N 23/63 |
| 2022/0113808 | A1* | 4/2022 | Zhao | G06F 3/0484 |
| 2022/0159183 | A1* | 5/2022 | Li | H04N 23/635 |
| 2022/0264053 | A1* | 8/2022 | Wang | H04N 5/268 |
| 2022/0269351 | A1 | 8/2022 | Wu et al. | |
| 2022/0394190 | A1 | 12/2022 | Cui et al. | |
| 2023/0109787 | A1* | 4/2023 | O'Leary | H04L 12/1822 348/14.09 |
| 2023/0156144 | A1* | 5/2023 | Cui | H04N 23/683 386/248 |

FOREIGN PATENT DOCUMENTS

| | | | | |
|---|---|---|---|---|
| CN | 107395969 | A | 11/2017 | |
| CN | 110072070 | A | 7/2019 | |
| CN | 110784735 | A | 2/2020 | |
| CN | 111010506 | A | 4/2020 | |
| CN | 111614891 | A | 9/2020 | |
| CN | 111726553 | A | 9/2020 | |
| CN | 112394811 | A | 2/2021 | |
| CN | 112702517 | A | 4/2021 | |
| CN | 112738402 | A | 4/2021 | |
| CN | 112954218 | A | 6/2021 | |
| GB | 2594081 | A | 10/2021 | |
| JP | 2020115361 | A | 7/2020 | |
| WO | WO-2020186969 | A1 * | 9/2020 | H04N 23/45 |
| WO | 2020258953 | A1 | 12/2020 | |
| WO | 2021052139 | A1 | 3/2021 | |

* cited by examiner

Face a display screen and turn the palm over

Face a display screen and move the palm from left to right

PHOTOGRAPHING METHOD AND ELECTRONIC DEVICE

CROSS-REFERENCE TO RELATED APPLICATIONS

This application is a national stage of International Application No. PCT/CN2022/095032, filed on May 25, 2022, which claims priority to Chinese Patent Application No. 202110676709.3, filed on Jun. 16, 2021, Chinese Patent Application No. 202111437910.2, filed on Nov. 29, 2021, and Chinese Patent Application No. 202111676237.8, filed on Dec. 31, 2021. The disclosures of each of the aforementioned applications are hereby incorporated by reference in their entireties.

TECHNICAL FIELD

This application relates to the field of terminal technologies, and in particular, to a photographing method and an electronic device.

BACKGROUND

With the development of electronic technologies, electronic devices such as a mobile phone and a tablet computer are generally provided with a plurality of cameras such as a front-facing camera, a rear-facing camera, and a wide-angle camera. To provide further photographing creation experience, increasingly more electronic devices may support simultaneous photographing of a plurality of cameras, to record beautiful pictures such as a brilliant moment and a moving scene.

In a video creation process, a user often switches a camera. However, at present, the user cannot conveniently switch the camera, and a framing picture of a video is easily broken in a process of switching the camera.

SUMMARY

Embodiments of this application provide a photographing method and an electronic device, so that a gesture of a user can be identified by using a front-facing camera, and a photographing mode can be switched based on the identified gesture.

To achieve the foregoing objective, the following technical solutions are used in the embodiments of this application.

According to a first aspect, an embodiment of this application provides a photographing method. The method is applied to electronic devices including a display screen, a first camera, and a second camera, the first camera and the second camera are located on different sides of the display screen, the first camera and the display screen are located on a same side of the electronic device, and the method includes: The electronic device displays a photographing preview interface, where a first region of the photographing preview interface displays a first image collected by the first camera in real time, and a second region of the photographing preview interface displays a second image collected by the second camera in real time; in response to that the first camera detects a first gesture, the electronic device displays a first identifier in the photographing preview interface; and if the first camera detects a second gesture within a preset time after the first identifier is displayed, the electronic device continues to display the first image in the photographing preview interface, and stops displaying the second image.

It can be learned that the electronic device can detect a gesture (such as the first gesture and the second gesture) of a user by using the first camera, so that the user switches a photographing mode of the electronic device from a front-facing and rear-facing photographing mode to a front-facing photographing mode by using the gesture, the user does not need to touch the display screen in an entire process, and an operation of the user is more convenient. In addition, the electronic device can switch from the front-facing and rear-facing photographing mode to the front-facing photographing mode only after the first camera detects two gestures: the first gesture (such as a gesture of raising the hand) and the second gesture (such as a gesture of sliding the palm to left/right or a gesture of making a fist), so that a misoperation caused because another camera (such as the second camera) detects a gesture can be avoided, and a misoperation of the user photographed by the first camera can be avoided.

In an optional implementation, the method further includes: If the first camera does not detect a preset gesture, the electronic device stops displaying the first identifier after the preset time after the first identifier is displayed, where the preset gesture includes the first gesture and the second gesture. It can be learned that, if the electronic device does not detect the preset gesture (such as the first gesture and the second gesture) after the electronic device displays the first identifier, the electronic device may stop displaying the first identifier after the preset time (such as 3 seconds).

In an optional implementation, the method further includes: If the first camera detects a preset gesture within the preset time after the first identifier is displayed, the electronic device stops displaying the first identifier, where the preset gesture includes the first gesture and the second gesture. It can be learned that, if the electronic device detects the preset gesture (the first gesture and the second gesture) within the preset time after the electronic device displays the first identifier, the electronic device may stop displaying the first identifier after the preset time (such as 3 seconds).

In an optional implementation, that the electronic device displays a first identifier in the photographing preview interface includes: When displaying the first identifier in the photographing preview interface, the electronic device detects the preset gesture by using the first camera. That is, when the electronic device displays the first identifier, the first camera also synchronously collects image data.

In an optional implementation, the method further includes: In response to that the first camera detects the second gesture, the electronic device does not display the first identifier in the photographing preview interface, and does not stop displaying the second image in the photographing preview interface. That is, if the electronic device directly detects the second gesture when the electronic device does not detect the first gesture, the electronic device does not display the first identifier, and does not switch the photographing mode. In other words, the photographing mode of the electronic device can be switched only when a plurality of gestures (such as the first gesture and the second gesture) are used in combination.

In an optional implementation, that the electronic device continues to display the first image in the photographing preview interface includes: The electronic device continues to display the first image in a third region of the photographing preview interface, where the third region includes the first region and the second region, and the first region and the second region does not overlap.

It can be learned that, when the electronic device is in the front-facing and rear-facing photographing mode, the electronic device can be switched from the front-facing and rear-facing photographing mode to the front-facing photographing mode by using the second gesture (such as a gesture of sliding the palm to left/right).

In an optional implementation, the method further includes: If the first camera detects a third gesture within the preset time after the first identifier is displayed, the electronic device displays the first image in a fourth region of the photographing preview interface, and displays the second image in a fifth region of the photographing preview interface, where the fourth region is located in the fifth region, and the fifth region includes the first region and the second region.

It can be learned that, when the electronic device is in the front-facing and rear-facing photographing mode, the electronic device can be switched from the front-facing and rear-facing photographing mode to a picture-in-picture photographing mode after detecting the third gesture (such as a gesture of making a fist).

In an optional implementation, that the electronic device continues to display the first image in the photographing preview interface includes: The electronic device continues to display the first image in a third region of the photographing preview interface, where the second region is located above the first region, and the third region is the same as the first region.

It can be learned that, when the electronic device is in the picture-in-picture photographing mode, the electronic device can be switched from the picture-in-picture photographing mode to the front-facing photographing mode after detecting the second gesture (such as a gesture of making a fist).

In an optional implementation, the method further includes: If the first camera detects a fourth gesture within the preset time after the first identifier is displayed, the electronic device displays the first image in a fourth region of the photographing preview interface, and displays the second image in a fifth region of the photographing preview interface, where the fourth region and the fifth region does not overlap.

It can be learned that the electronic device is switched from the picture-in-picture photographing mode to the front-facing and rear-facing photographing mode after detecting the fourth gesture (such as a gesture of sliding the palm to left/right).

In an optional implementation, the method further includes: If the first camera detects a fifth gesture within the preset time after the first identifier is displayed, the electronic device switches the first image displayed in the first region to the second image, and switches the second image displayed in the second region to the first image.

It can be learned that, after detecting the fifth gesture (such as a gesture of turning the palm over), the electronic device can switch display positions of the first image and the second image in the picture-in-picture photographing mode or the front-facing and rear-facing photographing mode.

In an optional implementation, the method further includes: In response to that the first camera detects the first gesture again, the electronic device redisplays the first identifier in the photographing preview interface; and if the first camera detects a sixth gesture within a preset time after the first identifier is redisplayed, the electronic device redisplays the first image in the first region of the photographing preview interface, and redisplays the second image in the second region of the photographing preview interface.

It can be learned that, when the electronic device is in the front-facing photographing mode, the electronic device can be switched from the front-facing photographing mode to the front-facing and rear-facing photographing mode after detecting the sixth gesture (such as a gesture of sliding the palm to left/right).

In an optional implementation, the method further includes: In response to that the first camera detects the first gesture again, the electronic device redisplays the first identifier in the photographing preview interface; and if the first camera detects the fifth gesture within a preset time after the first identifier is redisplayed, the electronic device switches the first image displayed in the photographing preview interface to the second image.

It can be learned that, when the electronic device is in the front-facing photographing mode, the electronic device can be switched from the front-facing photographing mode to a rear-facing photographing mode after detecting the fifth gesture (such as a gesture of turning the palm over).

In an optional implementation, if the electronic device does not start recording a video, the method further includes: In response to that the first camera detects the first gesture again, the electronic device redisplays the first identifier in the photographing preview interface; and if the first camera detects a seventh gesture within the preset time after the first identifier is redisplayed, the electronic device starts recording a video. It can be learned that the electronic device also supports starting recording a video by using a mid-air gesture.

In an optional implementation, that the electronic device starts recording a video includes: The electronic device displays countdown in the photographing preview interface; and after the countdown ends, the electronic device starts recording a video. It can be understood that, before starting recording a video, the electronic device displays the countdown, so that the user prepares for photographing, and user experience can be improved.

In an optional implementation, if the electronic device is recording a video, the method further includes: In response to that the first camera detects the first gesture again, the electronic device redisplays the first identifier in the photographing preview interface; and if the first camera detects an eighth gesture within the preset time after the first identifier is redisplayed, the electronic device stops recording a video. It can be learned that the electronic device also supports stopping recording a video across the air.

In an optional implementation, the electronic device does not start recording a video or is recording a video.

According to a second aspect, an embodiment of this application provides an electronic device, including a display screen, a first camera, a second camera, and a processor, where the processor is coupled to a memory, the memory stores program instructions, and when the program instructions stored in the memory are executed by the processor, the electronic device implements the method in any one of the possible design manners of the first aspect.

According to a third aspect, a computer-readable storage medium is provided, including computer instructions, where when the computer instructions run on an electronic device, the electronic device performs the method in any one of the possible design manners of the first aspect.

According to a fourth aspect, this application provides a chip system, and the chip system includes one or more interface circuits and one or more processors. The interface circuit and the processor are interconnected by using a line.

The chip system may be applied to an electronic device that includes a communication module and a memory. The interface circuit is configured to: receive a signal from a memory of the electronic device, and send the received signal to the processor, where the signal includes computer instructions stored in the memory. When the processor executes the computer instructions, the electronic device may perform the method in any one of the possible design manners of the first aspect.

According to a fifth aspect, this application provides a computer program product. When the computer program product runs on a computer, the computer performs the method in any one of possible design manners of the first aspect.

DESCRIPTION OF EMBODIMENTS

Figure 1A:
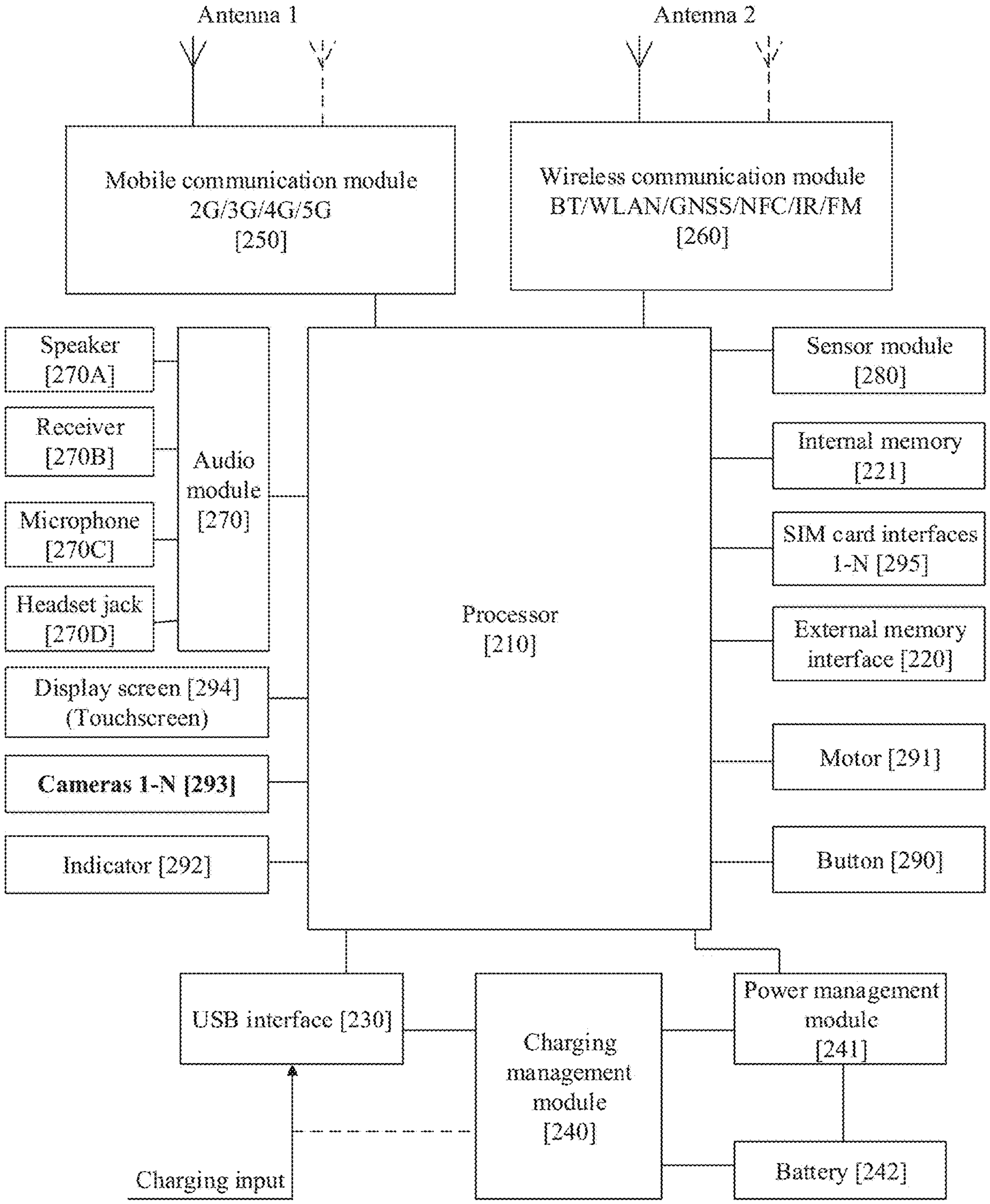
FIG. 1A is a diagram of a hardware architecture of an electronic device according to an embodiment of this application.

The following terms "first" and "second" are used only for description, and shall not be understood to indicate or imply relative importance or implicitly indicate a quantity of indicated technical features. Therefore, features defined with "first" and "second" may explicitly or implicitly include one or more of the features. In the description of the embodiments, unless otherwise stated, "a plurality of" means two or more than two.

To describe the following embodiments clearly and concisely and for ease of understanding by a person skilled in the art, related concepts or technologies are briefly described first.

A photographing preview interface is an interface displayed by an electronic device before or during photographing, and can be used to display an image collected by a camera in real time. In addition, the photographing preview interface may also display a plurality of controls, and the plurality of controls may include a flash light control used to turn on/off a flash light, a beauty control used to enable/disable a beauty function, a shutter control that may be used for photographing, and the like.

Single-lens photographing refers to a mode in which the electronic device performs photographing by using only one camera. In the single-lens photographing mode, the electronic device displays, in the photographing preview interface, only an image photographed by one camera. The single-lens photographing may include a front-facing photographing mode, a rear-facing photographing mode, and the like.

Specifically, front-facing photographing refers to a mode in which the electronic device performs photographing by using a front-facing camera. When the electronic device is in the front-facing photographing mode, the electronic device may display, in the photographing preview interface, an image collected by the front-facing camera in real time.

The rear-facing photographing mode is a mode in which the electronic device performs photographing by using a rear-facing camera. When the electronic device is in the rear-facing photographing mode, the electronic device may display, in the photographing preview interface, an image collected by the rear-facing camera in real time.

Multi-lens photographing refers to a mode in which the electronic device can perform photographing by using a plurality of cameras. When the electronic device is in the multi-lens photographing mode, the display screen simultaneously displays, in the photographing preview interface, images separately photographed by the plurality of cameras, and images photographed by different cameras may be displayed through splicing or picture-in-picture. Multi-lens photographing may include a front-facing and rear-facing photographing mode, a rear-facing and rear-facing photographing mode, a picture-in-picture photographing mode, and the like based on a type of a camera used by the electronic device and display manners of images photographed by different cameras. In the embodiments of this application, multi-lens photographing may also be referred to as multi-lens video recording.

The front-facing and rear-facing photographing mode is a mode in which the electronic device can perform photographing simultaneously by using the front-facing camera and the rear-facing camera. When the electronic device is in the front-facing and rear-facing photographing mode, the electronic device may simultaneously display, in the photographing preview interface, images (such as a first image and a second image) photographed by the front-facing camera and the rear-facing camera, and the first image and the second image are displayed through splicing. When the electronic device is vertically placed, the first image and the second image can be spliced up and down; or when the electronic device is horizontally placed, the first image and the second image can be spliced left and right. By default, a display area of the first image is consistent with a display area of the second image.

The rear-facing and rear-facing photographing mode is a mode in which the electronic device can perform photographing simultaneously by using two rear-facing cameras (if there are a plurality of rear-facing cameras). When the electronic device is in the rear-facing and rear-facing photographing mode, the electronic device may simultaneously display, in the photographing preview interface, images (such as a first image and a second image) photographed by the two rear-facing cameras, and the first image and the second image are displayed through splicing. When the electronic device is vertically placed, the first image and the second image can be spliced up and down; or when the electronic device is horizontally placed, the first image and the second image can be spliced left and right.

The picture-in-picture photographing mode is a mode in which the electronic device can perform photographing simultaneously by using two cameras. When the electronic device is in the picture-in-picture photographing mode, the electronic device may simultaneously display, in the photographing preview interface, images (such as a first image and a second image) photographed by the two cameras. The second image is displayed in an entire region of the photographing preview interface, the first image is superimposed on the second image, and a display area of the first image is smaller than a display area of the second image. By default, the first image may be located at the lower left of the second image. The foregoing two cameras may be freely combined, for example, may be two front-facing cameras, two rear-facing cameras, or one front-facing camera and one rear-facing camera.

It should be noted that the foregoing "single-lens photographing", "multi-lens photographing", "front-facing photographing mode", "rear-facing photographing mode", "front-facing and rear-facing photographing mode", "picture-in-picture photographing mode", "rear-facing and rear-facing photographing mode" are merely some names used in the embodiments of this application, meanings thereof have been recorded in the embodiments of this application, and names thereof cannot constitute any limitation on the embodiments.

Currently, the electronic device may provide a user with a plurality of photographing modes. However, when the user needs to switch a photographing mode of the electronic device, for example, switches the photographing mode from the front-facing photographing mode to the rear-facing photographing mode, switches the photographing mode from the rear-facing photographing mode to the front-facing photographing mode, switches photographing mode from the front-facing photographing mode/rear-facing photographing mode to the front-facing and rear-facing photographing mode, and switches the photographing mode from the front-facing and rear-facing photographing mode to the front-facing photographing mode/rear-facing photographing mode/rear-facing and rear-facing photographing mode/picture-in-picture photographing mode, the user needs to tap a specific control in the photographing preview interface, or the user needs to make a preset gesture in the photographing preview interface, to switch the photographing mode. The mode switching is not convenient, and is easy to affect a framing picture.

To resolve the foregoing problem, the embodiments of this application provide a photographing method. The method is applied to an electronic device including a display screen, a first camera, and a second camera. The first camera and the second camera are located on different sides of the display screen, and the first camera and the display screen are located on a same side of the electronic device. The electronic device may display a photographing preview interface. The photographing preview interface includes a first image collected by the first camera in real time and a second image collected by the second camera in real time. If the first camera detects a first gesture, the electronic device may display a first identifier. If the first camera detects a second gesture within a preset time after the first identifier is displayed, the electronic device may continue to display the first image in the photographing preview interface, and stops displaying the second image. It can be learned that the electronic device can detect a gesture (such as the first gesture and the second gesture) of a user by using the first camera, so that the user switches a photographing mode of the electronic device from a front-facing and rear-facing photographing mode to a front-facing photographing mode by using the gesture, the user does not need to touch the display screen in an entire process, and an operation of the user is more convenient. In addition, the electronic device can switch from the front-facing and rear-facing photographing mode to the front-facing photographing mode only after the first camera detects two gestures: the first gesture and the second gesture, so that a misoperation caused because another camera (such as the second camera) detects a gesture can be avoided, and a misoperation of the user photographed by the first camera can be avoided.

The electronic device may be a single-screen mobile phone or a foldable mobile phone. When the electronic device is a single-screen mobile phone, the first camera and the second camera may be respectively a front-facing camera and a rear-facing camera of the electronic device. When the electronic device is a foldable mobile phone, the display screen may include a first screen and a second screen, the first screen is rotatably connected to the second screen, the first camera and the second camera may be respectively located on two sides of the first screen, and the first camera and the first screen are located on a same side of the electronic device. Alternatively, the first camera is located on the first screen, the second camera is located on the second screen, and the first screen, the second screen, the first camera, and the second camera are located on a same side of the electronic device.

In the embodiments of this application, the electronic device may identify a gesture of the user by using the first camera (such as a front-facing camera) to switch the photographing mode of the electronic device. The foregoing gesture is only a name used in the embodiments of this application, and may also be referred to as a mid-air gesture, a hovering gesture, a floating gesture, or the like, and is specifically a gesture entered without touching the electronic device. A meaning represented by the gesture has been recorded in the embodiments of this application, and a name thereof does not constitute any limitation on the embodiments.

To describe the photographing method provided in the embodiments of this application more clearly and in more detail, the following first describes the electronic device that is provided in the embodiments of this application and that performs the method.

The electronic device may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device and/or a smart city device. A specific type of the electronic device is not specifically limited in the embodiments of this application.

FIG. 1A is a schematic diagram of a hardware structure of an electronic device according to an embodiment of this application.

As shown in FIG. 1A, the electronic device 200 may include a processor 210, an external memory interface 220, an internal memory 221, a universal serial bus (USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a plurality of cameras 293, a display screen 294, a subscriber identity module (SIM) card interface 295, and the like.

The foregoing sensor module 280 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It can be understood that the structure illustrated in this embodiment does not constitute a specific limitation on the electronic device 200. In some other embodiments, the electronic device 200 may include more or fewer components than those shown in the figure, or some components are combined, or some components are split, or component arrangements are different. Components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 200. The controller can generate an operation control signal based on instruction operation code and a timing signal, to complete control of instruction fetching and instruction execution.

A memory may be further disposed in the processor 210, and is configured to store instructions and data. In some embodiments, the memory in the processor 210 is a cache. The memory may store instructions or data that are or is just used or cyclically used by the processor 210. If the processor 210 needs to reuse the instructions or the data, the instructions or the data may be directly invoked from the memory, to avoid repeated access, reduce a waiting time of the processor 210, and improve system efficiency.

In some embodiments, the processor 210 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. It can be understood that the schematic interface connection relationship between the modules in this embodiment is merely an example for description, and does not constitute a limitation on the structure of the electronic device 200. In some other embodiments, the electronic device 200 may alternatively use an interface connection manner different from that in the foregoing embodiment, or use a combination of a plurality of interface connection manners.

In this embodiment of this application, the processor 210 may receive a plurality of consecutive images that are photographed by the camera 293 and that correspond to a mid-air gesture entered by a user, for example, "palm". Then, the processor 210 may compare and analyze the plurality of consecutive images, determine that the mid-air gesture corresponding to the plurality of consecutive images is "palm", and determine that an operation corresponding to the mid-air gesture is, for example, starting recording. Subsequently, the processor 210 may control a camera application to perform a corresponding operation. The corresponding operation may include, for example, invoking a plurality of cameras to simultaneously photograph images, synthesizing, by using the GPU through splicing, picture-in-picture (local superimposition), or the like, the images photographed separately by the plurality of cameras, and displaying, in a photographing preview interface of the electronic device by invoking the display screen 294, an image obtained through synthesis.

The external memory interface 220 may be configured to connect to an external memory card such as a Micro SD card, to expand a storage capability of the electronic device 200. The external memory card communicates with the processor 210 by using the external memory interface 220 to implement a data storage function, for example, store files such as music and a video into the external memory card.

The internal memory 221 may be configured to store computer-executable program code, and the executable program code includes instructions. The processor 210 performs various functional application and data processing of the electronic device 200 by running the instructions stored in the internal memory 221. For example, in this embodiment of this application, the processor 210 can execute the instructions stored in the internal memory 221, and the internal memory 221 may include a program storage region and a data storage region. The program storage region may store an operating system, an application required by at least one function (such as a sound playback function or an image playback function), or the like. The data storage region may store data (such as audio data and a phone book) created during use of the electronic device 200, or the like. In addition, the internal memory 221 may include a high-speed random access memory, and may further include a non-volatile memory such as at least one magnetic disk memory, a flash memory, or a universal flash storage (UFS).

In this embodiment of this application, the internal memory 221 may store picture files photographed or video files recorded by the electronic device in different photographing modes.

The charging management module 240 is configured to receive charging input from a charger. The charger may be a wireless charger, or may be a wired charger. When charging the battery 242, the charging management module 240 may further supply power to a terminal device by using the power management module 241.

The power management module 241 is configured to connect to the battery 242, the charging management module 240, and the processor 210. The power management module 241 receives input of the battery 242 and/or the charging management module 240, and supplies power to the processor 210, the internal memory 221, an external memory, the display screen 294, the camera 293, the wireless communication module 260, and the like. In some embodiments, the power management module 241 and the charging management module 240 may alternatively be disposed in a same component.

A wireless communication function of the electronic device 200 may be implemented by using the antenna 1, the antenna 2, the mobile communication module 250, the wireless communication module 260, the modem processor, the baseband processor, and the like. In some embodiments, the antenna 1 and the mobile communication module 250 of the electronic device 200 are coupled, and the antenna 2 and the wireless communication module 260 are coupled, so that the electronic device 200 can communicate with a network and another device by using a wireless communication technology.

The antenna 1 and the antenna 2 are configured to transmit and receive electromagnetic wave signals. Each antenna in the electronic device 200 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 250 can provide a solution to wireless communication such as 2G/3G/4G/5G applied to the electronic device 200. The mobile communication module 250 may include at least one filter, a switch, a power amplifier, a low noise amplifier (LNA), and the like. The mobile communication module 250 may receive an electromagnetic wave by using the antenna 1, perform processing such as filtering and amplification on the received electromagnetic wave, and transmit a processed electromagnetic wave to the modem processor for demodulation.

The mobile communication module 250 may further amplify a signal modulated by the modem processor, and convert, by using the antenna 1, the signal into an electromagnetic wave for radiation. In some embodiments, at least some functional modules of the mobile communication module 250 may be disposed in the processor 210. In some embodiments, at least some functional modules of the mobile communication module 250 and at least some modules of the processor 210 may be disposed in a same component.

The wireless communication module 260 may provide a solution to wireless communication applied to the electronic device 200, for example, a WLAN (such as a (Wi-Fi) network), Bluetooth (BT), a global navigation satellite system (GNSS), frequency modulation (FM), near field communication (NFC), and an infrared (IR) technology.

The wireless communication module 260 may be one or more components into which at least one communication processing module is integrated. The wireless communication module 260 receives an electromagnetic wave by using the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert, by using the antenna 2, the signal into an electromagnetic wave for radiation.

The electronic device 200 implements a display function by using the GPU, the display screen 294, the application processor, and the like. The GPU is a microprocessor for image processing, and is connected to the display screen 294 and the application processor. The GPU is configured to perform mathematical and geometrical calculation, and is configured to render graphics. The processor 210 may include one or more GPUs that execute program instructions to generate or change display information.

The display screen 294 is configured to display an image, a video, and the like. The display screen 294 includes a display panel.

The electronic device 200 can implement a photographing function by using the ISP, the camera 293, the video codec, the GPU, the display screen 294, the application processor, and the like. The ISP is configured to process data fed back by the camera 293. The camera 293 is configured to capture a still image or a video. In some embodiments, the electronic device 200 may include N cameras 293, where N is a positive integer greater than 2.

The electronic device 200 can implement an audio function by using the audio module 270, the speaker 270A, the receiver 270B, the microphone 270C, the headset jack 270D, the application processor, and the like, for example, music playing and recording.

The button 290 includes a power button, a volume button, and the like. The button 290 may be a mechanical button, or may be a touch button. The motor 291 may generate a vibration prompt. The motor 291 may be configured to provide an incoming call vibration prompt, or may be configured to provide touch vibration feedback. The indicator 292 may be an indicator light, may be configured to indicate a charging state and a battery change, and may also be configured to indicate a message, a missed call, a notification, or the like.

The plurality of cameras 293 are configured to photograph an image. In this embodiment of this application, a quantity of cameras 293 may be M, M≥2, and M is a positive integer. A quantity of cameras turned on by the electronic device in multi-lens photographing may be N, 2≤N≤M, and N is a positive integer.

In this embodiment of this application, types of the cameras 293 may be distinguished based on hardware configuration and a physical position. For example, the plurality of cameras included in the cameras 293 may be disposed on the front and back of the electronic device, a camera disposed on a side on which the display screen 294 of the electronic device is located may be referred to as a front-facing camera, and a camera disposed on a side on which a rear cover of the electronic device is located may be referred to as a rear-facing camera. For another example, the plurality of cameras included in the cameras 293 have different focal lengths and angles of view, a camera with a short focal length and a larger angle of view may be referred to as a wide-angle camera, and a camera with a long focal length and a small angle of view may be referred to as a common camera. Difference between content of images photographed by different cameras is as follows: The front-facing camera is used to photograph a scene facing the front of the electronic device, the rear-facing camera is used to photograph a scene facing the back of the electronic device, the wide-angle camera is capable of photographing a scene with a large area within a short photographing distance range, and a scene photographed at a same photographing distance has a smaller image in a picture than a scene photographed by using the common lens. A magnitude of the focal length and a size of the angle of view are relative concepts, and have no specific parameter limitation. Therefore, the wide-angle camera and the common camera are also relative concepts, and can be specifically distinguished based on physical parameters such as the focal length and the angle of view.

In particular, in this embodiment of this application, the camera 293 includes at least one camera with a time of flight (TOF) 3D sensing module or a structured light 3D sensing module, and the camera obtains 3D data of an object in a photographed image, so that the processor 210 can identify, based on the 3D data of the object, an operation instruction corresponding to a mid-air gesture of the user.

The camera configured to obtain the 3D data of the object may be an independent low-power camera, or may be another common front-facing camera or rear-facing camera. The common front-facing camera or rear-facing camera supports a low-power mode. When the low-power camera works, or when the common front-facing camera or rear-facing camera works in the low-power mode, a frame rate of the camera is lower than a frame rate existing when the common camera works in a non-low-power mode, and an output image is in a black and white format. Generally, the common camera can output 30 frames of images, 60 frames of images, 90 frames of images, and 240 frames of images in 1 second. However, when the low-power camera, or the common front-facing camera or rear-facing camera works in the low-power mode, the camera can output, for example, 2.5 frames of images in 1 second. When the camera photographs the initial image representing a same mid-air gesture, the camera can be switched to output 10 frames of images in 1 second to accurately identify, by using a plurality of consecutive images, an operation instruction corresponding to the mid-air gesture. In addition, a pixel of an image photographed by the low-power camera is lower than a pixel of an image photographed by the common camera. Meanwhile, power consumption existing when the low-power camera works in the low-power mode is lower than that of the common camera.

The display screen 294 is configured to display an image, a video, and the like. In some embodiments, the electronic device may include one or N display screens 294, where N is a positive integer greater than 1. In this embodiment of this application, the display screen 294 may be configured to display images photographed by any one or more cameras 293, for example, display, in the photographing preview interface, a plurality of frames of images photographed by one camera, display a plurality of frames of images from one camera 293 in a stored video file, or display one photo from one camera 293 in a stored picture file.

The SIM card interface 295 is configured to connect to a SIM card. The SIM card may be inserted into the SIM card interface 295 or removed from the SIM card interface 295, so that the SIM card can be in contact with or separated from the electronic device 200. The electronic device 200 can support 1 or N SIM card interfaces, where N is a positive integer greater than 1. The SIM card interface 295 can support a Nano SIM card, a Micro SIM card, a SIM card, and the like.

Figure 1B:
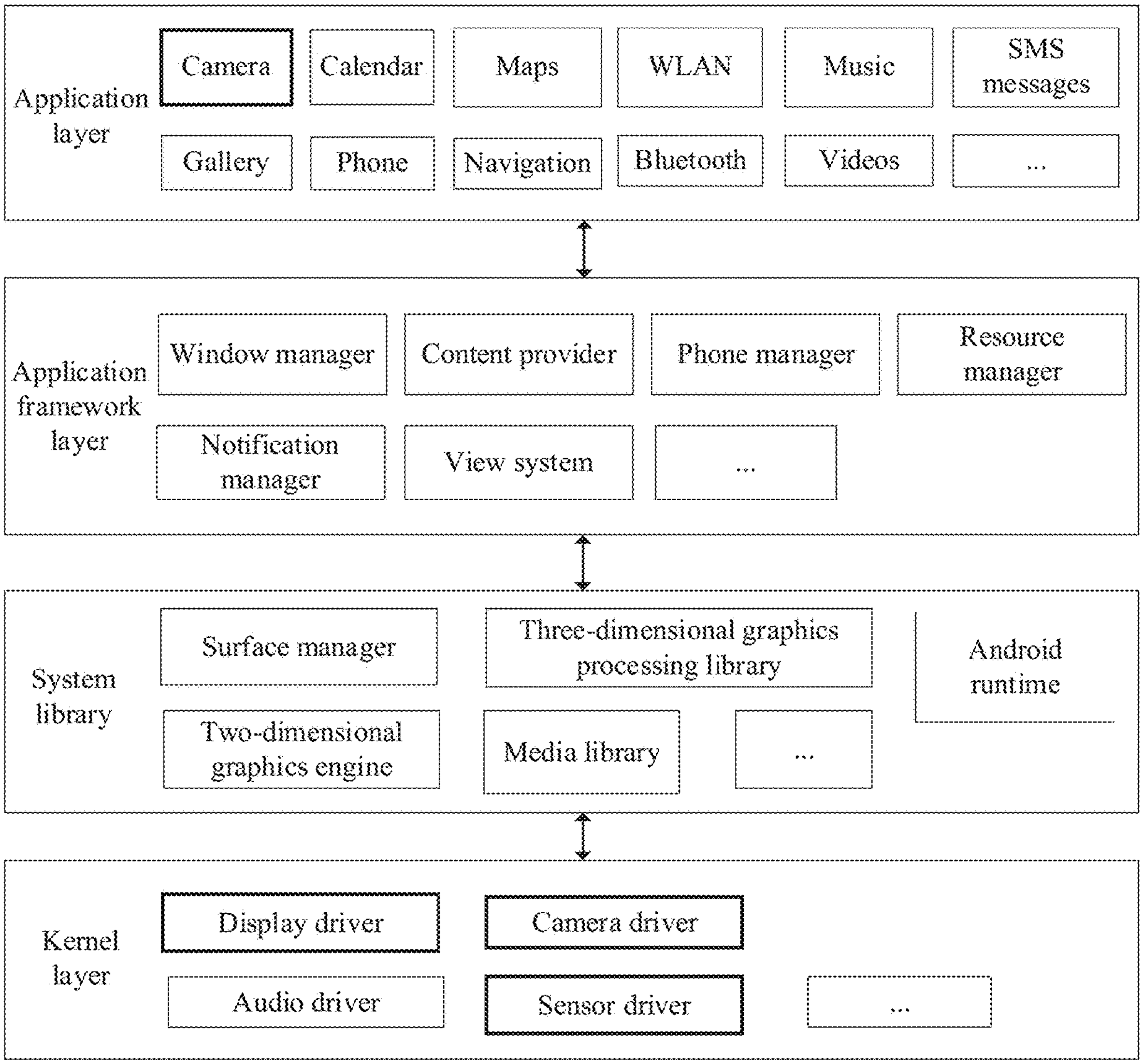
FIG. 1B is a diagram of a software architecture of an electronic device according to an embodiment of this application.

FIG. 1B is a block diagram of a software structure of an electronic device according to an embodiment of the present disclosure.

A layered architecture divides software into several layers, and each layer has a clear role and task. Layers communicate with each other by using a software interface. In some embodiments, an Android system is divided into four layers: an application layer, an application framework layer, an Android runtime and a system library, and a kernel layer from top to bottom.

The application layer may include a series of application packages.

As shown in FIG. 1B, the application packages may include applications such as Camera, Gallery, Calendar, Phone, Maps, Navigation, WLAN, Bluetooth, Music, Videos, and SMS messages.

The application framework layer provides an application programming interface (API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display screen, determine whether there is a status bar, lock the screen, capture the screen, and the like.

The content provider is configured to store and obtain data, and enables the data to be accessible to an application. The data may include a video, an image, audio, calls that are made and answered, a browsing history and bookmarks, a phone book, and the like.

The view system includes a visual control such as a control for displaying text, a control for displaying a picture, and the like. The view system may be configured to build an application. A display interface may include one or more views. For example, a display interface including an SMS message notification icon may include a view for displaying text and a view for displaying a picture.

The phone manager is configured to provide a communication function of the electronic device, for example, call status management (including answering, hanging up, or the like).

The resource manager provides various resources for an application, for example, a localized character string, an icon, a picture, a layout file, and a video file.

The notification manager enables the application to display notification information on the status bar, and may be configured to convey a notification-type message. The message may automatically disappear after a short stay without interacting with the user. For example, the notification manager is configured to notify that downloading is completed, or provide a message prompt. The notification manager may be a notification that appears on a status bar at the top of the system in a form of a graph or a scroll bar text, for example, a notification of an application running in the background or a notification that appears on the screen in a form of a dialog window. For example, text information is prompted on the status bar, a prompt tone is made, the electronic device vibrates, and an indicator light flashes.

The Android Runtime includes a kernel library and a virtual machine. The Android runtime is responsible for scheduling and management of the Android system.

The kernel library includes two parts: One part is a functional function that needs to invoked in a Java language, and the other part is an Android kernel library.

The application layer and the application framework layer run on the virtual machine. The virtual machine executes Java files of the application layer and the application framework layer as binary files. The virtual machine is configured to perform functions such as object lifecycle management, stack management, thread management, security and abnormality management, and garbage collection.

The system library may include a plurality of functional modules, such as a surface manager, a media library, a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording of a plurality of common audio and video formats, a still image file, and the like. The media library may support a plurality of audio/video coding formats such as MPEG4, H.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working procedure of software and hardware in a photographing process of the electronic device by using an example and based on a capturing/photographing scenario.

When the touch sensor receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch tap operation and a control corresponding to the tap operation is a control of a camera application icon is used. A camera application invokes an interface of the application framework layer to start the camera application, then starts the camera driver by invoking the kernel layer, and captures a still image or a video by using the camera 293. In this embodiment of this application, "the touch sensor receives a touch operation" can be replaced by "the camera 293 photographs a mid-air gesture operation entered by the user". Specifically, when the camera 293 photographs the mid-air gesture operation, a corresponding hardware interruption is sent to the kernel layer. The kernel layer processes the mid-air gesture operation into an original input event (including information such as a mid-air gesture image and a timestamp of the mid-air gesture operation). The original input event is stored at the kernel layer. The application framework layer obtains the original input event from the kernel layer, and identifies an operation corresponding to the input event. An example in which the mid-air gesture operation is an operation of switching a photographing mode is used. The camera application invokes the interface of the application framework layer to start another camera driver by invoking the kernel layer, so another camera 293 captures a still image or a video through switching.

Next, the photographing method provided in this application is described with reference to the accompanying drawings.

Figure 2A:
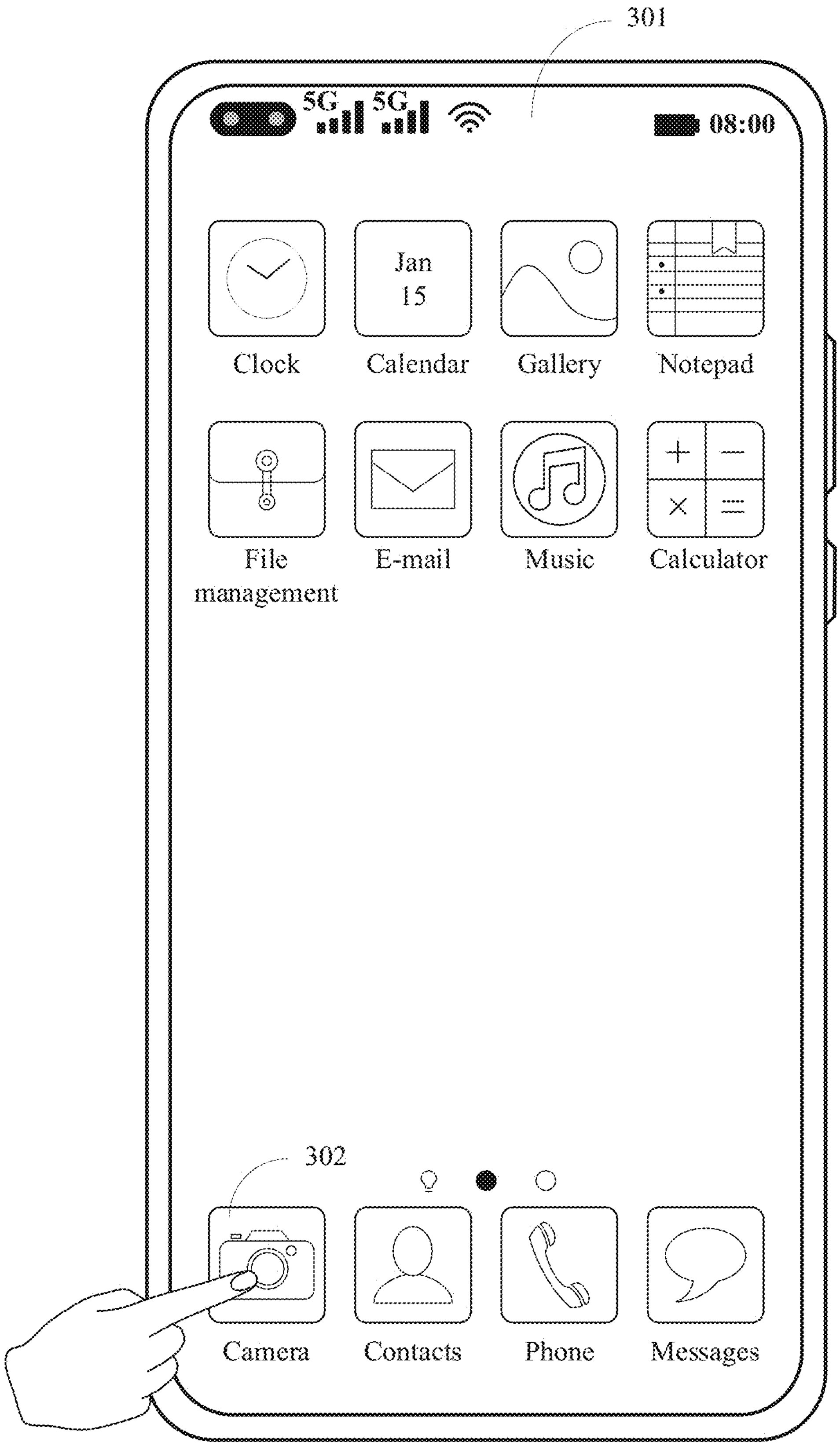
FIG. 2A-FIG. 2C are schematic diagrams of a group of user interfaces according to an embodiment of this application.
Figure 2B:
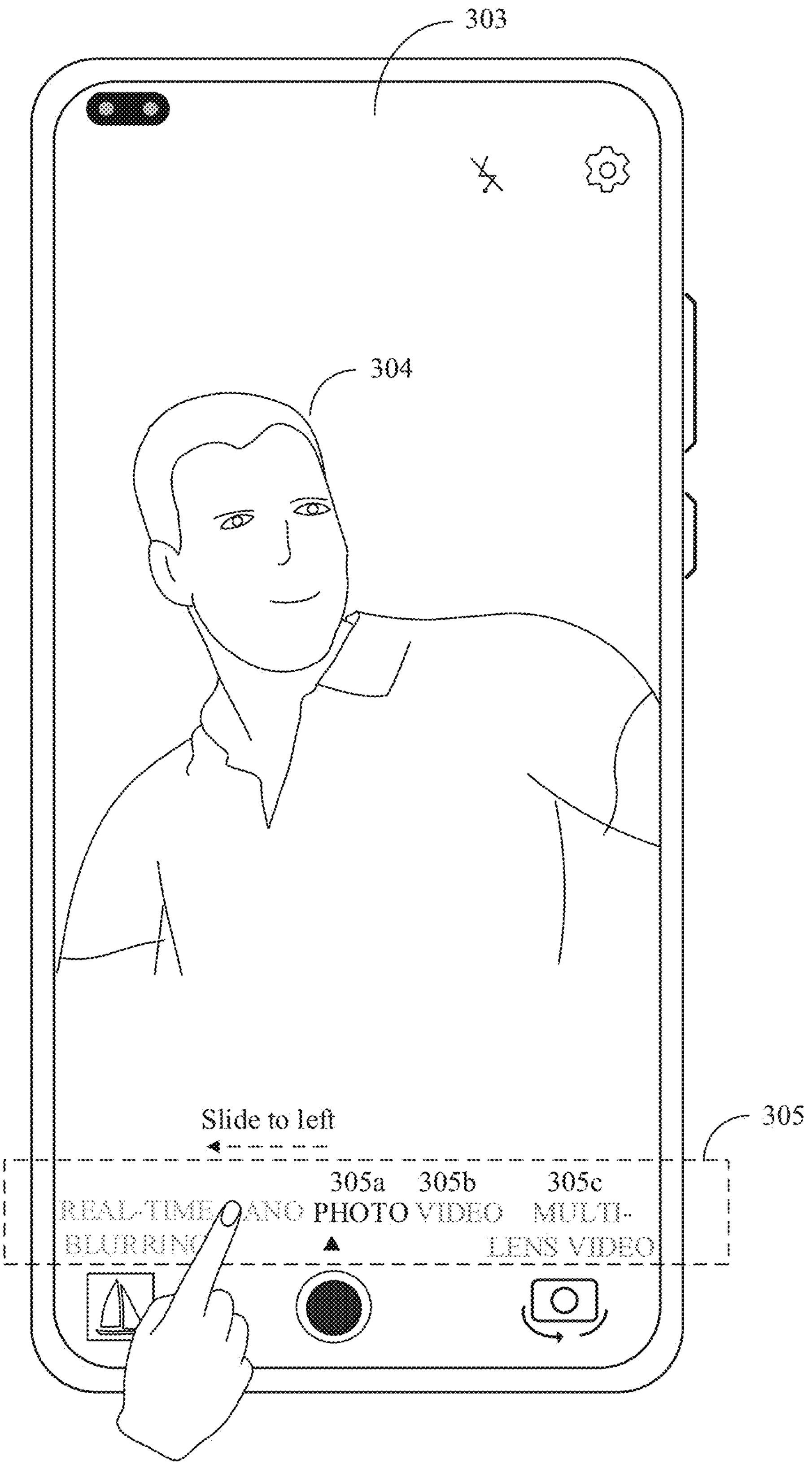

As shown in FIG. 2A, a mobile phone may display a home screen 301. The home screen 301 may include a camera application icon 302. The mobile phone may receive an operation in which the user taps the icon 302. In response to the operation, as shown in FIG. 2B, the mobile phone can open a camera application, and display a photographing preview interface 303 of the camera application. It can be understood that the camera application is an image photographing application on an electronic device such as a smartphone or a tablet computer. The camera application may be a system application or a third-party application. A name of the application is not limited in this application. In other words, the user may tap the camera application icon 302 to display the photographing preview interface 303 of the camera application. This is not limited thereto. The user may invoke the camera application in another application to display the photographing preview interface 303, for example, the user taps on a photographing control in a social application to display the photographing preview interface 303. The social application can support the user to share a photographed picture, video, or the like with another person.

It should be noted that the photographing preview interface 303 may be a user interface of a default photographing mode of the camera application, for example, may be a user interface provided when the camera application is in a front-facing photographing mode. It can be understood that the default photographing mode may be another mode such as a rear-facing photographing mode or a front-facing and rear-facing photographing mode. Alternatively, the camera application may have a memory function, and the photographing preview interface 303 may be a user interface of a photographing mode in which the camera application is located when the camera application exits last time.

In FIG. 2B, an example in which the photographing preview interface 303 is a corresponding photographing preview interface when the camera application is in the front-facing photographing mode is used for description. As shown in FIG. 2B, the photographing preview interface 303 may include an image 304, a photographing mode option 305, a flash light control, a shutter control, and the like. The image 304 is an image collected by the camera 293 in real time. It should be noted that the electronic device may refresh in real time an image (that is, the image 304) displayed in the photographing preview interface 303, so that the user previews an image currently collected by the camera 293. The photographing mode option 305 is used to provide a plurality of photographing modes for the user to select. The plurality of photographing modes may include PHOTO 305*a*, VIDEO 305*b*, MULTI-LENS VIDEO 305*c*, REAL-TIME BLURRING, PANO, and the like. The electronic device may receive an operation of sliding the photographing mode option 305 to left or right by the user, and in response to the operation, the electronic device may enable a photographing mode selected by the user. It should be noted that, FIG. 2B imposes no limitation, and more or fewer options than those shown in FIG. 2B may be displayed in the photographing mode option 305.

A photographing mode corresponding to the PHOTO 305*a* is common single-lens photographing, and may include the front-facing photographing mode, the rear-facing photographing mode, and the like. That is, when the photo-taking 305*a* is selected, the electronic device may take a photo by using the front-facing camera or the rear-facing camera. For detailed descriptions of the front-facing photographing mode and the rear-facing photographing mode, refer to the foregoing descriptions. Details are not described herein again.

Photographing modes corresponding to the MULTI-LENS VIDEO 305*c* may include a plurality of photographing modes, for example, a plurality of photographing modes of multi-lens photographing and a plurality of photographing modes of single-lens photographing. That is, when the MULTI-LENS VIDEO 305*c* is selected, the electronic device may perform single-lens photographing by using one camera, or may perform multi-lens photographing by using a plurality of cameras. For descriptions of the plurality of photographing modes of the multi-lens photographing, refer to the foregoing detailed descriptions. Details are not described herein again.

As shown in FIG. 2B, the photo-taking 305*a* is in a selected state. That is, the electronic device is currently in a photo-taking mode. If the user wishes to enable the multi-lens video recording mode, the user can slide the photographing mode option 305 to left, and select the MULTI-LENS VIDEO 305*c*. When detecting an operation in which the user slides the photographing mode option 305 to left and selects the MULTI-LENS VIDEO 305*c*, the electronic device may enable the multi-lens video recording mode, and display the photographing preview interface 303 shown in FIG. 2C.

Figure 2C:
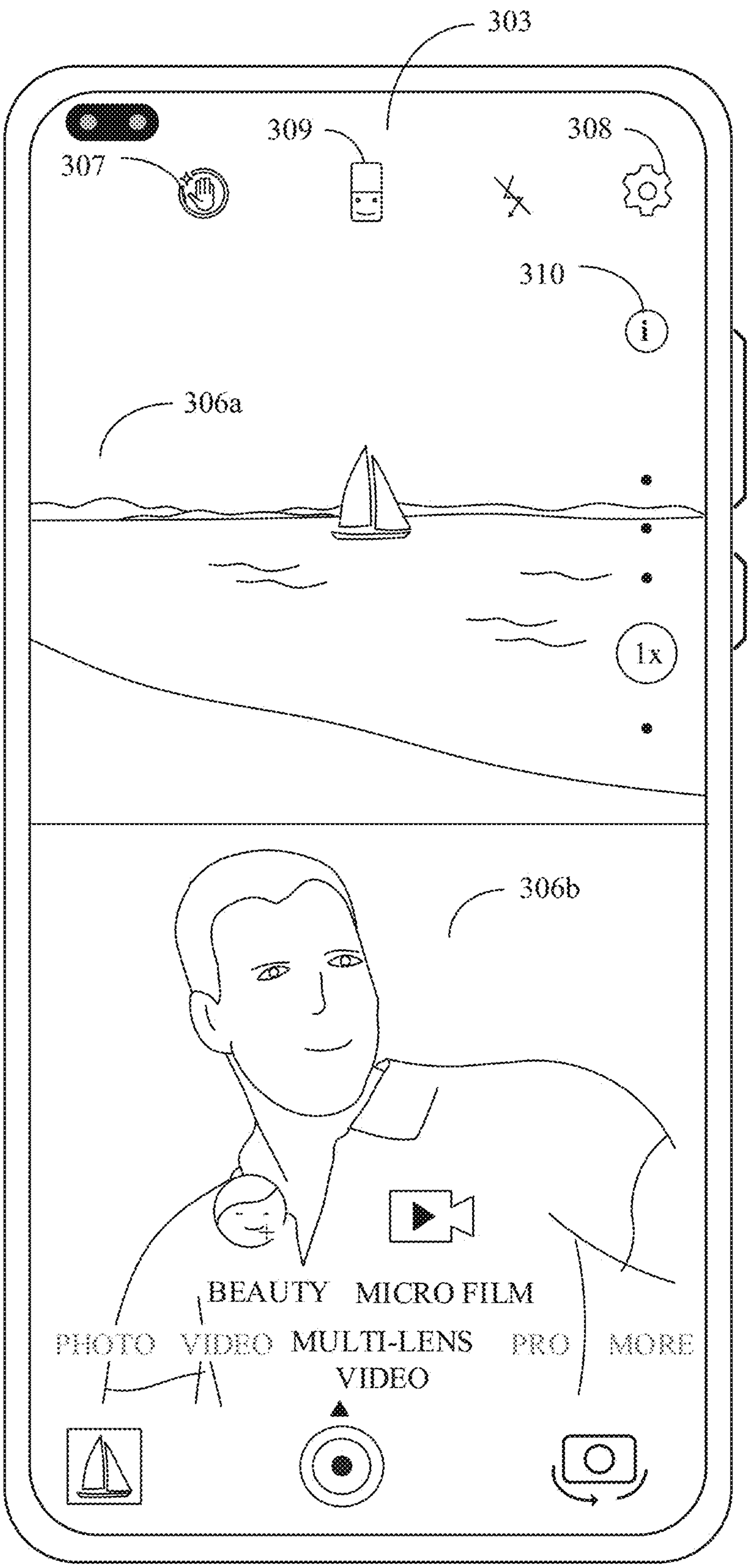

As shown in FIG. 2C, after entering the multi-lens video recording mode, the electronic device displays the photographing preview interface 303. The photographing preview interface 303 includes an image 306*a*, an image 306*b*, a mid-air lens change control 307, a setting control 308, a photographing mode switching control 309, a teaching guide control 310, and the like. The image 306*a* is an image photographed by the rear-facing camera, the image 306*b* is an image photographed by the front-facing camera, and the image 306*a* and the image 306*b* are spliced up and down because the electronic device is vertically placed.

It should be noted that, in this application, when the electronic device enters the multi-lens video recording mode, the front-facing camera and the rear-facing camera can be turned on by default, and an image display manner is a splicing manner by default. However, in another embodiment, cameras that are turned on by default may be two rear-facing cameras, one front-facing camera, one rear-facing camera, or the like. In addition, the image display manner is not limited to the splicing manner, and may be a picture-in-picture manner or the like. This is not specifically limited herein. Alternatively, the camera application may have a memory function. After the electronic device enters the multi-lens video recording mode, the electronic device can turn on a camera that was working when the camera application exits from the multi-lens video recording mode last time, and perform display in a display manner used last time.

The mid-air lens change control 307 can be used by the user to quickly enable/disable a mid-air lens change function. After enabling the mid-air lens change function, the user can control the electronic device by using a specific mid-air gesture. It should be noted that, after the electronic device enters the multi-lens video recording mode, the mid-air lens change function can be enabled by default. Therefore, the mid-air lens change control 307 is in an enabled state to indicate that the mid-air lens change function has been enabled. Certainly, the mid-air lens change function may alternatively be disabled. For example, in response to detecting a touch operation performed by the user on the mid-air lens change control 307, the electronic device can disable the mid-air lens change function, so that the mid-air lens change control 307 is switched from an enabled state to a disabled state.

The setting control 308 can be used to adjust a parameter (such as resolution and a picture proportion) for taking a photo, enable or disable some manners (such as mid-air lens change, timed photographing, smile snap, voice-controlled photographing) for taking a photo, and the like.

The photographing mode switching control 309 may be used to provide a plurality of photographing modes for the user to select, for example, a front-facing and rear-facing photographing mode, a rear-facing and rear-facing photographing mode, a picture-in-picture photographing mode, a front-facing photographing mode, and a rear-facing photographing mode. It should be noted that the photographing mode switching control 309 may also indicate a photographing mode of the electronic device and an image display manner. For example, "smiley face" in the photographing mode switching control 309 in FIG. 2C is used to indicate an image photographed by the front-facing camera. "Blank" is used to indicate an image photographed by the rear-facing camera. "Smiley face" and "blank" are spliced up and down, indicating that the image 306*a* and the image 306*b* are spliced up and down.

The teaching guide control 310 may be used to guide the user to learn a mid-air gesture of mid-air lens change, for example, a mid-air gesture of starting recording, a gesture of switching between a double lens and a single lens, a gesture of enabling/disabling picture-in-picture, a gesture of changing between front-facing and rear-facing lenses, and a gesture of ending recording. It should be noted that the teaching guide control 310 is associated with the mid-air lens change function. When the mid-air lens change function is enabled (or the mid-air lens change control 307 is in an enabled state), the photographing preview interface 303 may display the teaching guide control 310. When the mid-air lens change function is disabled (or the mid-air lens change control 307 is in a disabled state), the photographing preview interface 303 may hide (which can be understood as not displaying) the teaching guide control 310. It should be noted that, when the electronic device starts recording, the teaching guide control 310 may be hidden.

Figure 3A:
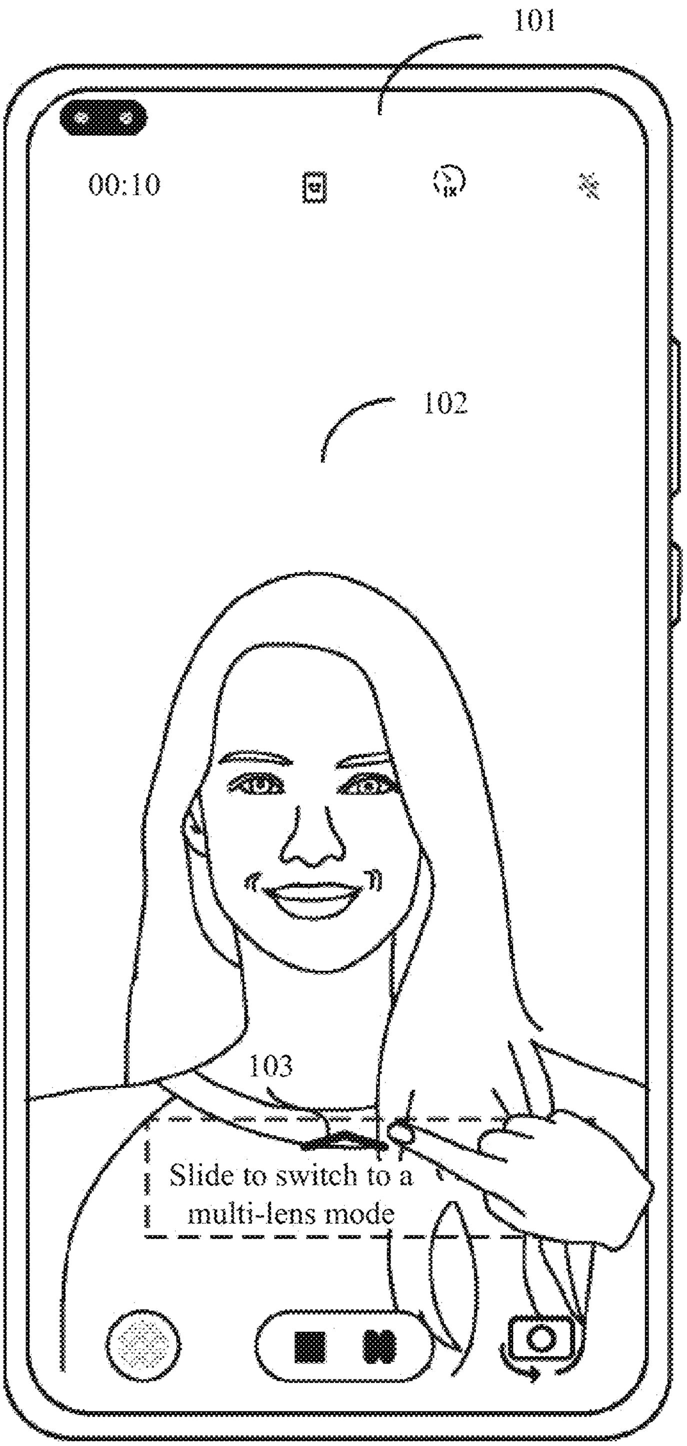
FIG. 3A-FIG. 3B are schematic diagrams of a group of user interfaces according to an embodiment of this application.
Figure 3B:
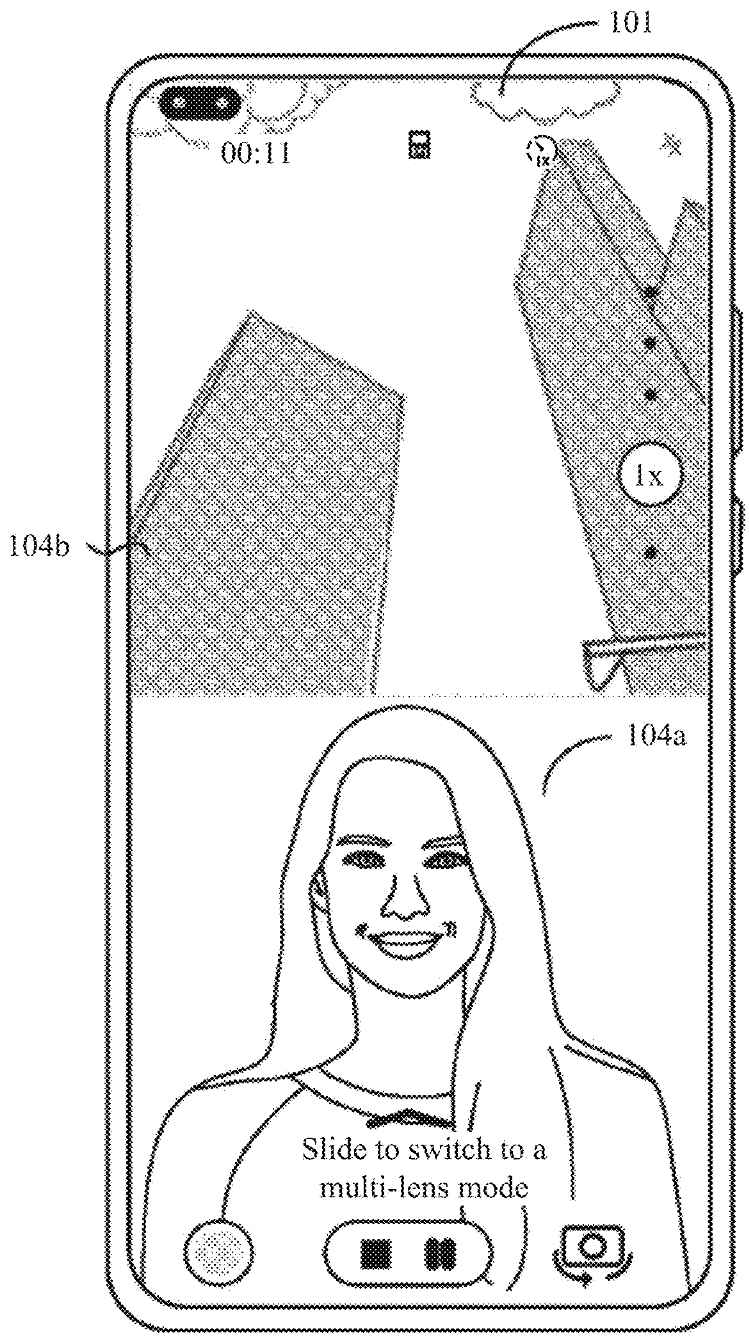

When the user holds the electronic device for photographing, the user may touch a control on a display screen to switch the photographing mode of the electronic device. FIG. 3A-FIG. 3B show a process in which the user touches the display screen to switch the photographing mode. FIG. 3A shows a photographing preview interface existing when the electronic device is in the front-facing photographing mode.

As shown in FIG. 3A, a photographing preview interface 101 includes an image 102 photographed by the front-facing camera of the electronic device and a switching control 103. The electronic device may receive an operation in which the user taps the switching control 103. In response to the operation, the electronic device can switch the photographing mode to the front-facing and rear-facing photographing mode, and display the photographing preview interface 101 shown in FIG. 3B. The photographing preview interface 101 includes an image 104*a* photographed by the front-facing camera and an image 104*b* photographed by the rear-facing camera.

Figure 4:
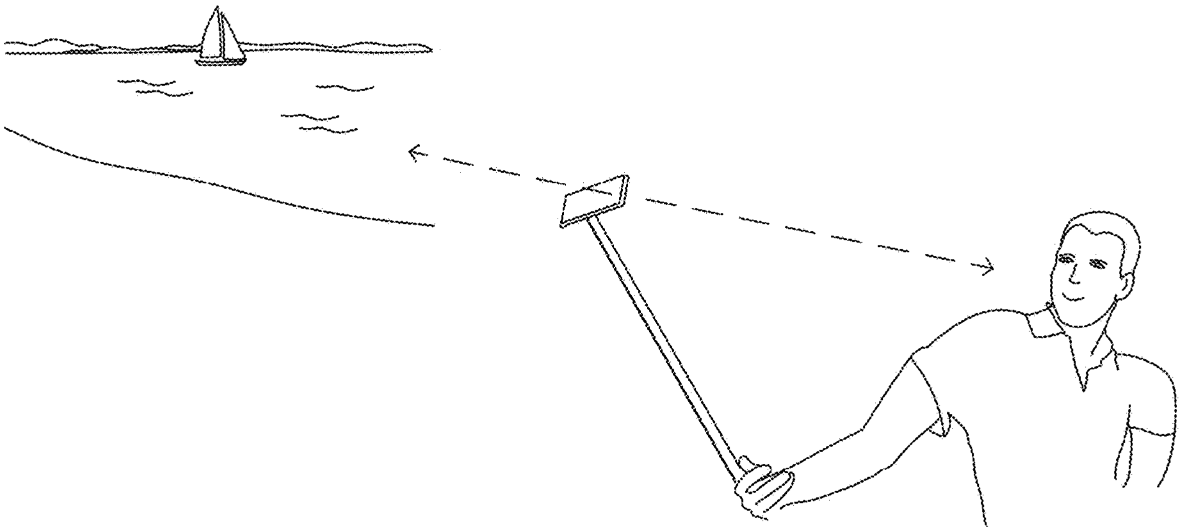
FIG. 4 is a schematic diagram of a photographing scenario according to an embodiment of this application.

When the user is inconvenient to directly touch the display screen (for example, a scenario shown in FIG. 4), the photographing mode of the electronic device can be switched by using a mid-air gesture. FIG. 4 is a schematic diagram of a scenario in which the user performs landscape photographing by holding the electronic device with a selfie stick. The electronic device is horizontally placed on the selfie stick.

Next, with reference to the accompanying drawings, a procedure in which the user controls the electronic device by using the mid-air gesture in the photographing scenario shown in FIG. 4 is described.

With reference to FIG. 5A-FIG. 5E, the following describes a series of interfaces existing when the user controls, by using the mid-air gesture, the electronic device to start recording.

Figure 5A:
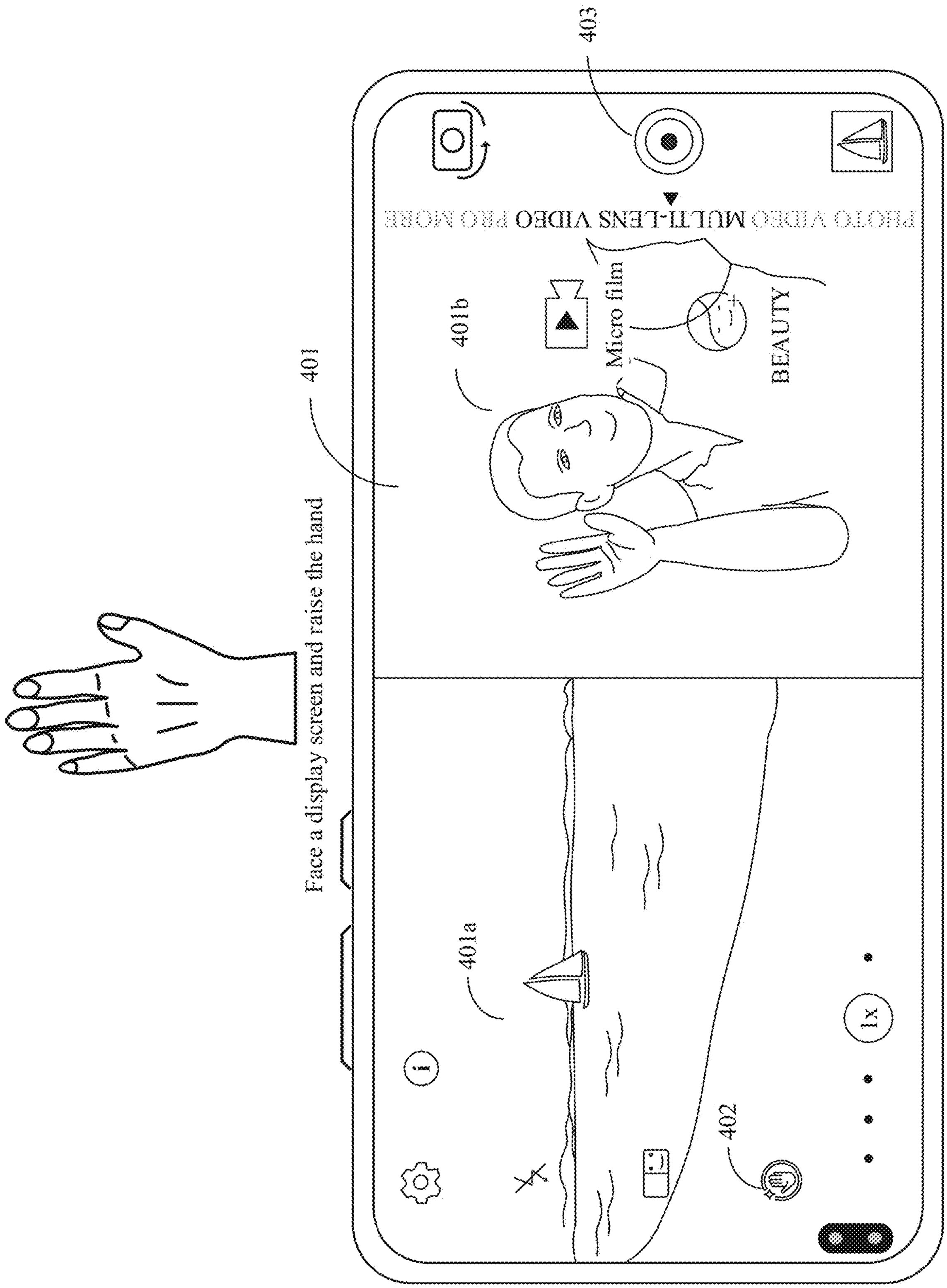
FIG. 5A-FIG. 5E are schematic diagrams of another group of interfaces according to an embodiment of this application.

As shown in FIG. 5A, the electronic device may display a photographing preview interface 401. The photographing preview interface 401 includes an image 401*a*, an image 401*b*, a mid-air lens change control 402, a recording control 403, and the like. The image 401*a* is an image collected by the rear-facing camera, and the image 401*b* is an image collected by the front-facing camera. In addition, the image 401*a* and the image 401*b* are spliced left and right because the electronic device is horizontally placed on the selfie stick. The mid-air lens change control 402 can be used by the user to quickly enable/disable the mid-air lens change function. After the mid-air lens change function is enabled, the user can control the electronic device through a specific mid-air gesture. In FIG. 5A, the mid-air lens change control 402 indicates that the mid-air lens change function is in an enabled state. The recording control 403 can be used by the user to quickly start recording a video. In FIG. 5A, the recording control 403 indicates that the electronic device is in a state in which recording is not performed.

As shown in FIG. 5A, when the user wishes to start recording, the user can first face the electronic device to enter a mid-air gesture, for example, a mid-air gesture of "raising the hand" (which can be understood as a state in which the user keeps facing the display screen and keeps "raising the hand", and can also be referred as a first gesture). The electronic device may collect, by using the front-facing camera, an image (that is, the image 401*b*) used to identify the mid-air gesture of the user, and display the image in the photographing preview interface 401. In addition, the electronic device may further perform analysis processing on the collected image 401*b*, and when identifying the mid-air gesture of "raising the hand", display the photographing preview interface 401 shown in FIG. 5B. It should be noted that, when a specific condition is met, the electronic device can detect a gesture by using the front-facing camera. For example, the electronic device may detect a gesture when the front-facing camera detects a face, or detect a gesture when it is detected that a distance between the user photographed by the front-facing camera and the display screen falls within a preset range. This can effectively avoid accidental touch caused by the user or a passerby.

Figure 5B:
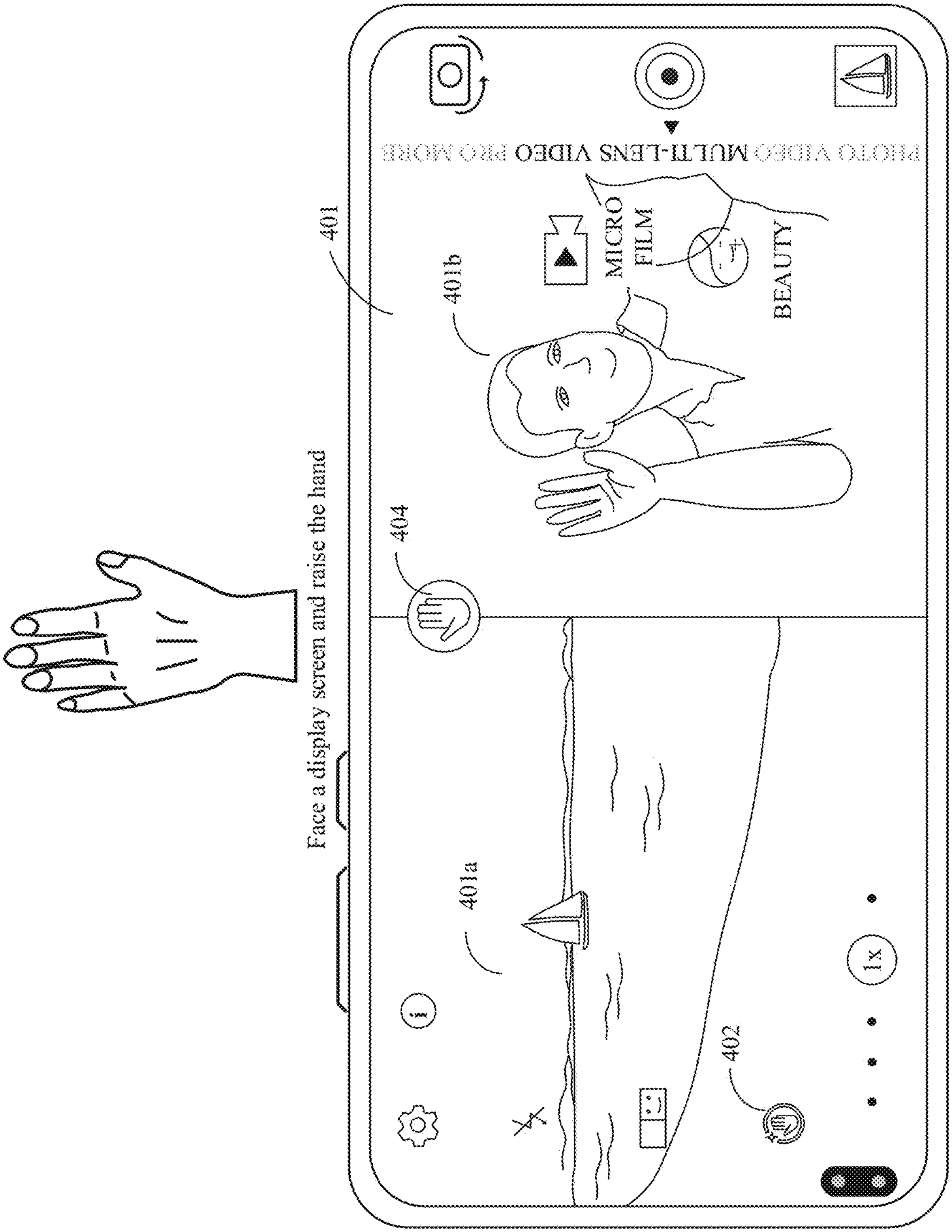

The photographing preview interface 401 shown in FIG. 5B is similar to the photographing preview interface 401 shown in FIG. 5A. A difference lies in that the photographing preview interface 401 shown in FIG. 5B displays prompt information 404 (which may also be referred to as a first identifier) used to indicate that the electronic device has entered a "ready" state (which can be understood as a state in which the electronic device is ready to further identify the mid-air gesture of the user), and the user can input the mid-air gesture as required. For example, as shown in FIG. 5B, the prompt information 404 may be an icon of the mid-air gesture. In a possible design, the prompt information 404 may also include text information that prompts the user to complete a gesture operation within a preset time (such as 3 seconds and 4 seconds), for example, a gesture operation needs to be completed within 3 seconds.

In addition, the prompt information 404 may also include a time progress bar, and the time progress bar may be used to indicate a time in which the electronic device enters the "ready" state. The electronic device starts timing from a moment (such as, a first moment) at which the electronic device enters the "ready" state. In this case, the time progress bar is blank. The electronic device stops timing after a preset time after the first moment. In this case, the time progress bar is filled. After the electronic device enters the "ready" state, the user needs to enter a mid-air gesture before the time progress bar is filled (which can be understood as being within the preset time) to control the electronic device.

Figure 5C:
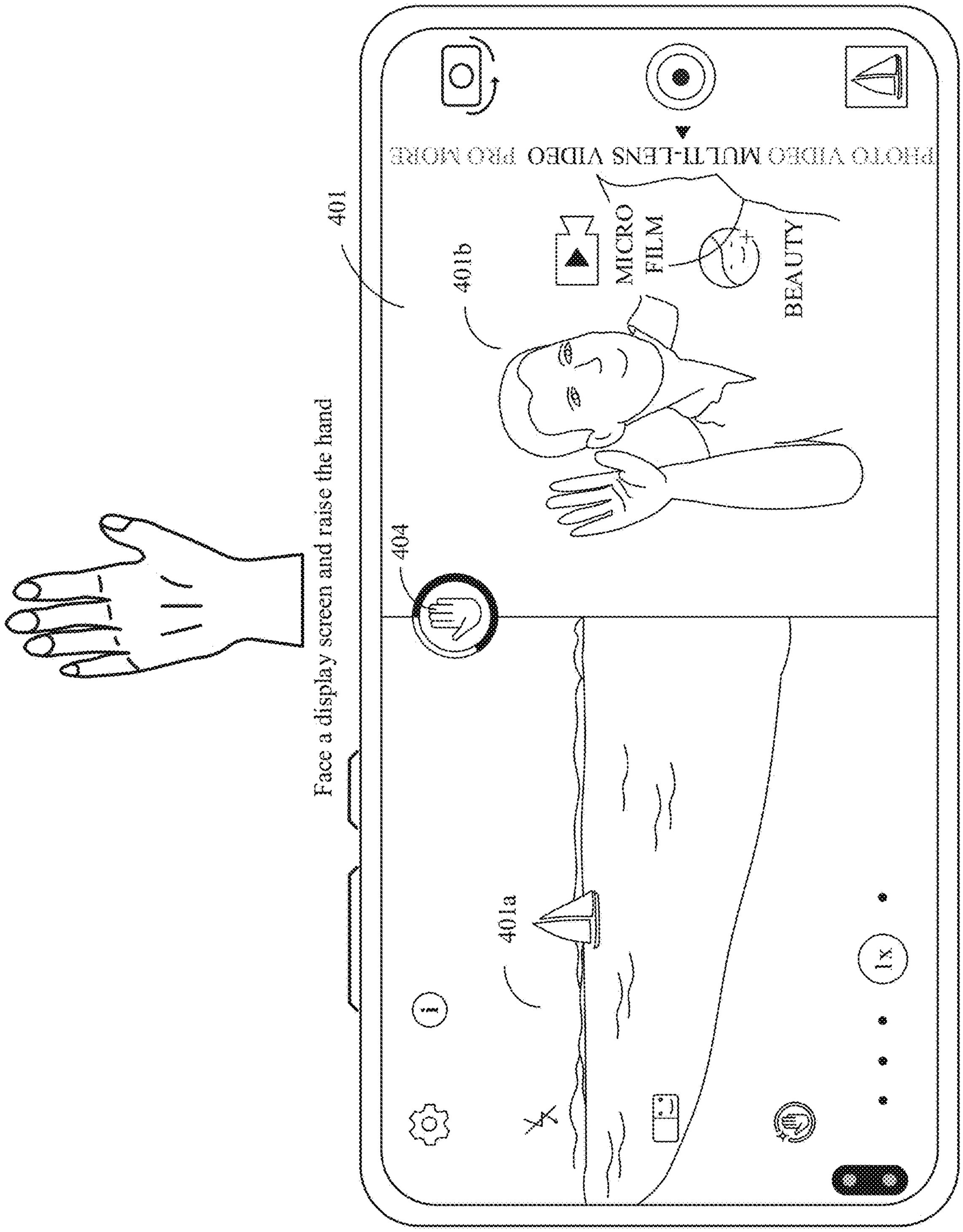

As shown in FIG. 5C, in the photographing scenario shown in FIG. 5B, the user may continuously enter a mid-air gesture (which may also be referred to as a seventh gesture) of "raising the hand" until the time progress bar is filled by more than two thirds (or any other ratio such as a half or two fifths). In response to that the electronic device detects that the user continuously enters the mid-air gesture of "raising the hand" until the time progress bar is filled by more than two thirds, the electronic device can enter a ready-to-record state, and display the photographing preview interface 401 shown in FIG. 5D. For example, if the preset time is 3 seconds, after the electronic device enters the "ready" state, the user can keep a posture of "raising the hand" for at least 2 seconds, and the electronic device can enter the ready-to-record state.

Figure 5D:
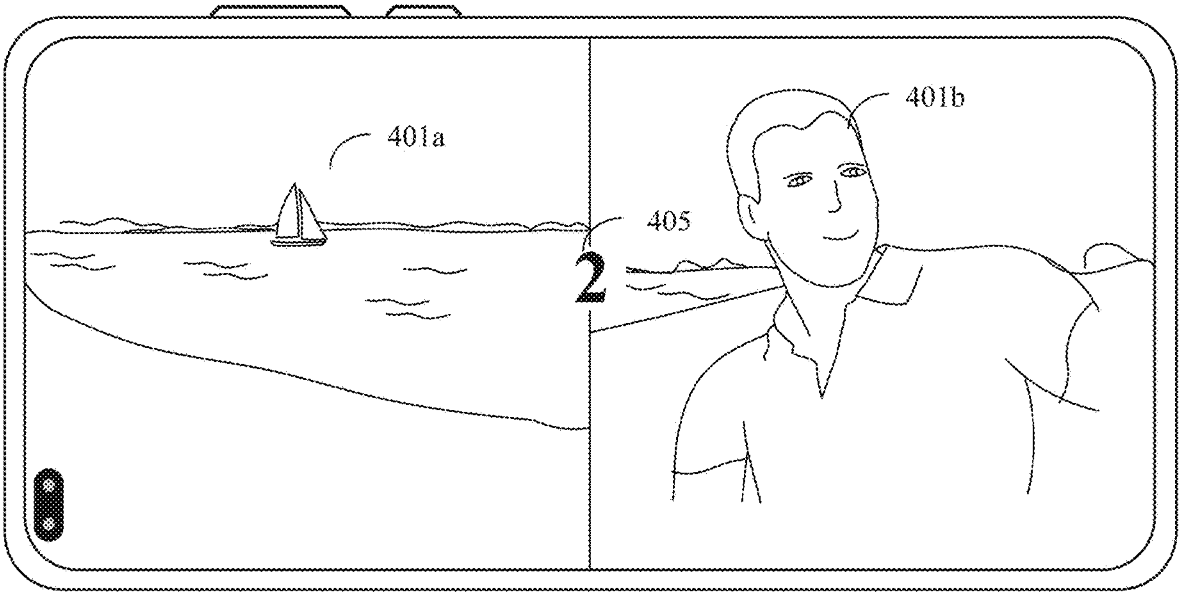

As shown in FIG. 5D, after the electronic device enters the ready-to-record state, the photographing preview interface 401 may display the image 401*a*, the image 401*b*, and a countdown reminder 405. The image 401*b* shows that the user has put the hand down (that is, no longer enters the mid-air gesture of "raising the hand"). The countdown reminder 405 is used to remind the user that the electronic device is to enter a recording state after a first time (such as 2 seconds or 3 seconds). The countdown reminder 405 is displayed in the photographing preview interface 401, so that the user can be reminded that the electronic device is to start recording, and the user can prepare for recording. It can be understood that, after the electronic device enters the ready-to-record state, the user does not need to continue to enter the mid-air gesture, and may take any posture to prepare for photographing.

Figure 5E:
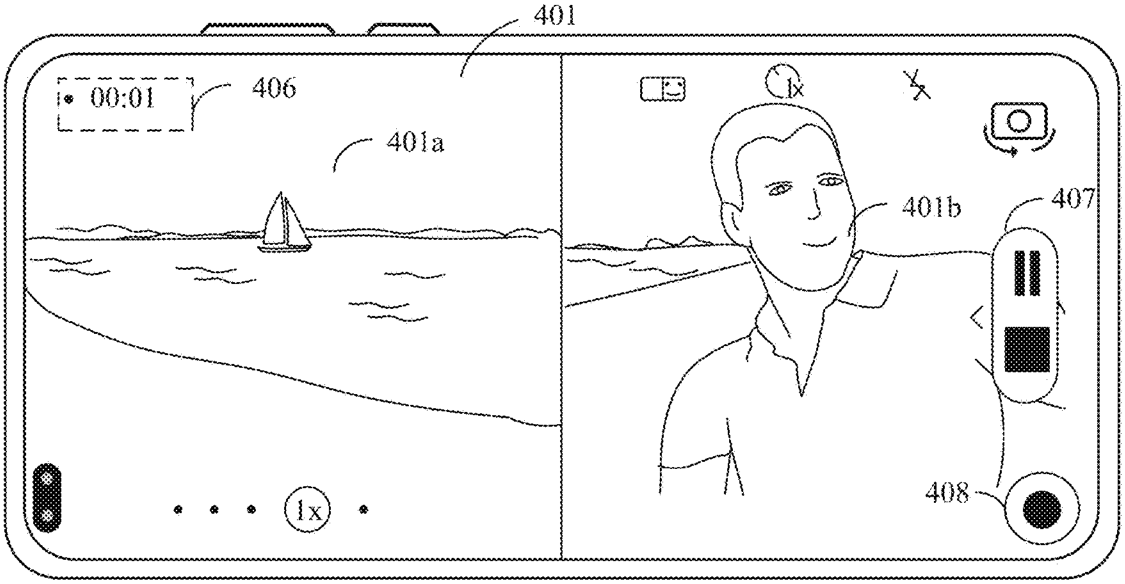

After the countdown ends, the electronic device may start recording. FIG. 5E shows the photographing preview interface 401 existing when the electronic device starts recording. The photographing preview interface 401 shown in FIG. 5E may include a recording time 406, a recording control 407, a screenshot control 408, and the like. The recording time 406 is used for recording duration of a video, for example, "00:01". When detecting a touch operation performed on the recording control 407, the electronic device may stop or pause recording a video. When detecting a touch operation performed on the screenshot control 408, the electronic device can capture an image (including the image 401*a* and the image 401*b*) currently displayed in the photographing preview interface 401.

It may be learned from the foregoing descriptions that, the electronic device may enter the "ready" state when first detecting the mid-air gesture (that is, the first gesture) of "raising the hand". In this case, if the electronic device detects, within a preset time, a mid-air gesture (such as a mid-air gesture of "raising the hand") further entered by the user, the electronic device may perform an operation corresponding to the mid-air gesture (for example, the mid-air gesture of "raising the hand" may respond to an operation of starting recording). If the electronic device does not detect, within a preset time, a mid-air gesture further entered by the user, the electronic device recovers to an original state (that is, a state existing before the electronic device enters the "ready" state). In this case, if the user wishes to control the electronic device again, the user needs to enter the mid-air gesture of "raising the hand" again, so that the electronic device enters the "ready" state again.

It should be noted that the first gesture and the seventh gesture may be the same (for example, both are "raising the hand"), or may be different. This is not specifically limited herein. In addition, the foregoing mid-air gesture of "raising the hand" may be replaced with another mid-air gesture such as a mid-air gesture of "thumbing up" or a mid-air gesture of "winning a victory".

With reference to FIG. 6A-FIG. 6K, the following describes a series of interfaces existing when the user controls, by using a mid-air gesture, the electronic device to be switched from the front-facing and rear-facing photographing mode to another photographing mode in a recording process.

Figure 6A:
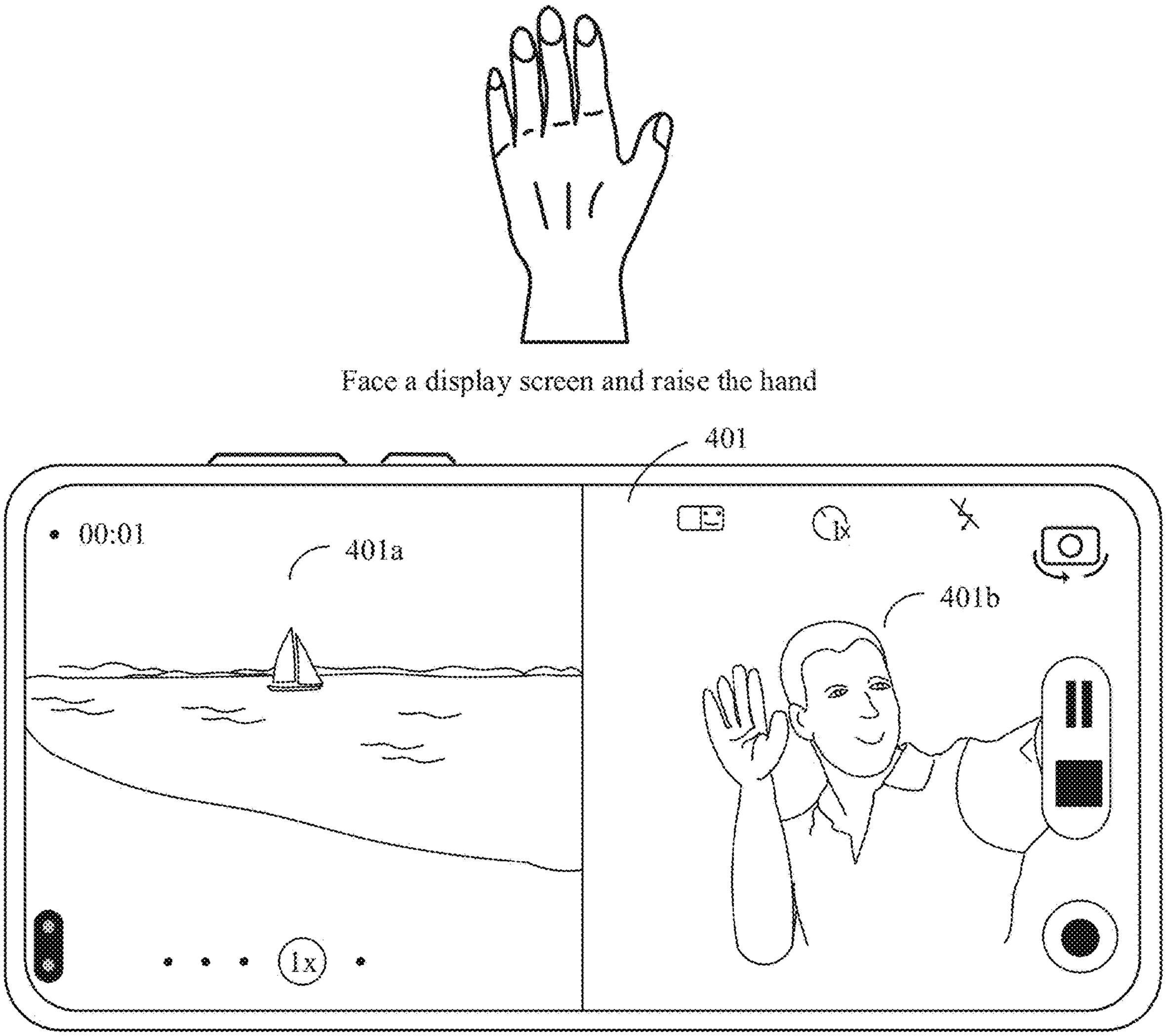
FIG. 6A-FIG. 6K are schematic diagrams of another group of interfaces according to an embodiment of this application.

As shown in FIG. 6A, the electronic device may display a photographing preview interface 401. The photographing preview interface 401 shown in FIG. 6A is similar to the photographing preview interface 401 shown in FIG. 5E. Details are not described herein again.

Figure 6B:
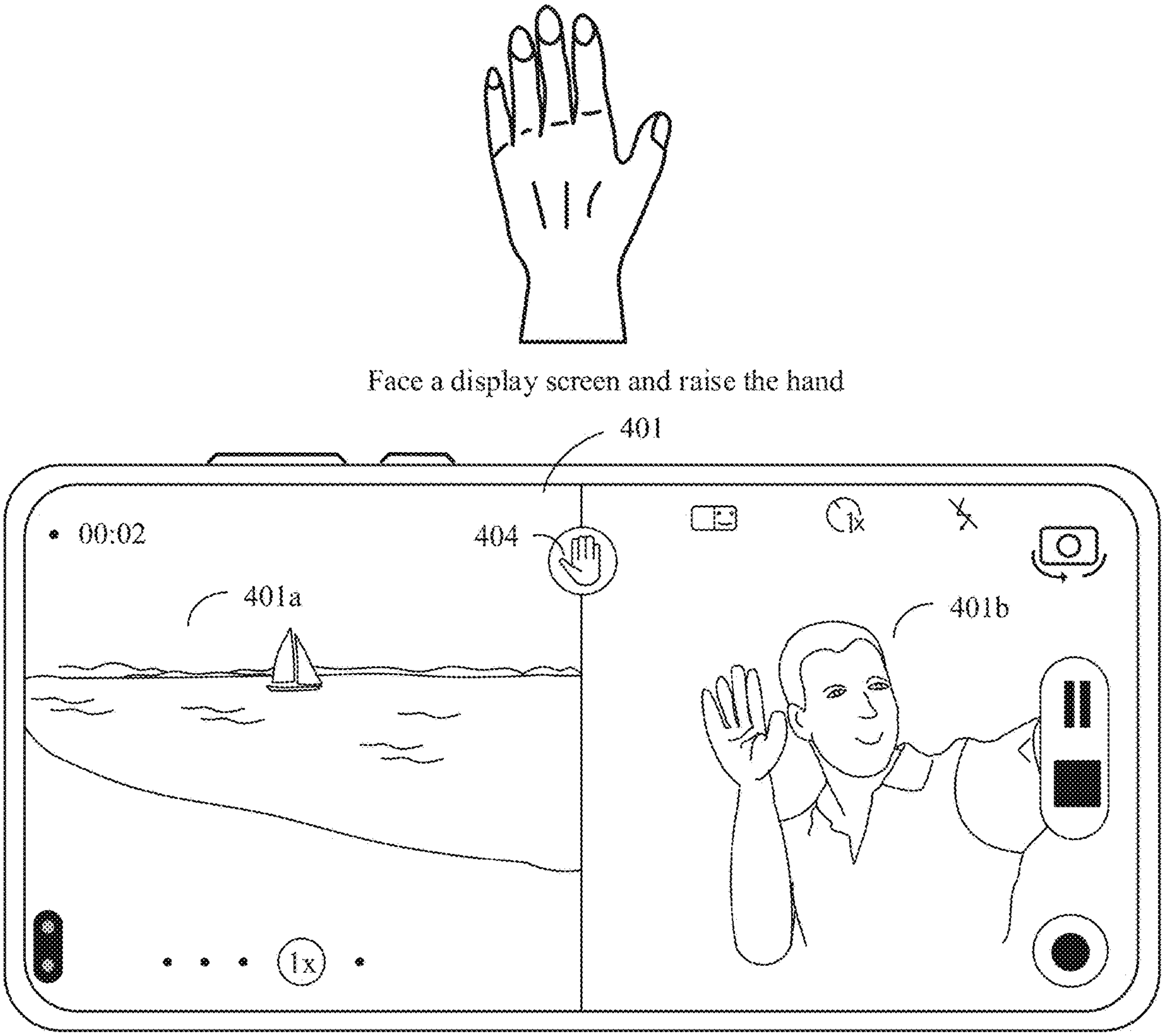

As shown in FIG. 6A, if the user wishes to switch the photographing mode of the electronic device, the user can first face the electronic device and enter a mid-air gesture, for example, enter a mid-air gesture of "raising the hand". The electronic device may collect, by using the front-facing camera, an image (that is, the image 401*b*) used to identify the mid-air gesture entered by the user, and display the image in the photographing preview interface 401. In addition, the electronic device may further perform analysis processing on the collected image 401*b*, and when identifying the mid-air gesture of "raising the hand", display the photographing preview interface 401 shown in FIG. 6B. The photographing preview interface 401 shown in FIG. 6B is similar to the photographing preview interface 401 shown in FIG. 6A. A difference lies in that the photographing preview interface 401 shown in FIG. 6B includes prompt information 404. For related descriptions of the prompt information 404, refer to the foregoing descriptions. Details are not described herein again.

As described above, the electronic device may enter the "ready" state when first detecting the mid-air gesture (that is, the first gesture) of "raising the hand". After the electronic device enters the "ready" state, the electronic device may determine a to-be-performed operation based on a further detected gesture operation. That is, in the photographing preview interface 401 shown in FIG. 6B, the user may enter different mid-air gestures to switch the photographing mode of the electronic device, for example, control the electronic device to switch the photographing mode from front-facing and rear-facing photographing to another photographing mode such as a front-facing photographing mode, a rear-facing photographing mode, or a picture-in-picture photographing mode.

The electronic device may be switched from the front-facing and rear-facing photographing mode to the front-facing photographing mode or the rear-facing photographing mode. Based on the photographing scenarios shown in FIG. 6A-FIG. 6B, the following describes an interface used in a process in which the electronic device is switched from the front-facing and rear-facing photographing mode to the front-facing photographing mode/the rear-facing photographing mode. For descriptions of FIG. 6A and FIG. 6B, refer to FIG. 5A and FIG. 5B. Details are not described herein again.

Figure 6C:
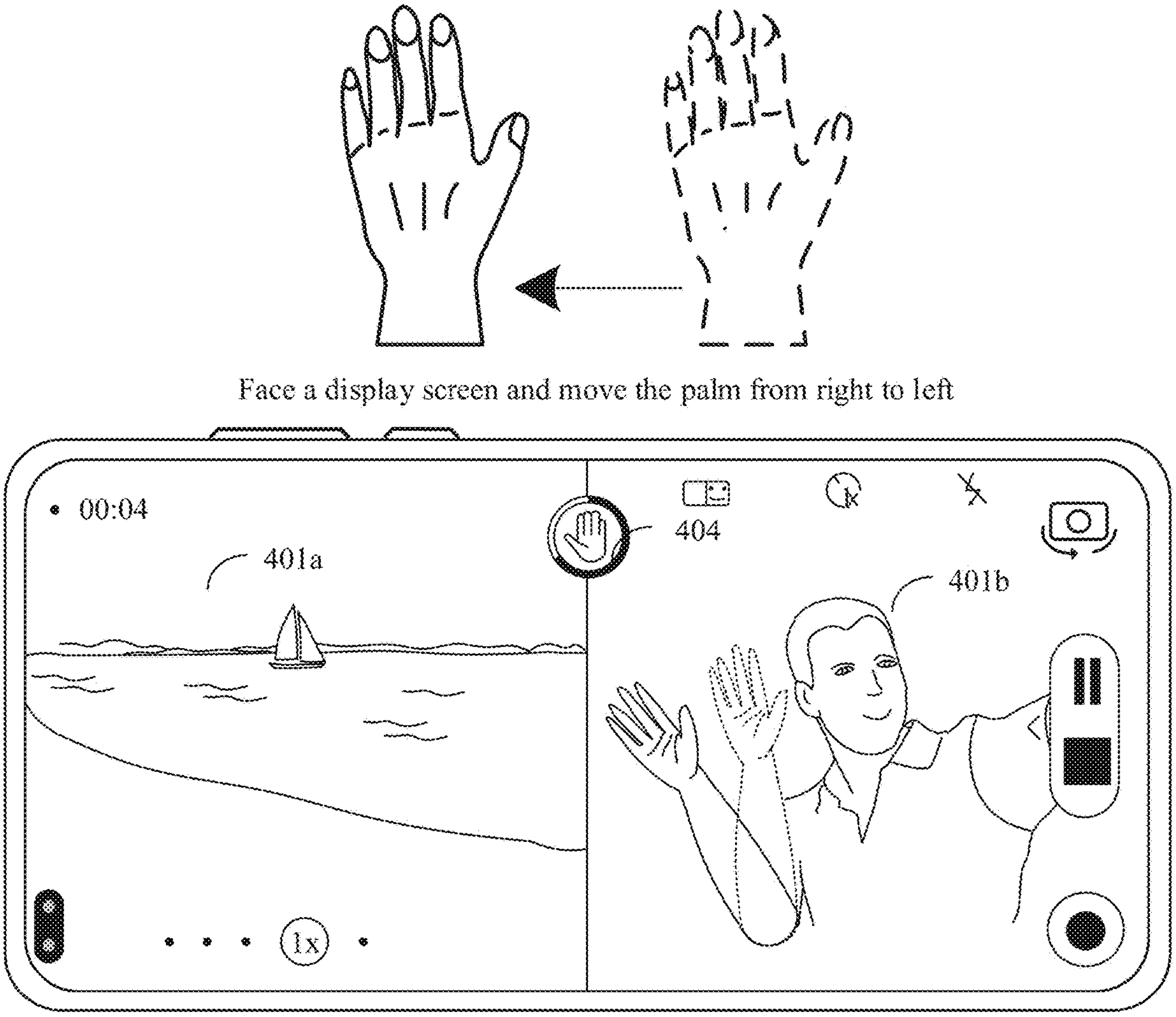
Figure 6D:
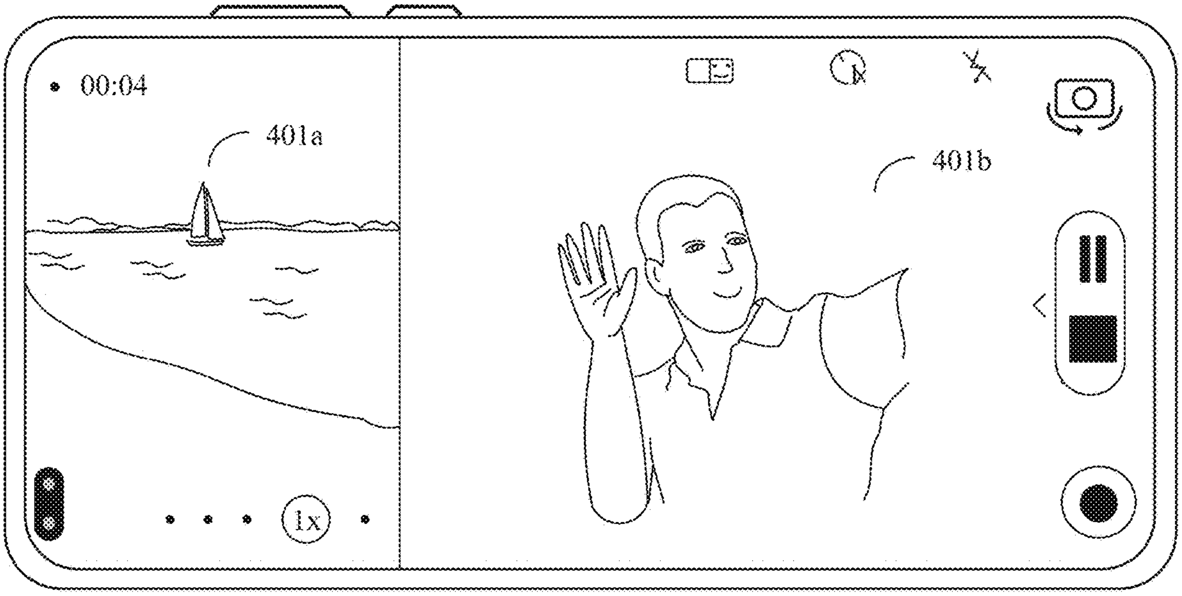
Figure 6E:
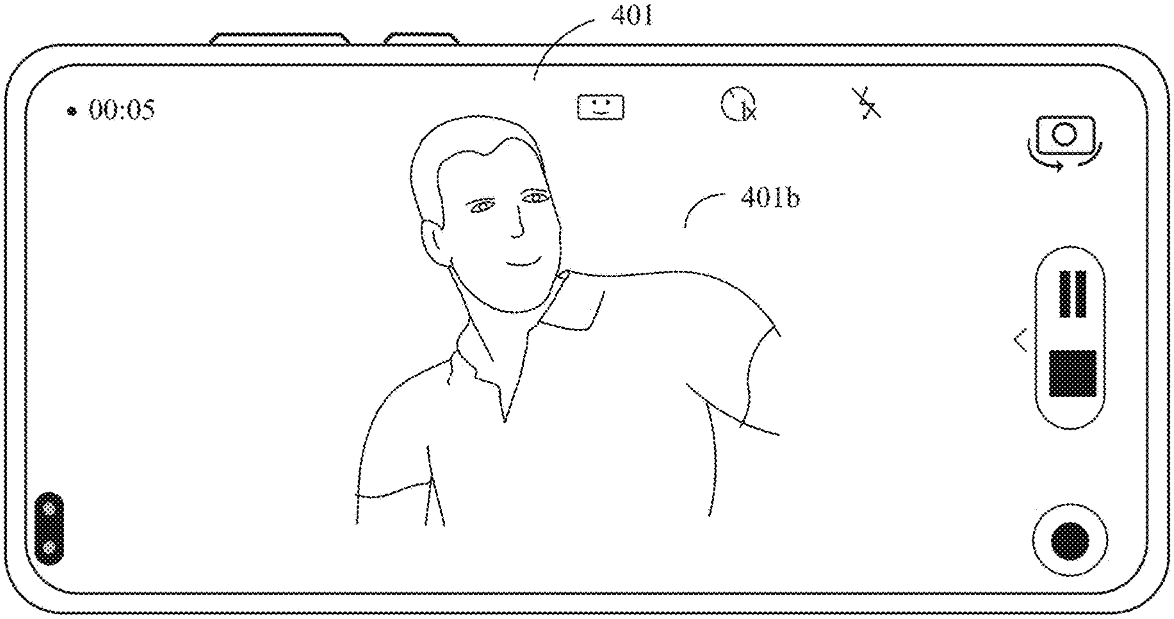

As shown in FIG. 6C, if the user wishes the electronic device to be switched from the front-facing and rear-facing photographing mode to the front-facing photographing mode, when the electronic device displays the photographing preview interface 401 shown in FIG. 6B, the user can face the display screen and enter a mid-air gesture (which may also be referred to as a second gesture) of "moving the palm from right to left". In response to detecting the mid-air gesture entered by the user (for example, the user faces the display screen and enters the mid-air gesture of "moving the palm from right to left"), the electronic device may switch the photographing mode from the front-facing and rear-facing photographing mode to the front-facing photographing mode. In a process of switching the photographing mode, as shown in FIG. 6D, the image 401*a* gradually decreases with the mid-air gesture of "moving the palm from right to left" until the image 401*a* disappears from the photographing preview interface, the image 401*b* gradually increases until the entire photographing preview interface is filled with the image 401*b*, and the photographing preview interface 401 shown in FIG. 6E is presented finally. As shown in FIG. 6E, after the electronic device is switched to the front-facing photographing mode, the image 401*b* collected by the front-facing camera may be displayed in the photographing preview interface 401. It should be noted that, when there are a plurality of front-facing cameras, a working front-facing camera may be a main front-facing camera of the electronic device by default.

It should be noted that, in the photographing preview interface 401 shown in FIG. 6C, a region in which the image 401*b* is located may be referred to as a first region, and a region in which the image 401*a* is located may be referred to as a second region. The first region and the second region do not overlap, and may constitute an entire region of the photographing preview interface 401. In the photographing preview interface 401 shown in FIG. 6E, a region in which the image 401*b* is located may be referred to as a third region, and the third region may include the first region and the second region. In addition, the image 401*a* may also be referred to as a second image, and is collected by the rear-facing camera in real time. The image 401*b* may also be referred to as a first image, and is collected by the front-facing camera in real time. In other words, the image 401*a* and the image 401*b* may change in real time, for example, the image 401*b* in FIG. 6A may be different from the image 401*b* in FIG. 6E, and is only used as an example in the figure.

Figure 6F:
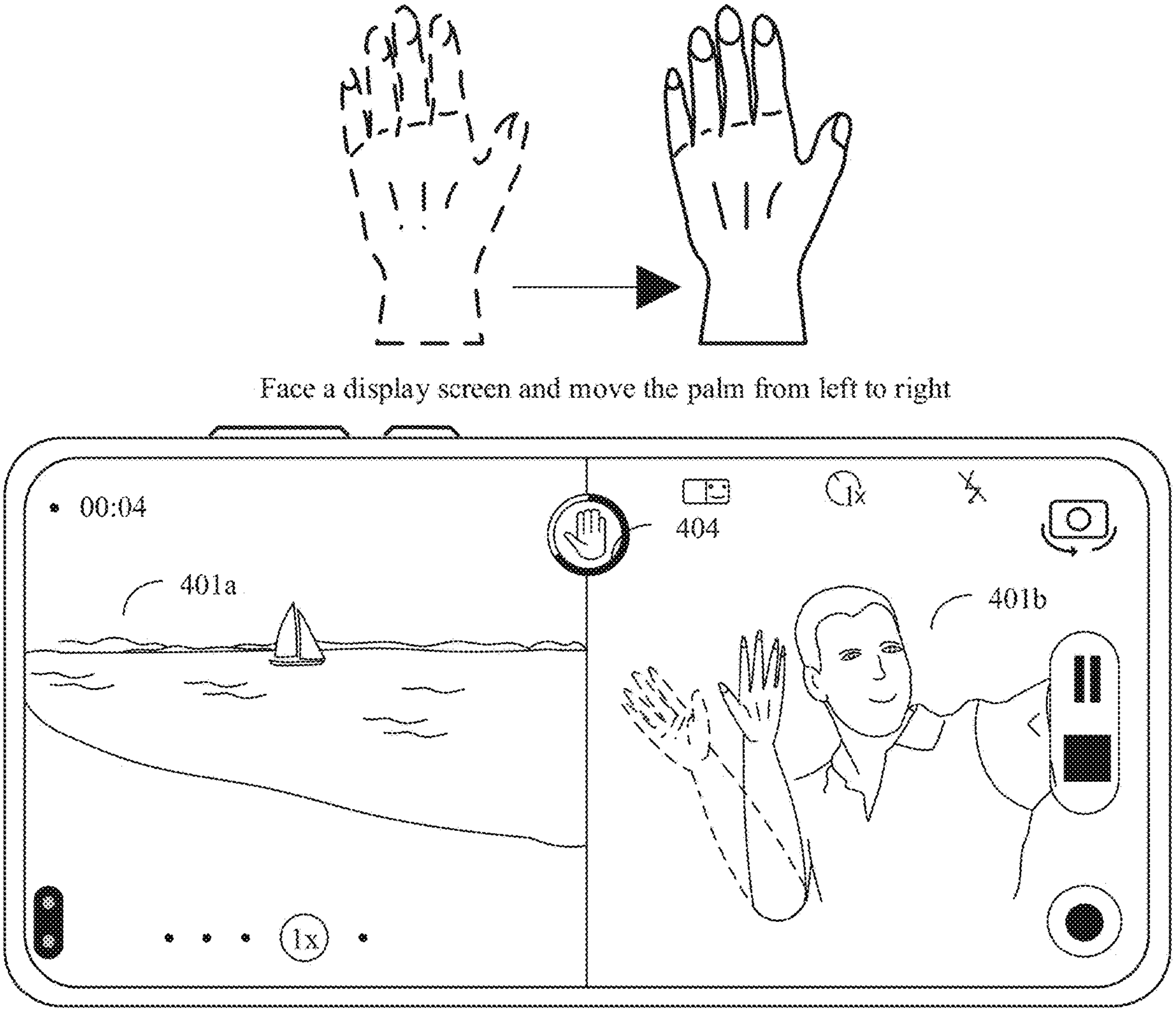
Figure 6G:
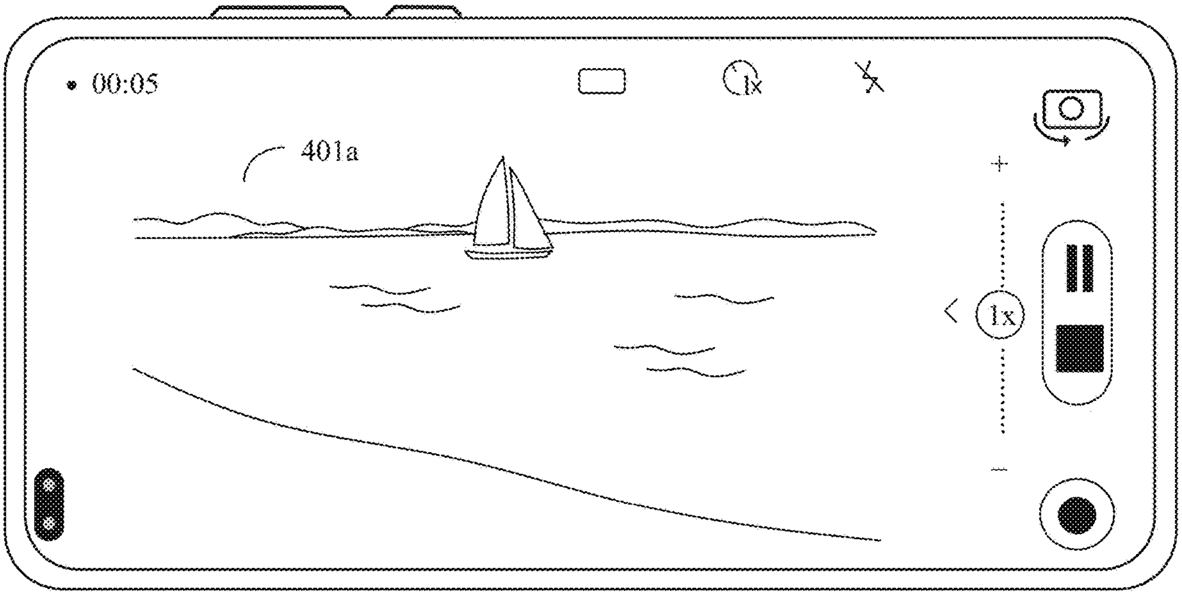

As shown in FIG. 6F, if the user wishes the electronic device to be switched from the front-facing and rear-facing photographing mode to the rear-facing photographing mode, when the electronic device displays the photographing preview interface 401 shown in FIG. 6B, the user can face the display screen and enter a mid-air gesture of "moving the palm from left to right". In response to detecting the mid-air gesture entered by the user, for example, the mid-air gesture of "moving the palm from left to right" entered by the user when facing the display screen, the electronic device may switch the photographing mode from the front-facing and rear-facing photographing mode to the rear-facing photographing mode, and display the photographing preview interface 401 shown in FIG. 6G. As shown in FIG. 6G, after the electronic device is switched to the rear-facing photographing mode, the image 401*a* collected by the rear-facing camera may be displayed in the photographing preview interface 401. It should be noted that, when there are a plurality of rear-facing cameras, a working rear-facing camera may be a main rear-facing camera of the electronic device by default.

The electronic device may be switched from a front-facing and rear-facing photographing mode to a picture-in-picture photographing mode. Based on the photographing scenarios shown in FIG. 6A-FIG. 6B, the following describes an interface used in a process in which the electronic device is switched from the front-facing and rear-facing photographing mode to the picture-in-picture photographing mode.

Figure 6H:
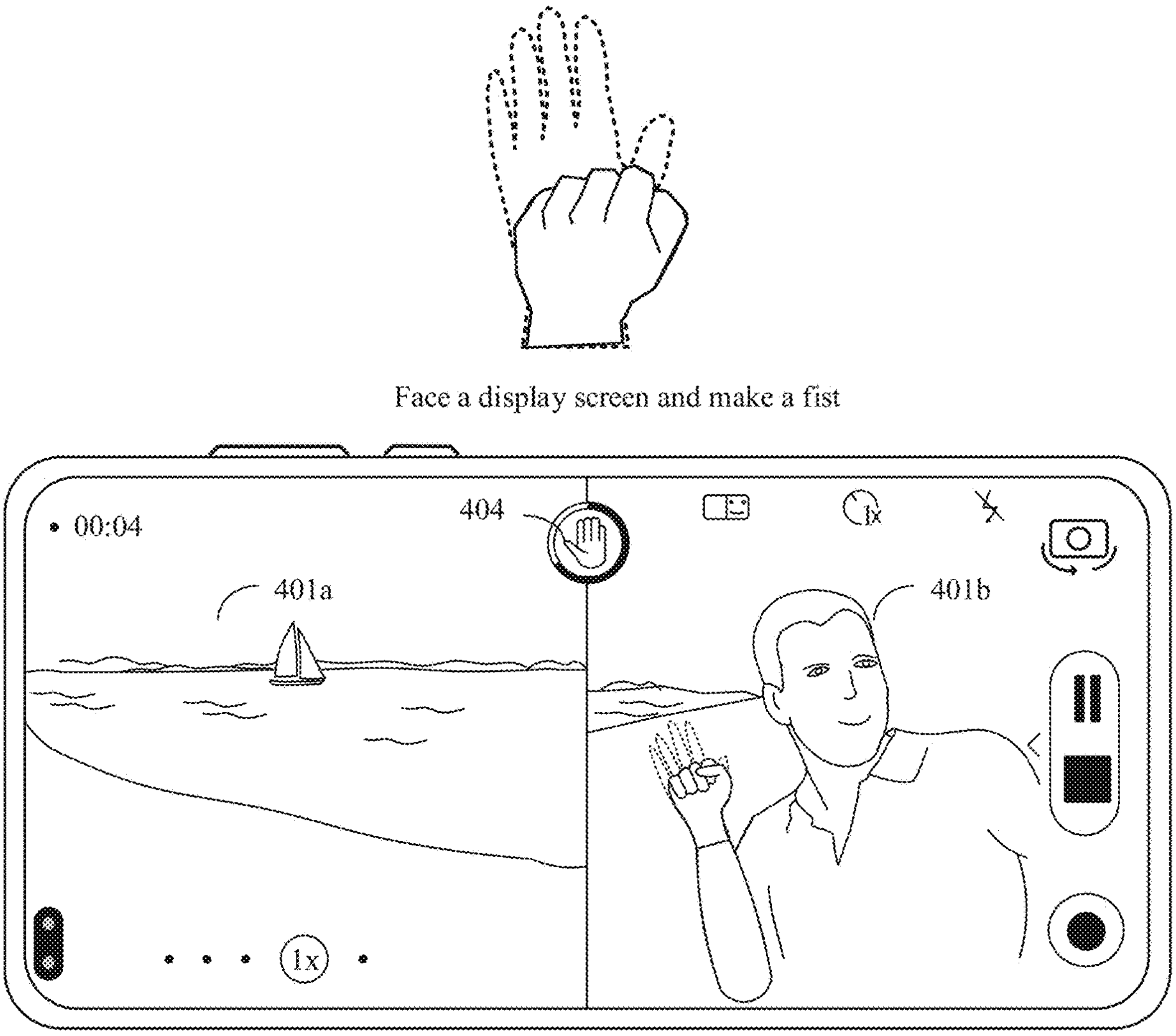
Figure 6I:
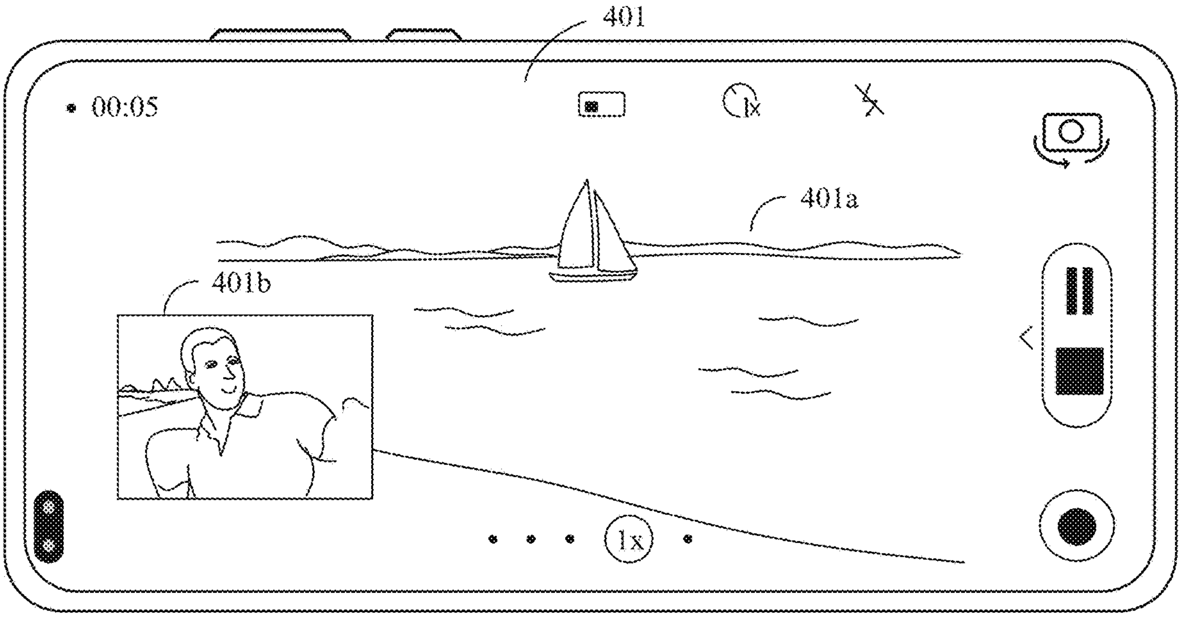

As shown in FIG. 6H, if the user wishes the electronic device to be switched from the front-facing and rear-facing photographing mode to the picture-in-picture photographing mode, when the electronic device displays the photographing preview interface 401 shown in FIG. 6B, the user can face the display screen and enter a mid-air gesture (which may also be referred to as a third gesture) of "holding out the palm and then making a fist". In response to detecting the mid-air gesture of "holding out the palm and then making a fist" entered by the user, the electronic device may switch the photographing mode from the front-facing and rear-facing photographing mode to the picture-in-picture photographing mode, and display the photographing preview interface 401 shown in FIG. 6I. As shown in FIG. 6I, after the electronic device is switched to the picture-in-picture photographing mode, the image 401*a* collected by the rear-facing camera and the image 401*b* collected by the front-facing camera may be displayed in the photographing preview interface 401 through picture-in-picture.

Specifically, the image 401*a* and the image 401*b* are displayed in the photographing preview interface 401. The image 401*b* is superimposed on the image 401*a* for display, and a display position of the image 401*a* is a position at which the entire photographing preview interface 401 is located. It should be noted that, when an image is displayed through picture-in-picture, a display position of the image 401*b* may be a default display position of the electronic device, that is, the lower left corner of the photographing preview interface 401, or a display position and a size of the image may be set by the user. For example, the electronic device may detect that the user acts on the image 401*b* and drags the image to adjust the display position of the image to any position in the photographing preview interfaces 401. For another example, the electronic device may detect that the user performs an operation of acting on the image 401*b* by using two fingers and pinching or stretching the image to enlarge or shrink the image 401*b*, that is, adjust a size of a display area of the image 401*b*. The display position and the size of the display area of the image 401*b* are not limited in this embodiment of this application. It should also be noted that, when an image is displayed through picture-in-picture, the electronic device superimposes, by default, the image collected by the front-facing camera on the image collected by the rear-facing camera. Certainly, positions of the two images can be replaced with each other, and a specific replacement manner thereof is described in detail later.

It should be noted that, in the photographing preview interface 401 shown in FIG. 6I, a region in which the image 401*b* is located may be referred to as a fourth region, a region in which the image 401*a* is located may be referred to as a fifth region, the fourth region is located in the fifth region, and the fifth region may include the first region and the second region.

The electronic device may also switch the display positions of the two images in the front-facing and rear-facing photographing mode. Based on the photographing scenarios shown in FIG. 6A-FIG. 6B, the following describes an interface used in a process in which the electronic device changes the positions of the two images in the front-facing and rear-facing photographing mode.

Figure 6J:
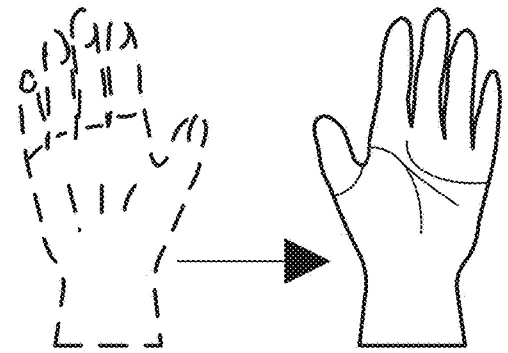
Figure 6J:
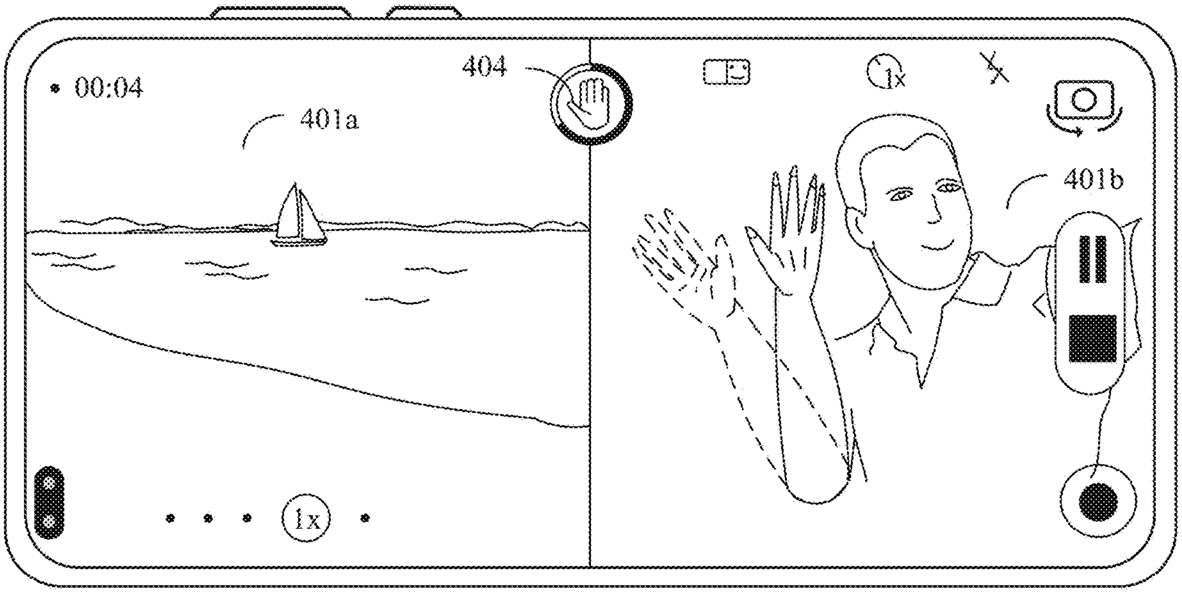
Figure 6K:
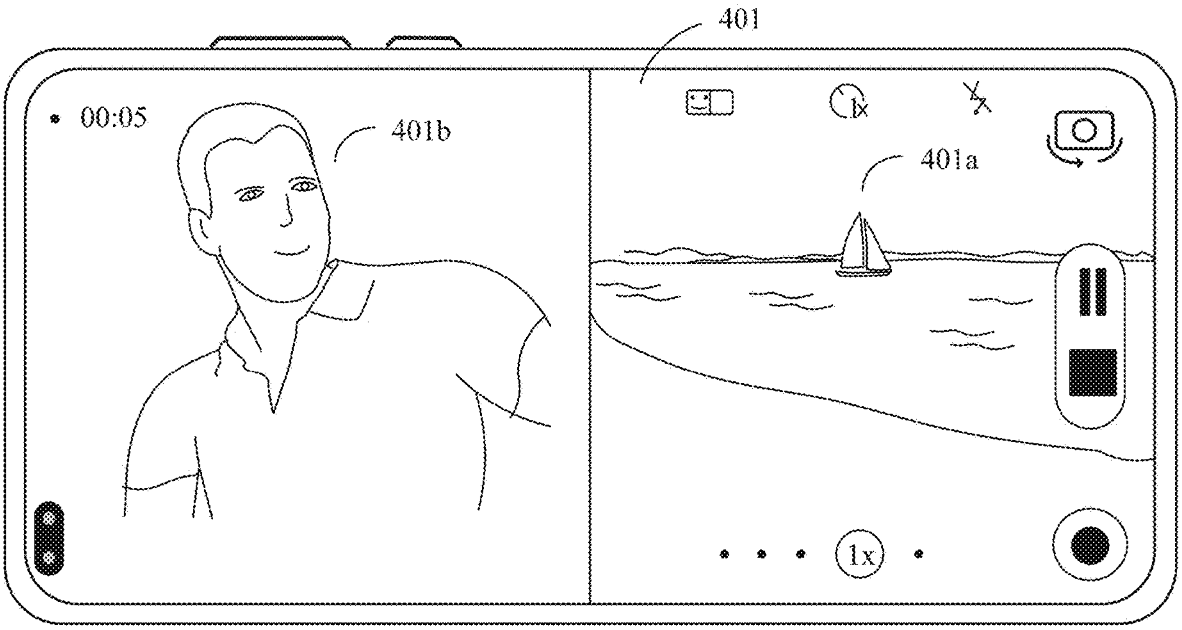

As shown in FIG. 6J, if the user wishes to switch the display positions of the images, when the electronic device displays the photographing preview interface 401 shown in FIG. 6B, the user can face the display screen and enter a mid-air gesture (which may also be referred to as a fifth gesture) of "turning the palm over to the back of the hand". In response to detecting the mid-air gesture of "turning the palm over to the back of the hand" entered by the user, the electronic device may switch the display positions of the images, and display the photographing preview interface 401 shown in FIG. 6K. As shown in FIG. 6K, after the electronic device switches the display positions of the images, positions of the image 401*a* and the image 401*b* are interchanged, that is, the position of the image 401*a* changes from the original left of the screen to the right of the screen, and the position of the image 401*b* changes from the original right of the screen to the left of the screen.

The electronic device may also be switched from the front-facing photographing mode or the rear-facing photographing mode to another photographing mode. The following describes, by using an example in which the electronic device is in the front-facing photographing mode, a series of interfaces existing when the electronic device is switched from the front-facing photographing mode to the another photographing mode.

Figure 7A:
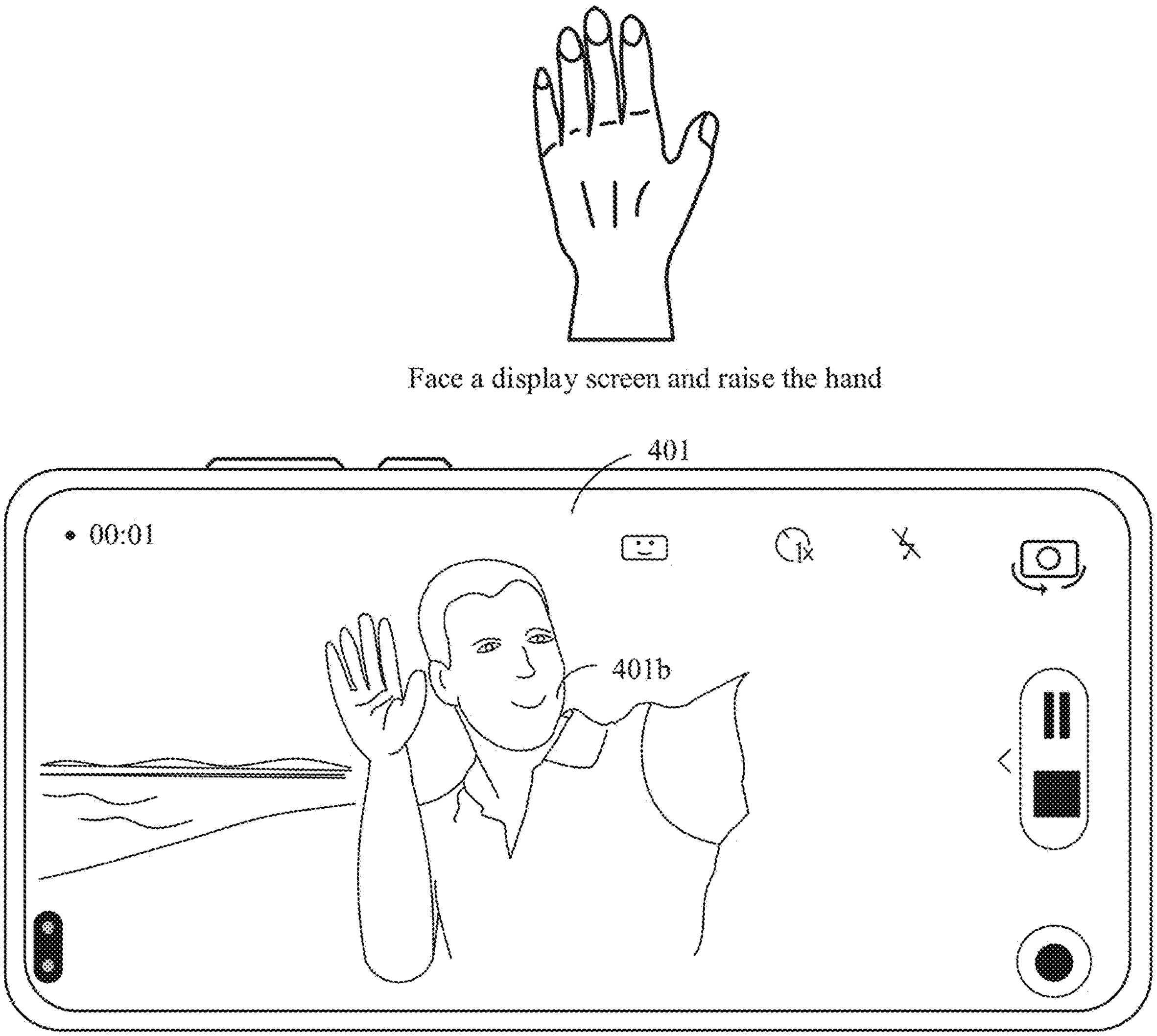
FIG. 7A-FIG. 7H are schematic diagrams of another group of interfaces according to an embodiment of this application.

FIG. 7A shows a photographing preview interface 401 existing when the electronic device is in the front-facing photographing mode. The photographing preview interface 401 is similar to the photographing preview interface 401 shown in FIG. 6E. Details are not described herein again.

Figure 7B:
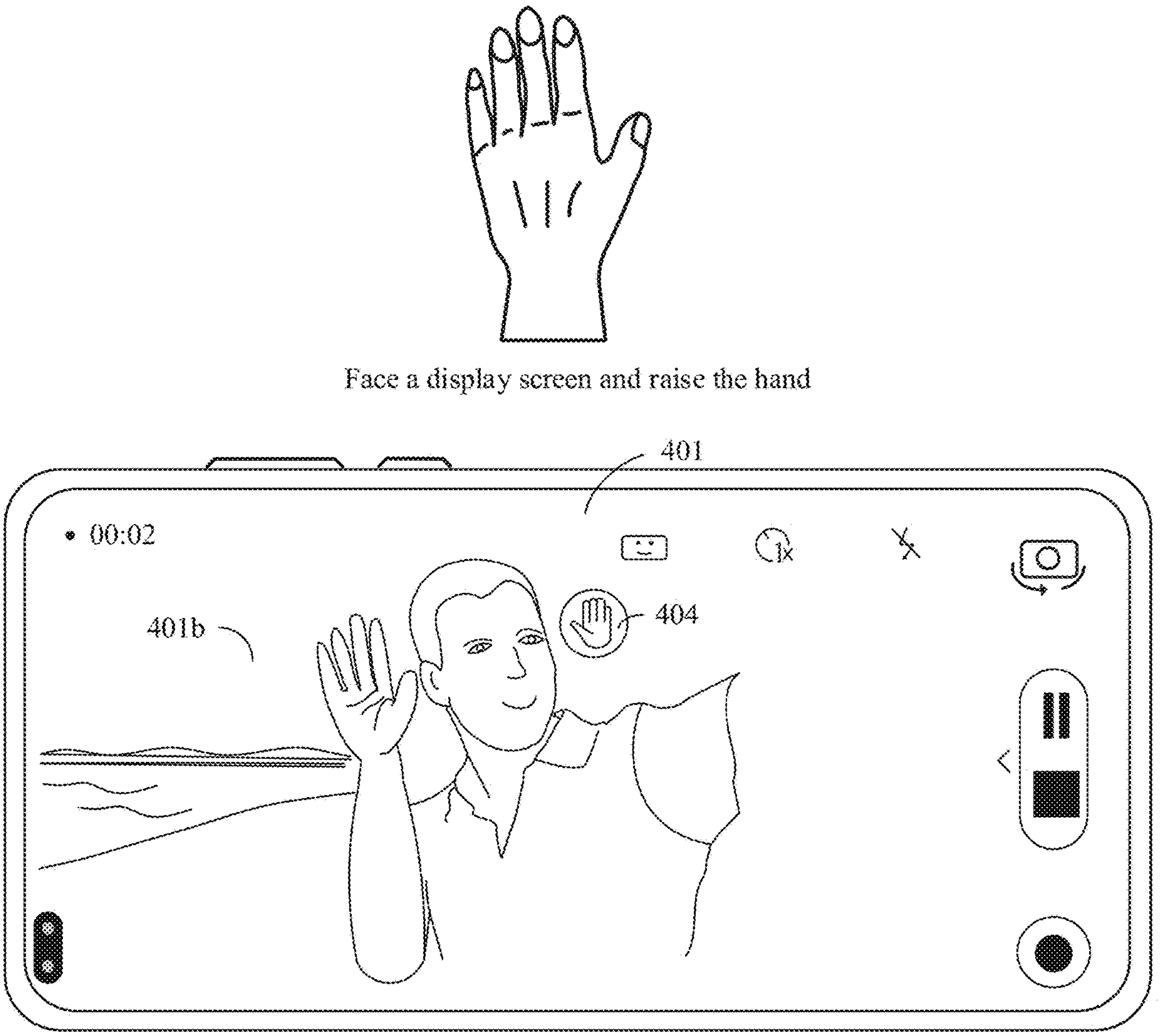

As shown in FIG. 7A, if the user wishes to switch the photographing mode of the electronic device, the user can first face the electronic device and enter a mid-air gesture, for example, enter a mid-air gesture of "raising the hand". The electronic device may collect, by using the front-facing camera, an image (that is, the image 401*b*) used to identify the mid-air gesture entered by the user, and display the image in the photographing preview interface 401. In addition, the electronic device may further perform analysis processing on the collected image 401*b*, and when identifying the mid-air gesture of "raising the hand", display the photographing preview interface 401 shown in FIG. 7B. The photographing preview interface 401 shown in FIG. 7B is similar to the photographing preview interface 401 shown in FIG. 7A. A difference lies in that the photographing preview interface 401 shown in FIG. 7B includes prompt information 404. For related descriptions of the prompt information 404, refer to the foregoing descriptions. Details are not described herein again.

In the photographing preview interface 401 shown in FIG. 7B, the user may input different mid-air gestures to switch the photographing mode of the electronic device, for example, control the electronic device to switch the photographing mode form the front-facing photographing mode to the rear-facing photographing mode, the front-facing and rear-facing photographing mode, or the picture-in-picture photographing mode.

The electronic device may be switched from the front-facing photographing mode to the rear-facing photographing mode. Based on the photographing scenarios shown in FIG. 7A-FIG. 7B, the following describes an interface used in which the electronic device is switched from the front-facing photographing mode to the rear-facing photographing mode.

Figure 7C:
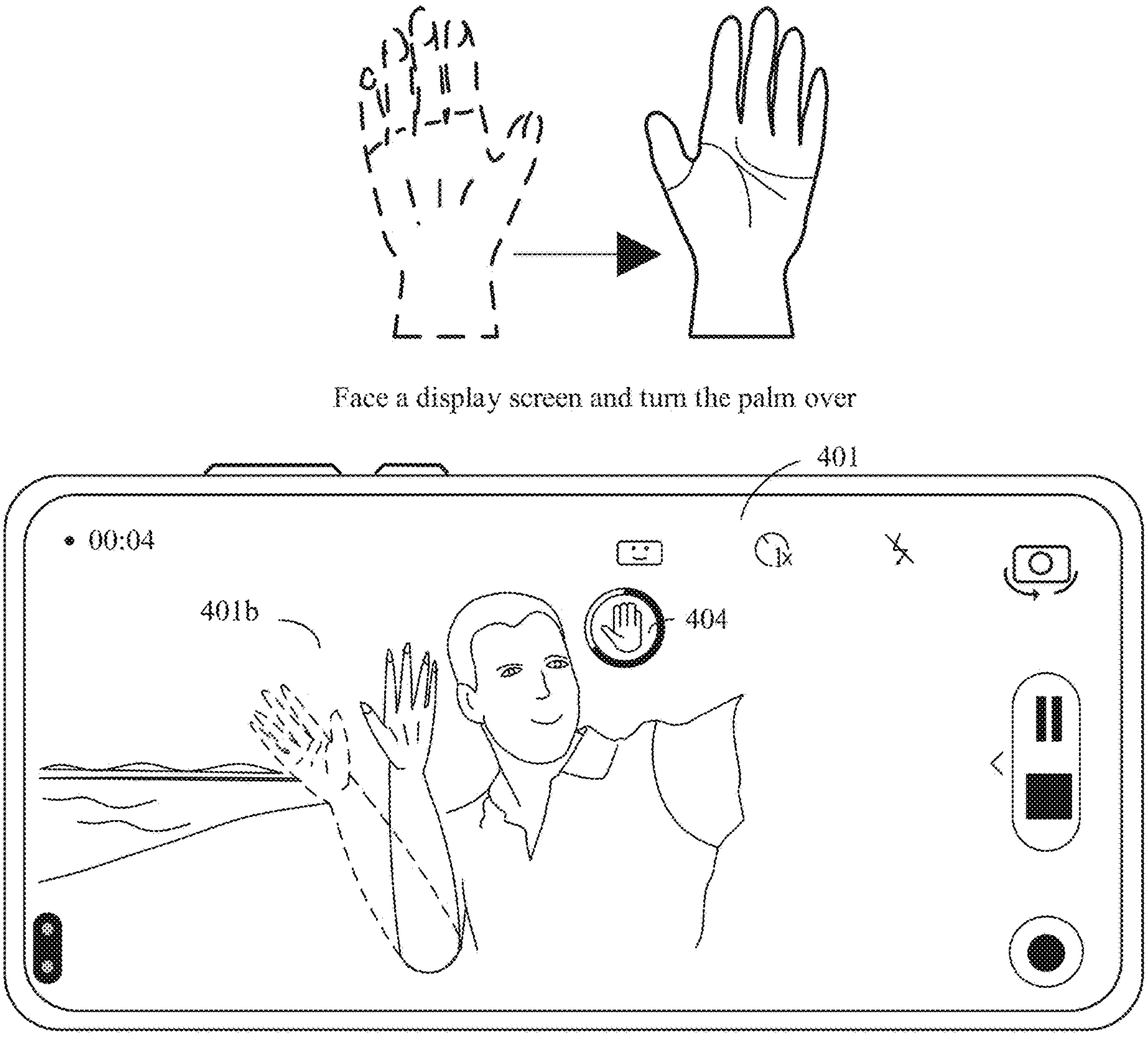
Figure 7D:
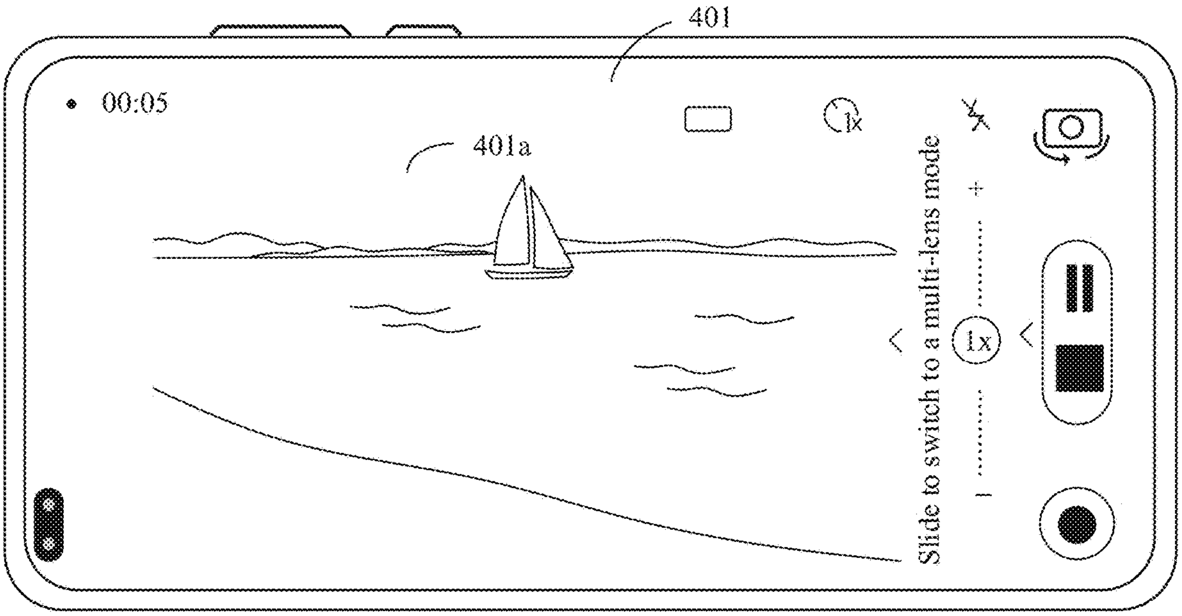

As shown in FIG. 7C, if the user wishes the electronic device to be switched from the front-facing photographing mode to the rear-facing photographing mode, when the electronic device displays the photographing preview interface 401 shown in FIG. 7B, the user can face the display screen and enter a mid-air gesture (which may also be referred to as a fifth gesture) of "turning the palm over to the back of the hand". In response to detecting the mid-air gesture of "turning the palm over to the back of the hand" of the user, the electronic device may switch the photographing mode from the front-facing photographing mode to the rear-facing photographing mode, and display the photographing preview interface 401 shown in FIG. 7D. As shown in FIG. 7D, after the electronic device is switched to the rear-facing photographing mode, the image 401*a* collected by the rear-facing camera may be displayed in the photographing preview interface 401.

It can be understood that the foregoing mid-air gesture of "turning the palm over to the back of the hand" may also be used to switch the electronic device from the rear-facing photographing mode to the front-facing photographing mode, and a specific process thereof is similar to a process of switching the electronic device from the front-facing photographing mode to the rear-facing photographing mode. Details are not described herein again.

The electronic device may be switched from the front-facing photographing mode to the front-facing and rear-facing photographing mode. Based on the photographing scenarios shown in FIG. 7A-FIG. 7B, the following describes an interface used in a process in which the electronic device is switched from the front-facing photographing mode to the front-facing and rear-facing photographing mode.

Figure 7E:
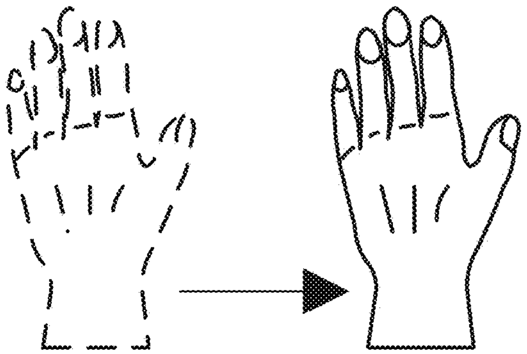
Figure 7E:
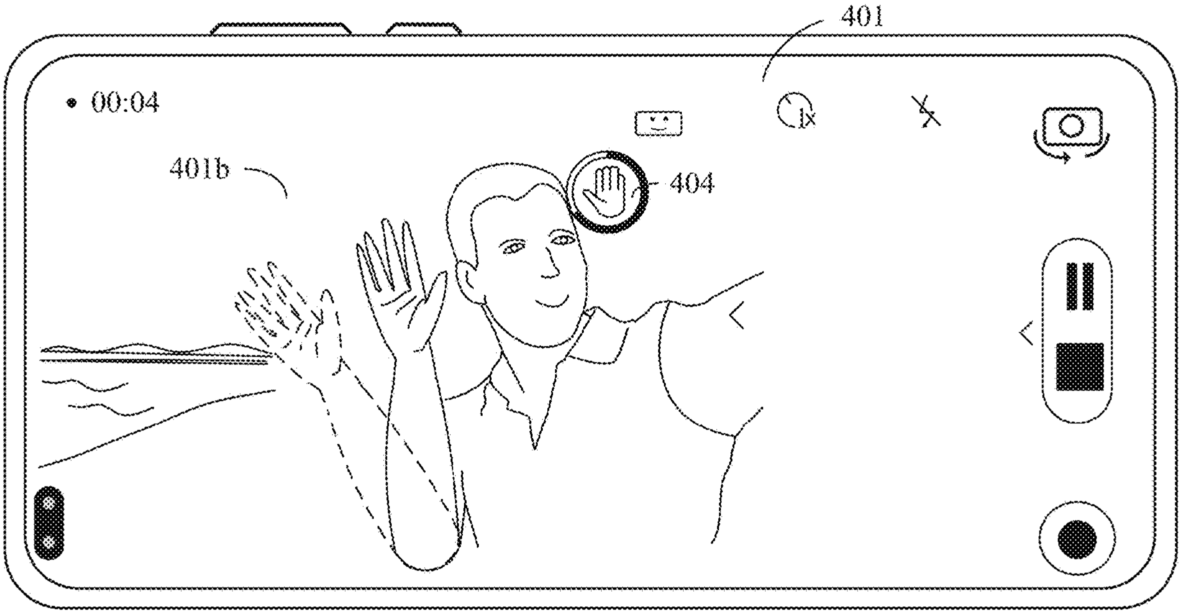
Figure 7F:
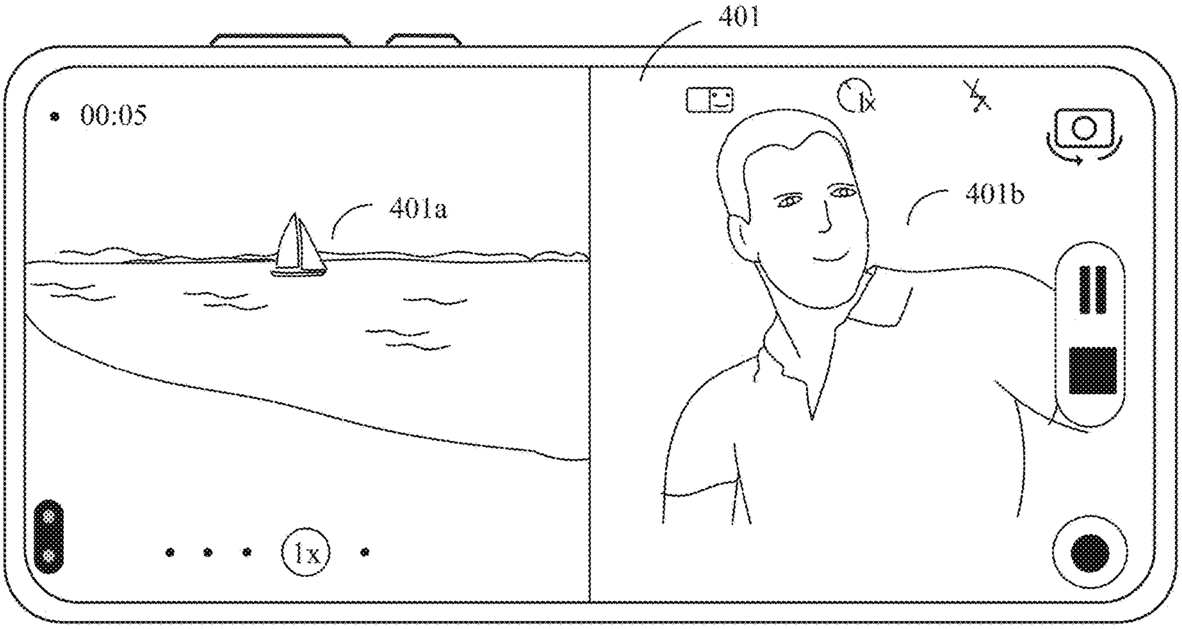

As shown in FIG. 7E, if the user wishes the electronic device to be switched from the front-facing photographing mode to the front-facing and rear-facing photographing mode, when the electronic device displays the photographing preview interface 401 shown in FIG. 7B, the user can face the display screen and enter a mid-air gesture of "moving the palm from left to right". In response to detecting the mid-air gesture of "moving the palm from left to right" entered by the user, the electronic device may switch the photographing mode from the front-facing photographing mode to the front-facing and rear-facing photographing mode, and display the photographing preview interface 401 shown in FIG. 7F. As shown in FIG. 7F, after the electronic device is switched to the front-facing and rear-facing photographing mode, the image 401*a* collected by the rear-facing camera and the image 401*b* collected by the front-facing camera may be simultaneously displayed in the photographing preview interface 401. The user enters the mid-air gesture of "moving the palm from left to right", and the gesture is equivalent to compressing the image 401*b* from left to right. Therefore, the image 401*b* is located on the right of the photographing preview interface 401, and the image 401*a* is located on the left of the photographing preview interface 401.

It should be noted that the user may alternatively face the display screen and enter a mid-air gesture of "moving the palm from right to left", and the mid-air gesture may also be used to switch the electronic device from the front-facing photographing mode to the front-facing and rear-facing photographing mode. Different from the photographing preview interface 401 shown in FIG. 7F, if the user faces the display screen and enters the mid-air gesture of "moving the palm from right to left", in the photographing preview interface existing after the electronic device is switched to the front-facing and rear-facing photographing mode, the image 401*b* is located on the left of the photographing preview interface 401, and the image 401*a* is located on the right of the photographing preview interface 401.

The electronic device may also be switched from the front-facing photographing mode to the picture-in-picture photographing mode. Based on the photographing scenarios shown in FIG. 7A-FIG. 7B, the following describes an interface used in a process in which the electronic device is switched from the front-facing photographing mode to the picture-in-picture photographing mode.

Figure 7G:
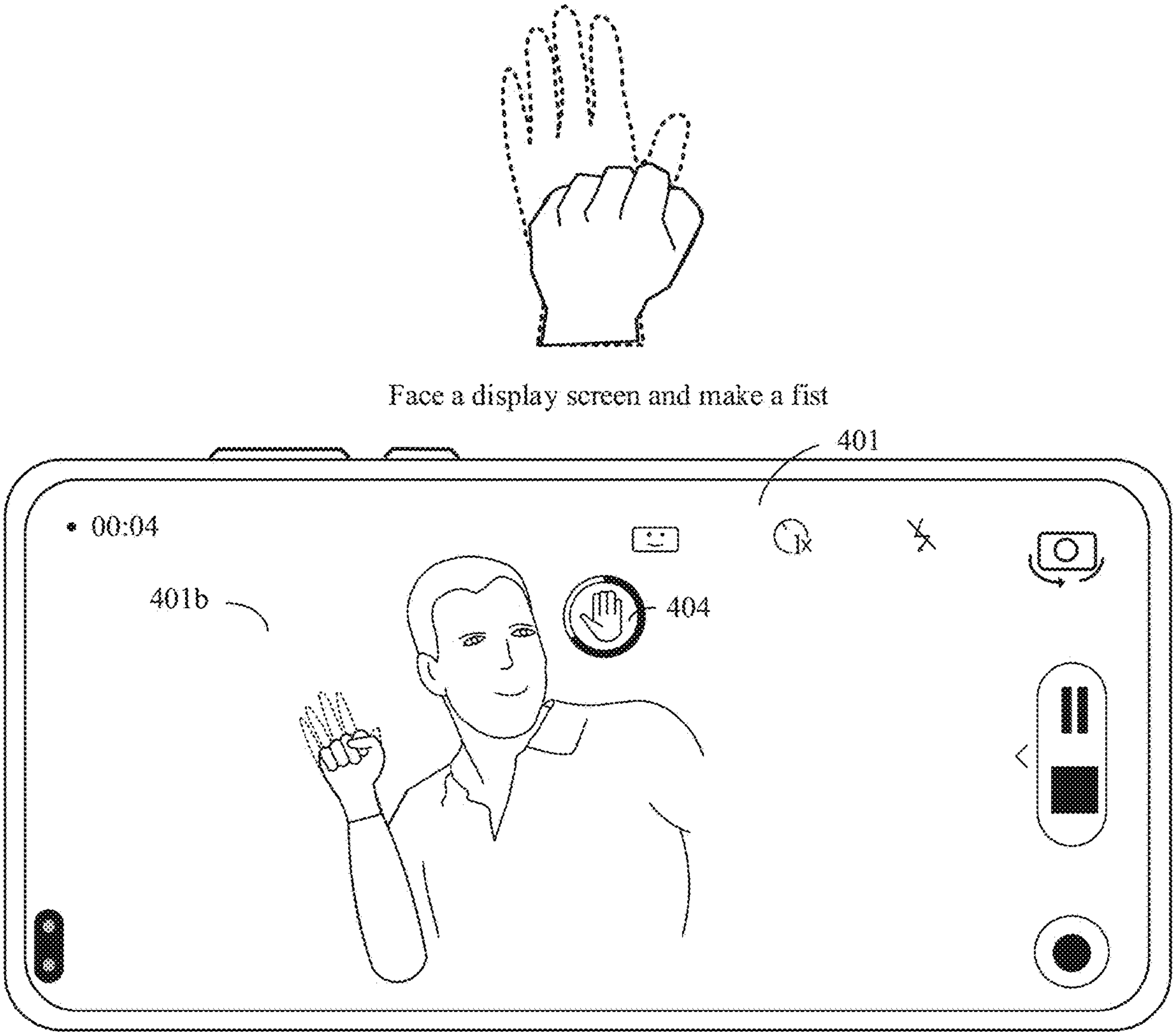
Figure 7H:
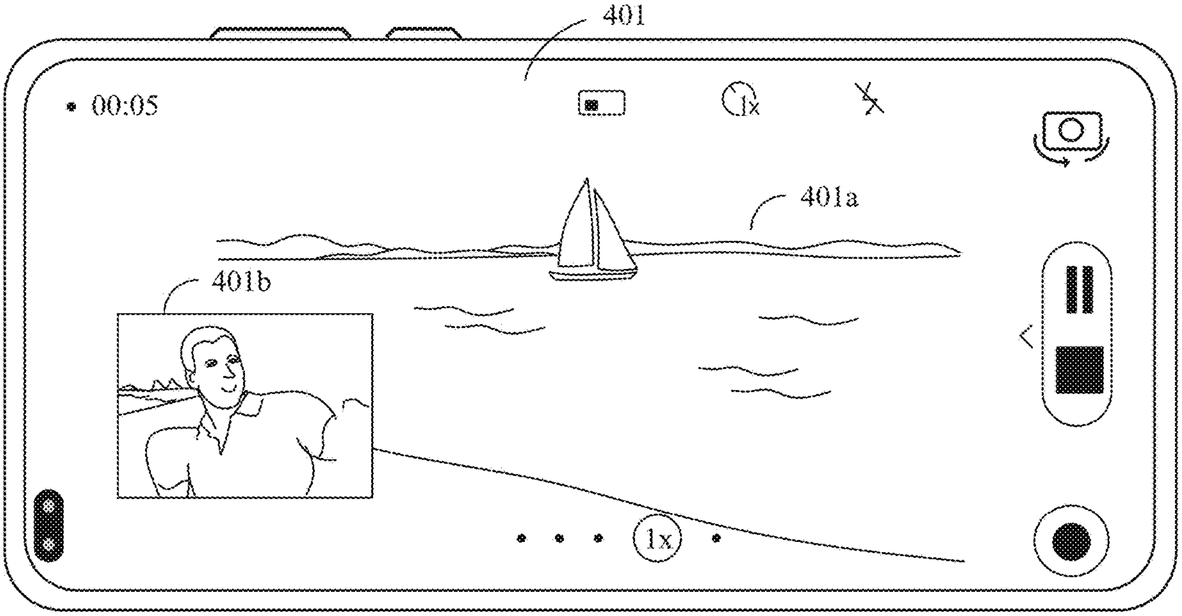

As shown in FIG. 7G, if the user wishes the electronic device to be switched from the front-facing photographing mode to the picture-in-picture photographing mode, when the electronic device displays the photographing preview interface 401 shown in FIG. 7B, the user can face the display screen and enter a mid-air gesture of "holding out the palm and then making a fist". In response to detecting the mid-air gesture of "holding out the palm and then making a fist" entered by the user, the electronic device may switch the photographing mode from the front-facing photographing mode to the picture-in-picture photographing mode, and display the photographing preview interface 401 shown in FIG. 7H. As shown in FIG. 7H, after the electronic device is switched to the picture-in-picture photographing mode, the image 401*a* collected by the rear-facing camera and the image 401*b* collected by the front-facing camera may be simultaneously displayed in the photographing preview interface 401. The image 401*b* is superimposed on the image 401*a* for display, and a display position of the image 401*a* is a position at which the entire photographing preview interface 401 is located.

The electronic device may also be switched from the picture-in-picture photographing mode to another photographing mode, and the following describes the process in detail with reference to the accompanying drawings.

Figure 8A:
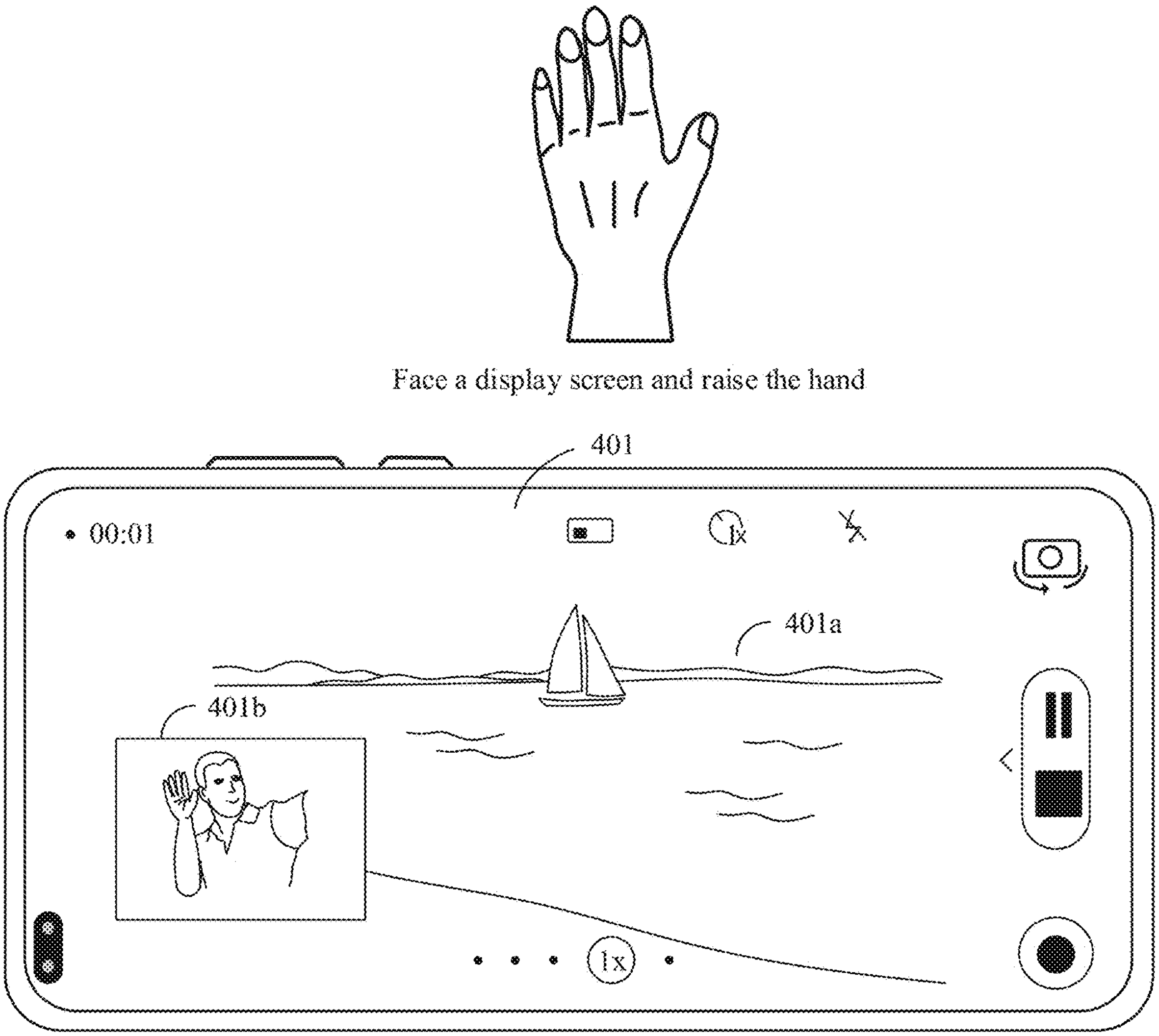
FIG. 8A-FIG. 8H are schematic diagrams of another group of interfaces according to an embodiment of this application.

FIG. 8A shows a photographing preview interface 401 existing when the electronic device is in the picture-in-picture photographing mode. The photographing preview interface 401 is similar to the photographing preview interface 401 shown in FIG. 7H. Details are not described herein again. Alternatively, it can be understood that the user directly enters a mid-air gesture in the photographing preview interface 401 shown in FIG. 7H.

Figure 8B:
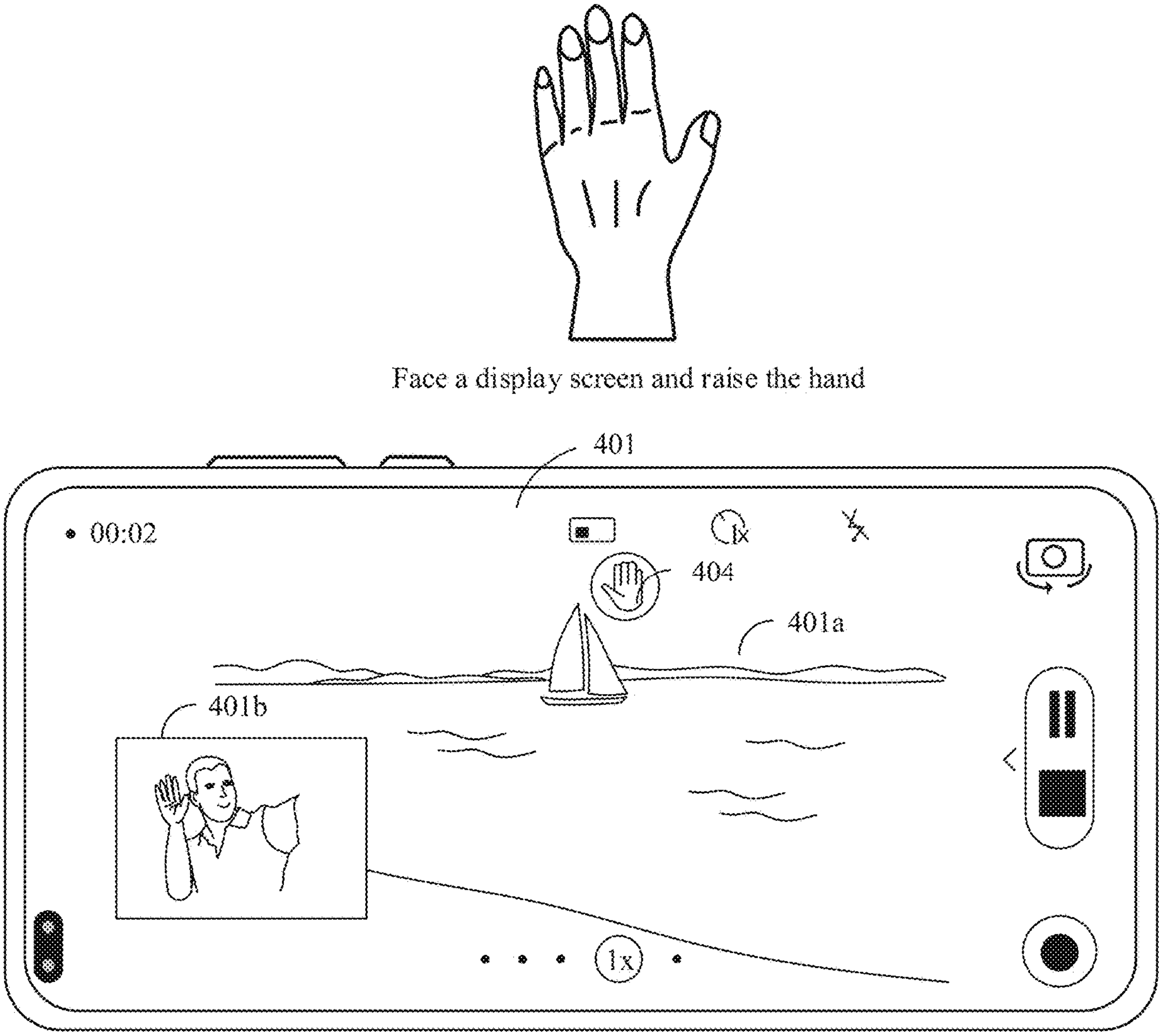

As shown in FIG. 8A, if the user wishes to switch the photographing mode of the electronic device, the user can first face the electronic device and enter a mid-air gesture, for example, enter a mid-air gesture of "raising the hand". The electronic device may collect, by using the front-facing camera, an image (that is, the image 401*b*) used to identify the mid-air gesture entered by the user, and display the image in the photographing preview interface 401. In addition, the electronic device may further perform analysis processing on the collected image 401*b*, and when identifying the mid-air gesture of "raising the hand", display the photographing preview interface 401 shown in FIG. 8B. The photographing preview interface 401 shown in FIG. 8B is similar to the photographing preview interface 401 shown in FIG. 8A. A difference lies in that the photographing preview interface 401 shown in FIG. 8B includes prompt information 404. For related descriptions of the prompt information 404, refer to the foregoing descriptions. Details are not described herein again.

In the photographing preview interface 401 shown in FIG. 8B, the user may enter different mid-air gestures to switch the photographing mode of the electronic device, for example, control the electronic device to switch the photographing mode form the picture-in-picture photographing mode to the rear-facing photographing mode or the front-facing and rear-facing photographing mode.

The electronic device may be switched from the picture-in-picture photographing mode to the rear-facing photographing mode. Based on the photographing scenarios shown in FIG. 8A-FIG. 8B, the following describes an interface used in a process in which the electronic device is switched from the picture-in-picture photographing mode to the rear-facing photographing mode.

Figure 8C:
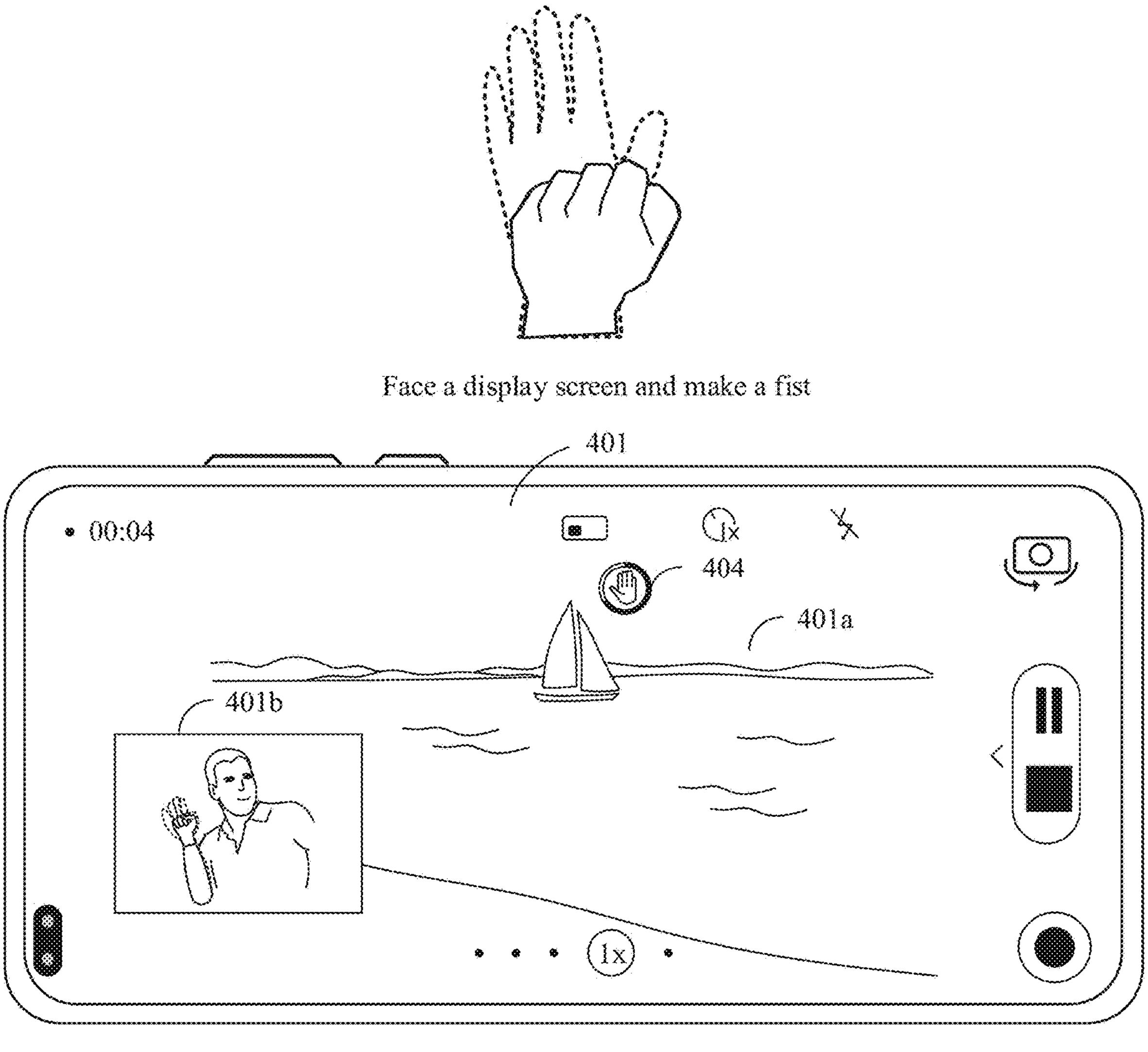
Figure 8D:
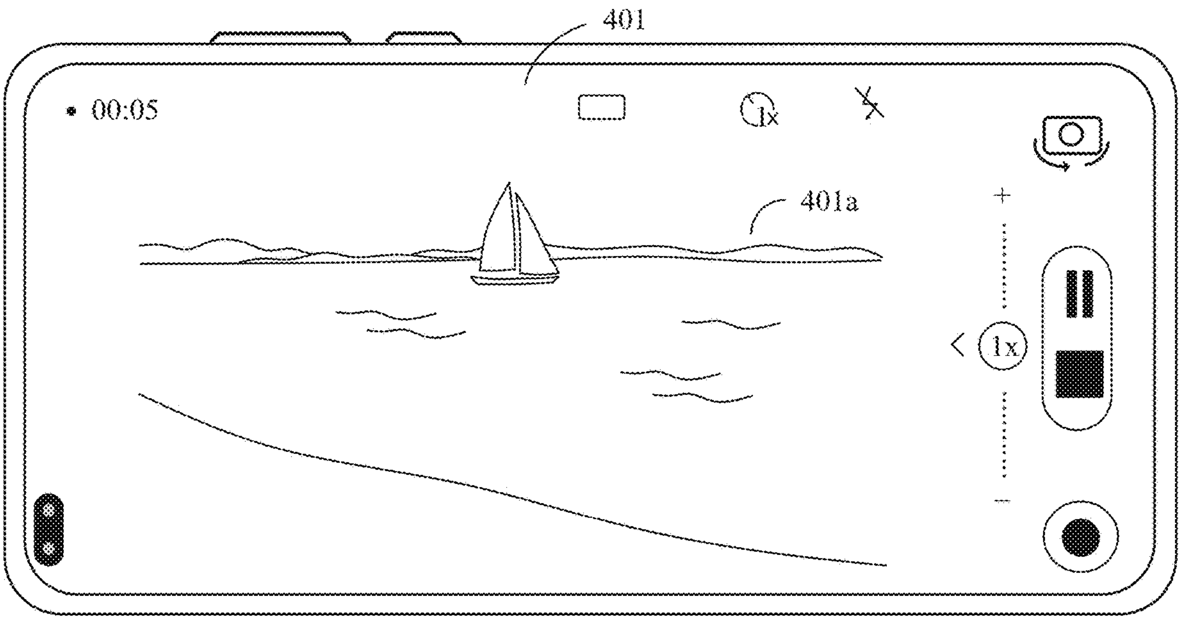

As shown in FIG. 8C, if the user wishes the electronic device to be switched from the picture-in-picture photographing mode to the rear-facing photographing mode, when the electronic device displays the photographing preview interface 401 shown in FIG. 8B, the user can face the display screen and enter a mid-air gesture (which may also be referred to as a second gesture) of "holding out the palm and then making a fist". In response to detecting the mid-air gesture of "holding out the palm and then making a fist" of the user, the electronic device may switch the photographing mode from the picture-in-picture photographing mode to the rear-facing photographing mode, and display the photographing preview interface 401 shown in FIG. 8D. As shown in FIG. 8D, after the electronic device enters the rear-facing photographing mode, the image 401*b* collected by the front-facing camera may not be displayed any longer, and only the image 401*a* collected by the rear-facing camera is displayed.

The electronic device may be switched from the picture-in-picture photographing mode to the front-facing and rear-facing photographing mode. Based on the photographing scenarios shown in FIG. 8A-FIG. 8B, the following describes an interface used in a process in which the electronic device is switched from the picture-in-picture photographing mode to the front-facing and rear-facing photographing mode.

Figure 8E:
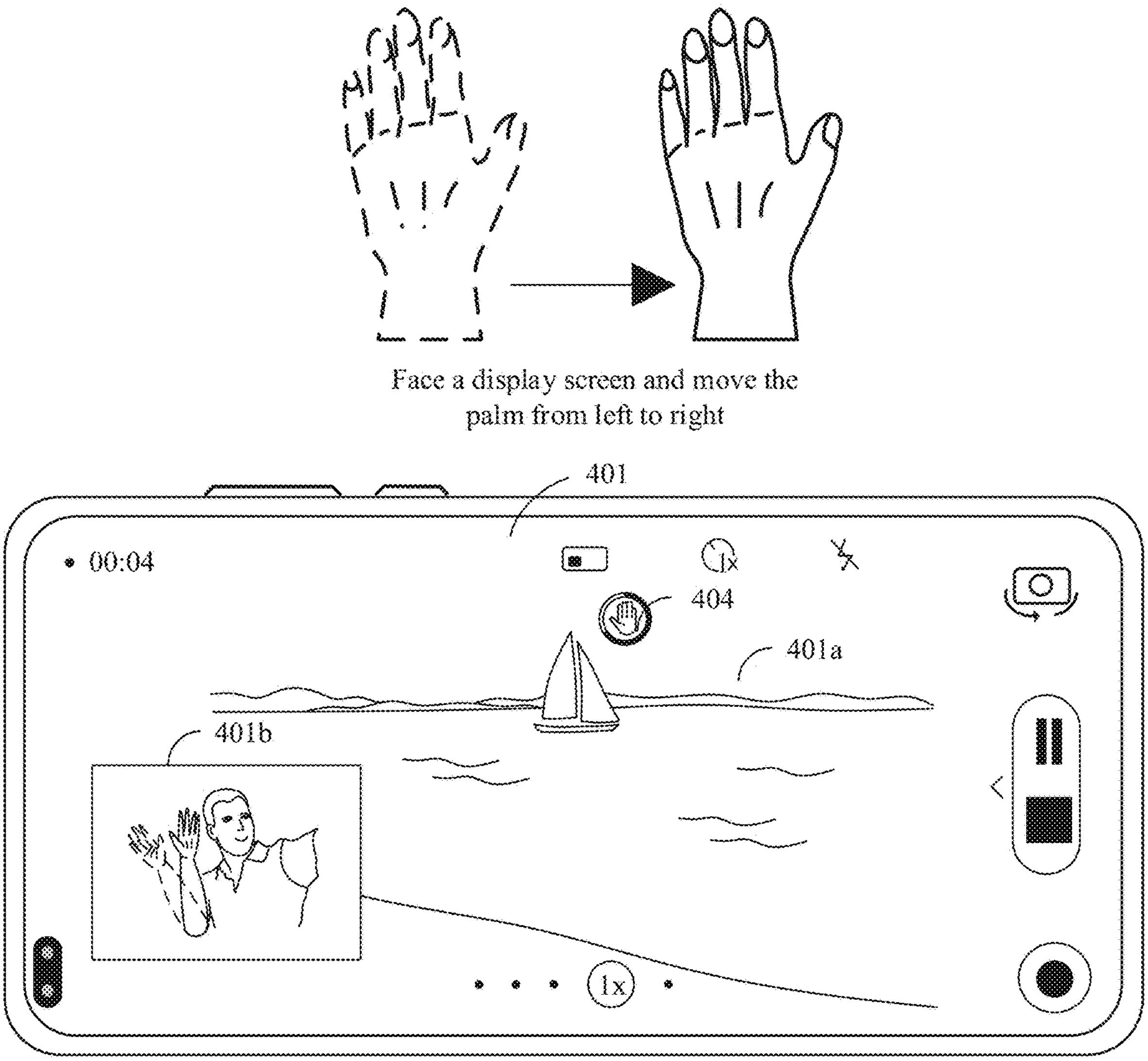
Figure 8F:
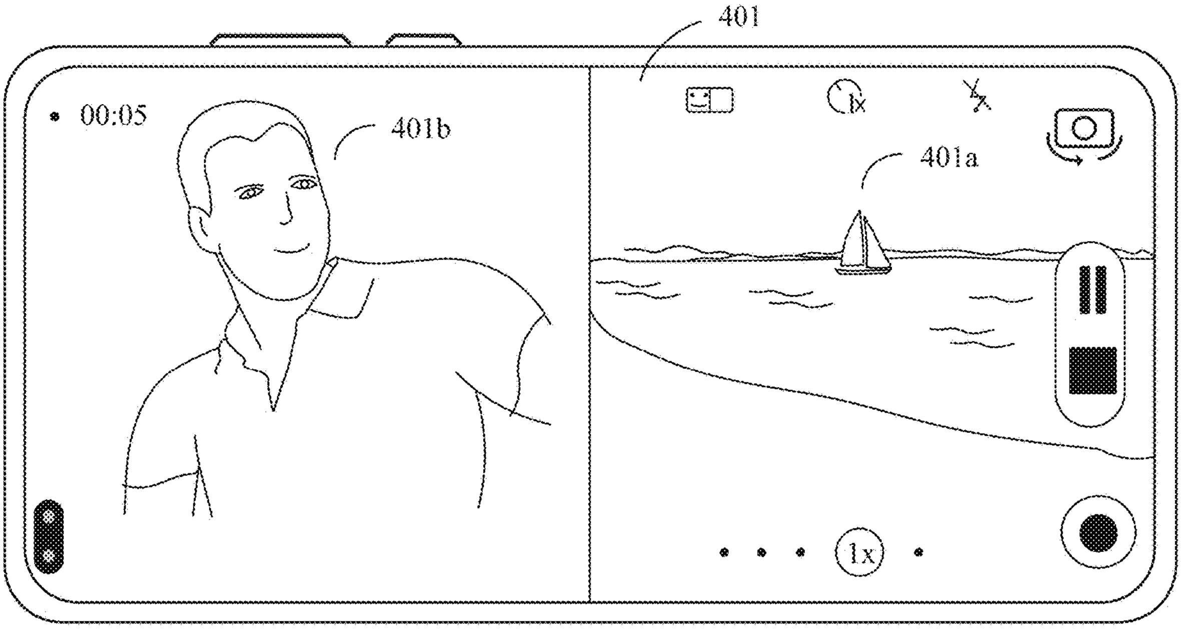

As shown in FIG. 8E, if the user wishes the electronic device to be switched from the picture-in-picture photographing mode to the front-facing and rear-facing photographing mode, when the electronic device displays the photographing preview interface 401 shown in FIG. 8B, the user can face the display screen and enter a mid-air gesture (which may also be referred to as a fourth gesture) of "moving the palm from left to right". In response to detecting the mid-air gesture of "moving the palm from left to right" entered by the user, the electronic device may switch the photographing mode from the picture-in-picture photographing mode to the front-facing and rear-facing photographing mode, and display the photographing preview interface 401 shown in FIG. 8F. As shown in FIG. 8F, after the electronic device is switched to the front-facing and rear-facing photographing mode, the image 401*a* collected by the rear-facing camera and the image 401*b* collected by the front-facing camera may be simultaneously displayed in the photographing preview interface 401. Because the user enters the mid-air gesture of "moving the palm from left to right", the image 401*b* is located on the right of the photographing preview interface 401, and the image 401*a* is located on the left of the photographing preview interface 401.

The user may alternatively face the display screen and enter a mid-air gesture of "moving the palm from right to left", and the mid-air gesture may also be used to switch the electronic device from the picture-in-picture photographing mode to the front-facing and rear-facing photographing mode. Different from the photographing preview interface 401 shown in FIG. 8F, if the user faces the display screen and enters the mid-air gesture of "moving the palm from right to left", in the photographing preview interface existing after the electronic device is switched to the front-facing and rear-facing photographing mode, the image 401*b* is located on the left of the photographing preview interface 401, and the image 401*a* is located on the right of the photographing preview interface 401.

The electronic device may also switch the display positions of the two images in the picture-in-picture mode. Based on the photographing scenarios shown in FIG. 8A-FIG. 8B, the following describes an interface used in a process in which the electronic device changes the positions of the two images in the picture-in-picture mode.

Figure 8G:
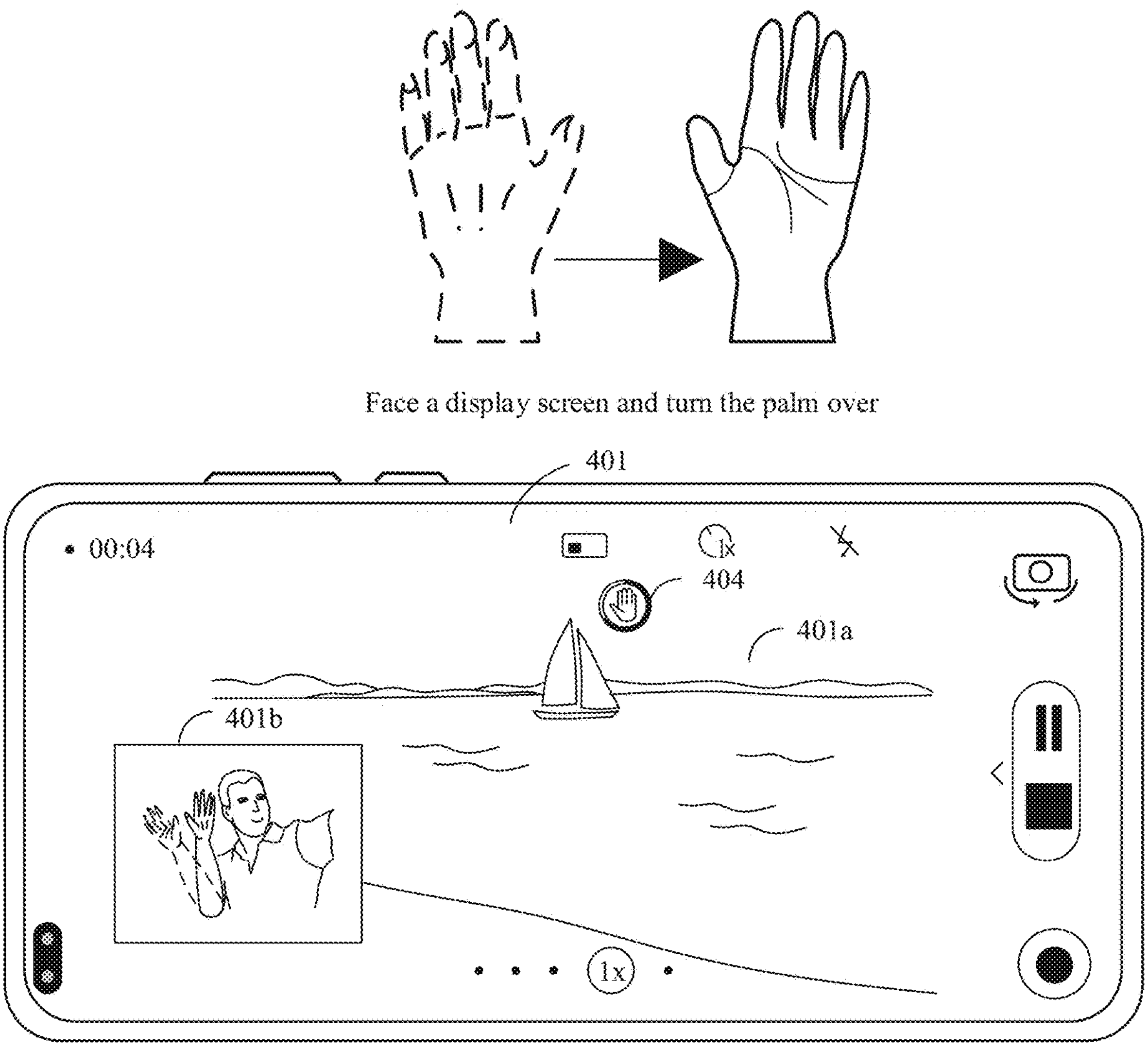
Figure 8H:
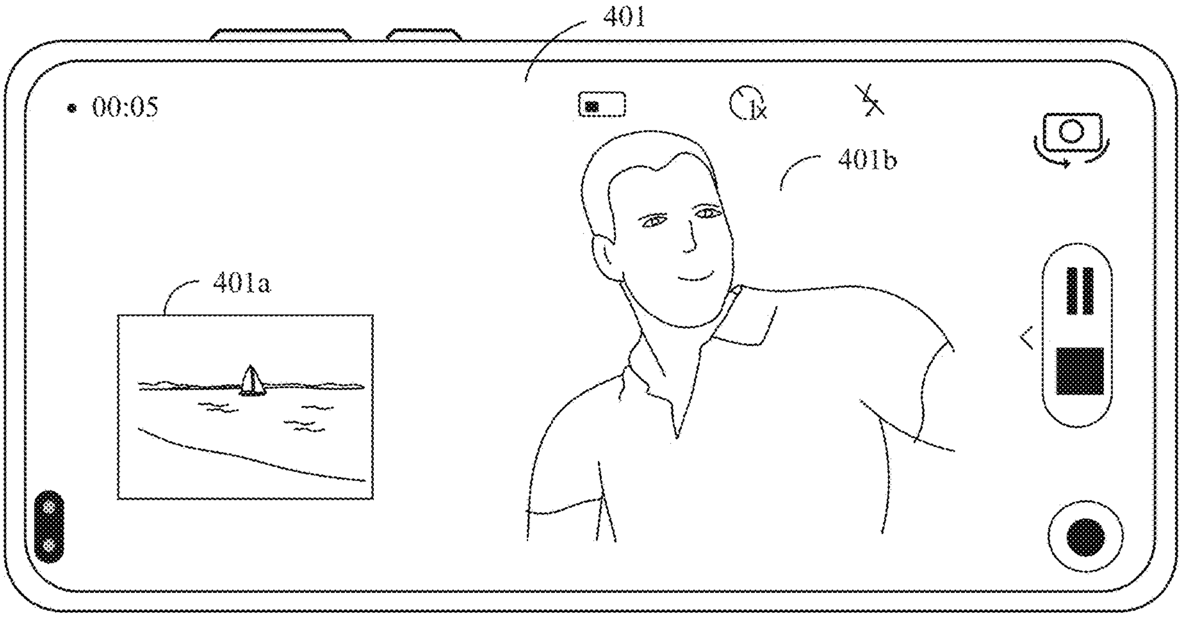

As shown in FIG. 8G, if the user wishes to switch the display positions of the images, when the electronic device displays the photographing preview interface 401 shown in FIG. 8B, the user can face the display screen and enter a mid-air gesture of "turning the palm over to the back of the hand". In response to detecting the mid-air gesture of "turning the palm over to the back of the hand" entered by the user, the electronic device may switch the display positions of the images, and display the photographing preview interface 401 shown in FIG. 8H. As shown in FIG. 8H, after the electronic device switches the display positions of the images, positions of the image 401*a* and the image 401*b* are interchanged, that is, the image 401*a* changes from being originally displayed in the entire region of the photographing preview interface 401 to being superimposed on the image 401*b*, and the image 401*b* changes from being originally superimposed on the image 401*a* to being displayed in the entire region of the photographing preview interface 401.

It should be noted that all the interfaces shown in FIG. 6A-FIG. 8G are related interfaces existing when the electronic device is in a recording process. Actually, when the electronic device does not start recording, the electronic device may also identify the mid-air gesture of the user, and perform a corresponding operation. A principle thereof is similar to a principle in which the electronic device identifies the mid-air gesture and performs a corresponding operation during recording. Details are not described herein again.

The user may also control, by using a mid-air gesture, the electronic device to stop recording. The following describes, with reference to the accompanying drawings, a process in which the electronic device is switched from recording to stopping recording.

Figure 9A:
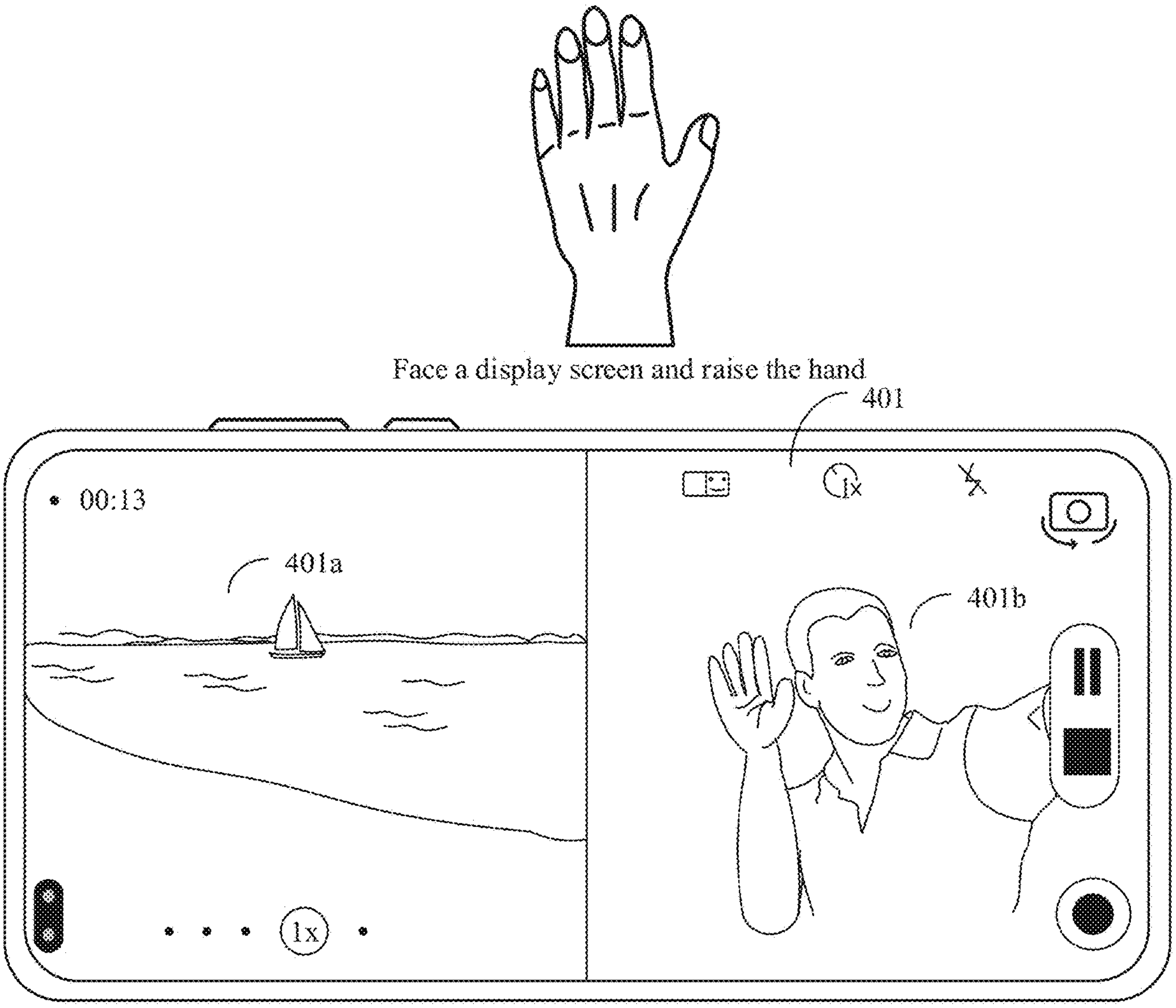
FIG. 9A-FIG. 9D are schematic diagrams of another group of interfaces according to an embodiment of this application.

FIG. 9A shows a photographing preview interface 401 existing when the electronic device is in the front-facing and rear-facing photographing mode. The photographing preview interface 401 is similar to the photographing preview interface 401 shown in FIG. 6A. Details are not described herein again.

Figure 9B:
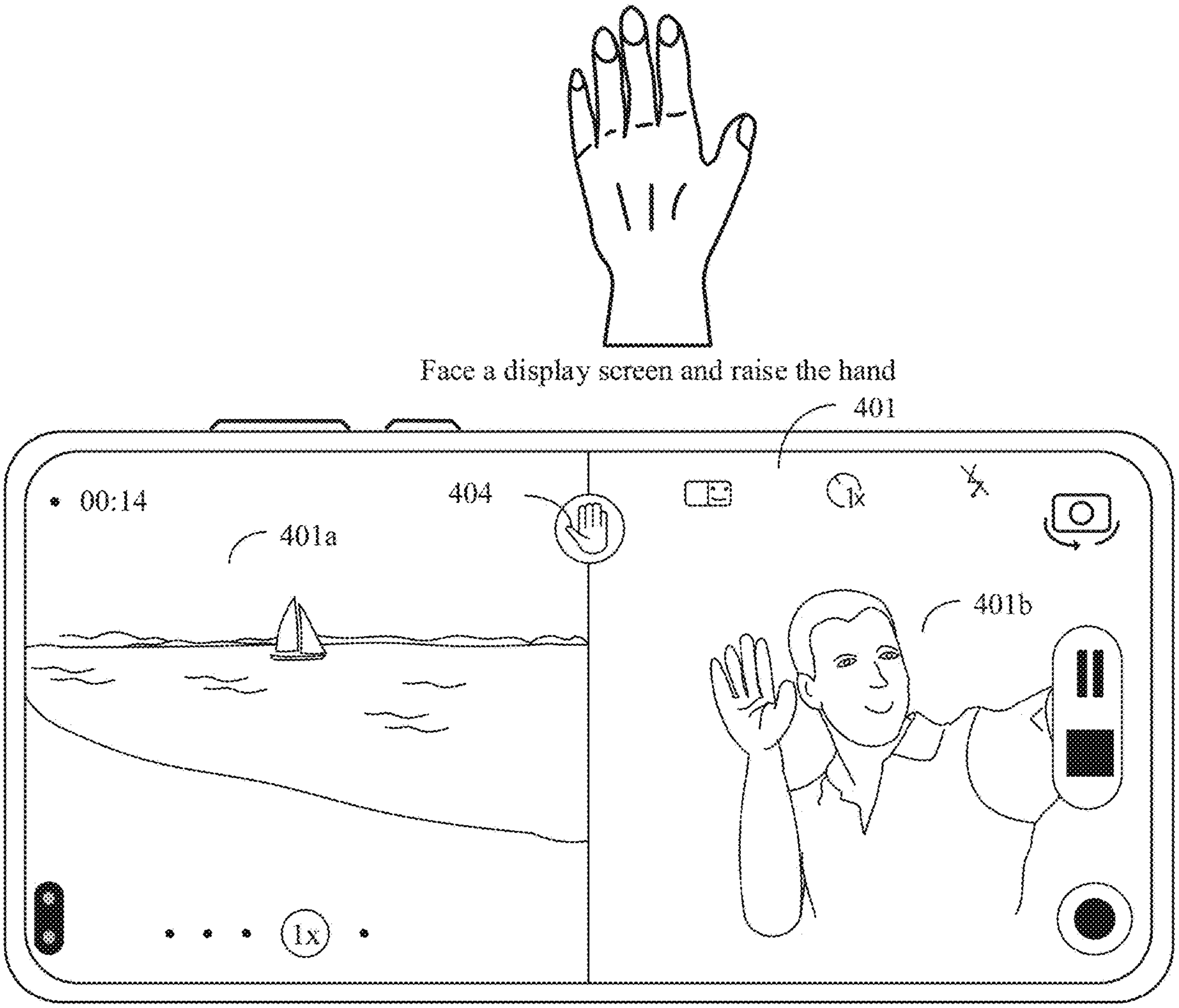

As shown in FIG. 9A, if the user wishes the electronic device to stopping recording, the user can first face the electronic device and enter a mid-air gesture, for example, enter a mid-air gesture of "raising the hand". The electronic device may collect, by using the front-facing camera, an image (that is, the image 401*b*) used to identify the mid-air gesture entered by the user, and display the image in the photographing preview interface 401. In addition, the electronic device may further perform analysis processing on the collected image 401*b*, and when identifying the mid-air gesture of "raising the hand", display the photographing preview interface 401 shown in FIG. 9B. The photographing preview interface 401 shown in FIG. 9B is similar to the photographing preview interface 401 shown in FIG. 9A. A difference lies in that the photographing preview interface 401 shown in FIG. 9B includes prompt information 401. For related descriptions of the prompt information 401, refer to the foregoing descriptions. Details are not described herein again.

Figure 9C:
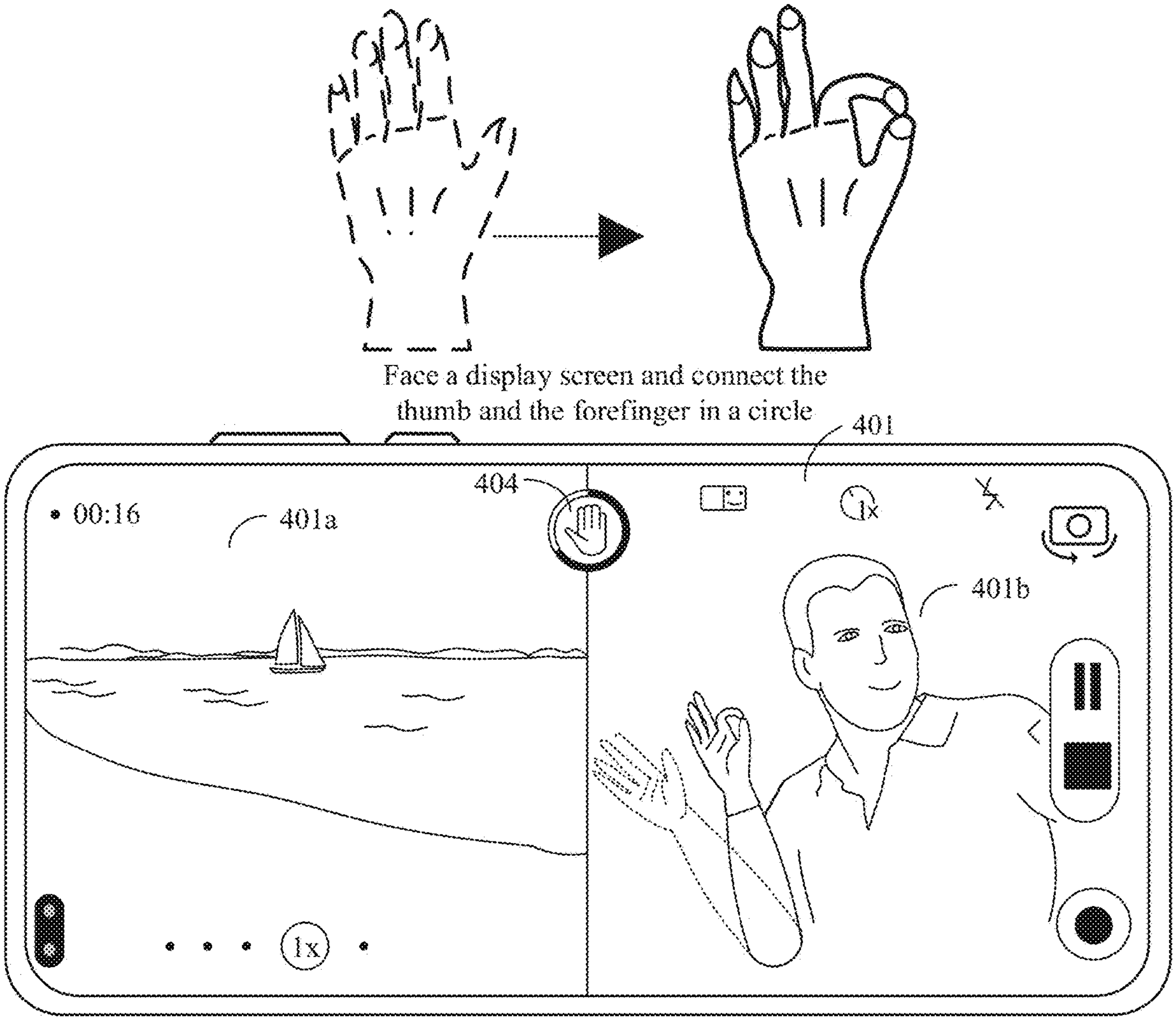
Figure 9D:
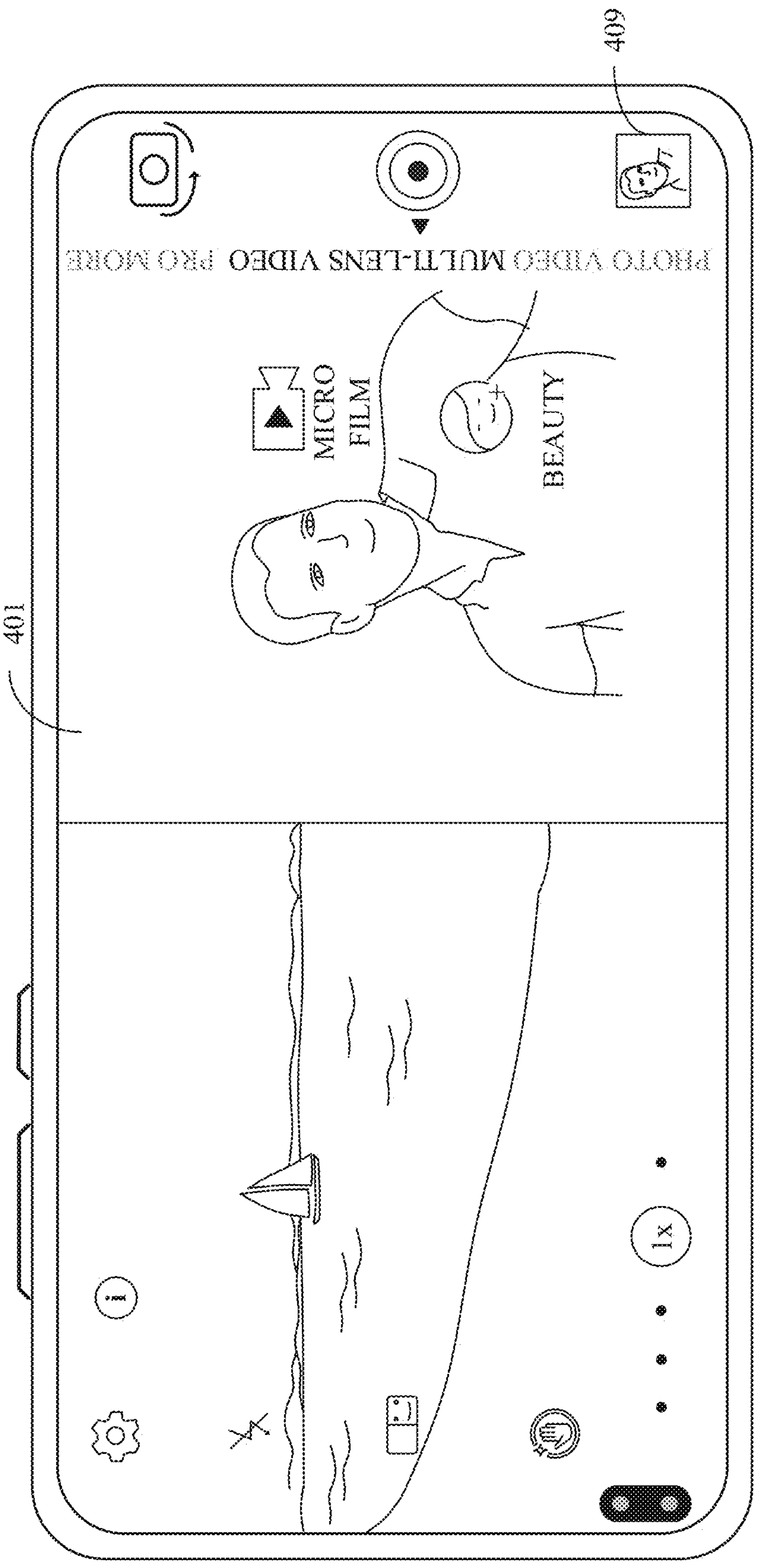

As shown in FIG. 9C, if the user wishes the electronic device to stop recording, when the electronic device displays the photographing preview interface 401 shown in FIG. 9B, the user can face the display screen and enter a mid-air gesture (which may also be referred to as an eighth gesture) of "connecting the thumb and the forefinger in a circle". In response to detecting the mid-air gesture of "connecting the thumb and the forefinger in a circle" of the user, the electronic device may stop recording, and display the photographing preview interface 401 shown in FIG. 9D. The photographing preview interface 401 may include a recently recorded video file 409.

It should be noted that the mid-air gesture of "connecting the thumb and the forefinger in a circle" may also be another mid-air gesture such as a mid-air gesture of "thumbing up" or a mid-air gesture of "winning a victory". In addition, in a design, the mid-air gesture used to control the electronic device to stop recording may be the same as a mid-air gesture used to control the electronic device to start recording. Therefore, if the electronic device detects the mid-air gesture in a state in which recording is not performed, recording can be started; or if the electronic device detects the mid-air gesture in a recording state, recording can be stopped.

It can be learned that a process of controlling the electronic device by using the mid-air gesture can be divided into two phases: In a first phase, the first gesture is entered, so that the electronic device enters the "ready" state; and in a second phase, a mid-air gesture that can be identified by the electronic device is entered within the preset time, so that the electronic device switches the photographing mode or starts/stops recording. The method can reduce a risk of a misoperation caused because the electronic device mistakenly determines a gesture of the user, can improve control accuracy, and increase human-computer interaction efficiency.

It can be understood that the foregoing content is related descriptions based on the photographing scenario in which the electronic device is horizontally placed. The following describes, with reference to the accompanying drawings, a method in which the user controls the electronic device by using the mid-air gesture when the electronic device is vertically placed.

When the electronic device is vertically placed, the electronic device may also be switched from the front-facing and rear-facing photographing mode to another photographing mode, switched from the front-facing photographing mode to another photographing mode, or switched from the picture-in-picture mode to another mode, or the electronic device is controlled, by using the mid-air gesture, to start recording or stop recording. A principle thereof is similar to the principle existing when the electronic device is horizontally placed. A difference is as follows: When the electronic device is horizontally placed, the user can switch the photographing mode of the electronic device by using the mid-air gesture of "moving the palm from left to right" or "moving the palm from right to left"; and when the electronic device is vertically placed, the electronic device can switch the photographing mode of the electronic device by using a mid-air gesture of "moving the palm from top to bottom" or "moving the palm from bottom to top".

The following describes, by using an example in which the electronic device is in the front-facing and rear-facing photographing mode, a related interface existing when the electronic device is switched from the front-facing and rear-facing photographing mode to another photographing mode when the electronic device is vertically placed.

Figure 10A:
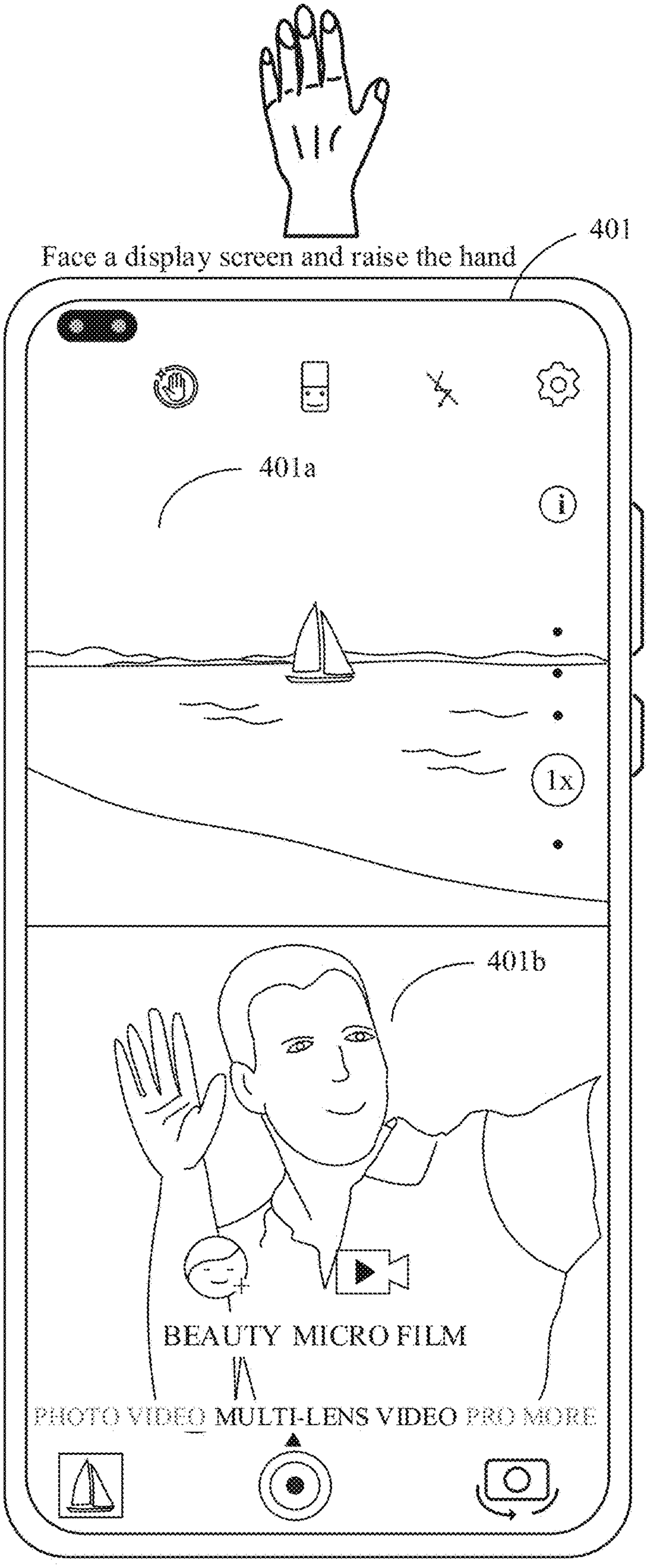
FIG. 10A-FIG. 10D are schematic diagrams of another group of interfaces according to an embodiment of this application.

As shown in FIG. 10A, the electronic device may display the photographing preview interface 401 existing when the electronic device is vertically placed and is in the front-facing and rear-facing photographing mode. The photographing preview interface 401 may include an image 401*a* photographed by the rear-facing camera and an image 401*b* photographed by the front-facing camera, and the image 401*a* and the image 401*b* are spliced up and down because the electronic device is vertically placed.

Figure 10B:
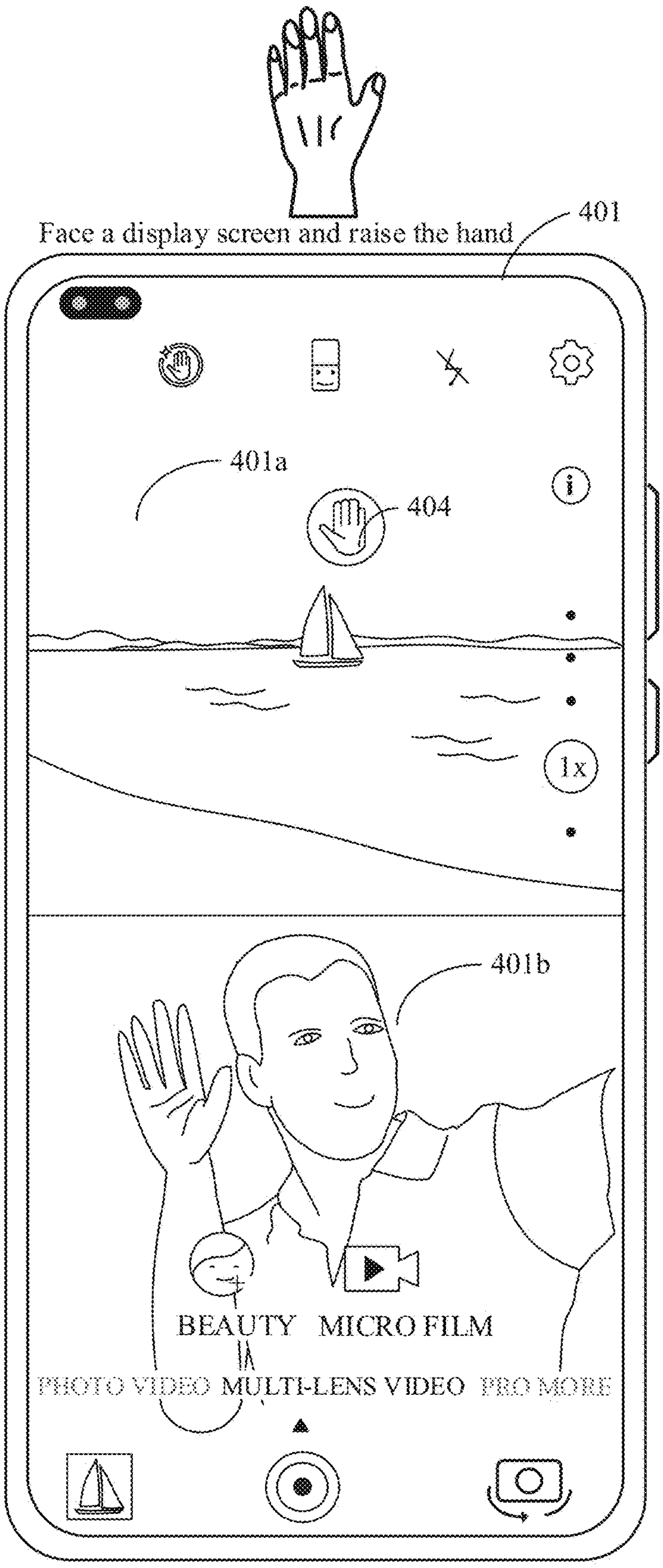

If the user wishes to switch the photographing mode of the electronic device, the user first faces the electronic device and enters a mid-air gesture, for example, enter a mid-air gesture of "raising the hand". The front-facing camera of the electronic device may collect the mid-air gesture (that is, the image 401*b*) entered by the user, and display the gesture in the photographing preview interface 401. In addition, the electronic device may further perform analysis processing on the collected image 401*b*, and when identifying the mid-air gesture of "raising the hand", display the photographing preview interface 401 shown in FIG. 10B. The photographing preview interface 401 shown in FIG. 10B is similar to the photographing preview interface 401 shown in FIG. 10A. A difference lies in that the photographing preview interface 401 shown in FIG. 10B includes prompt information 404. For related descriptions of the prompt information 404, refer to the foregoing descriptions. Details are not described herein again.

Figure 10C:
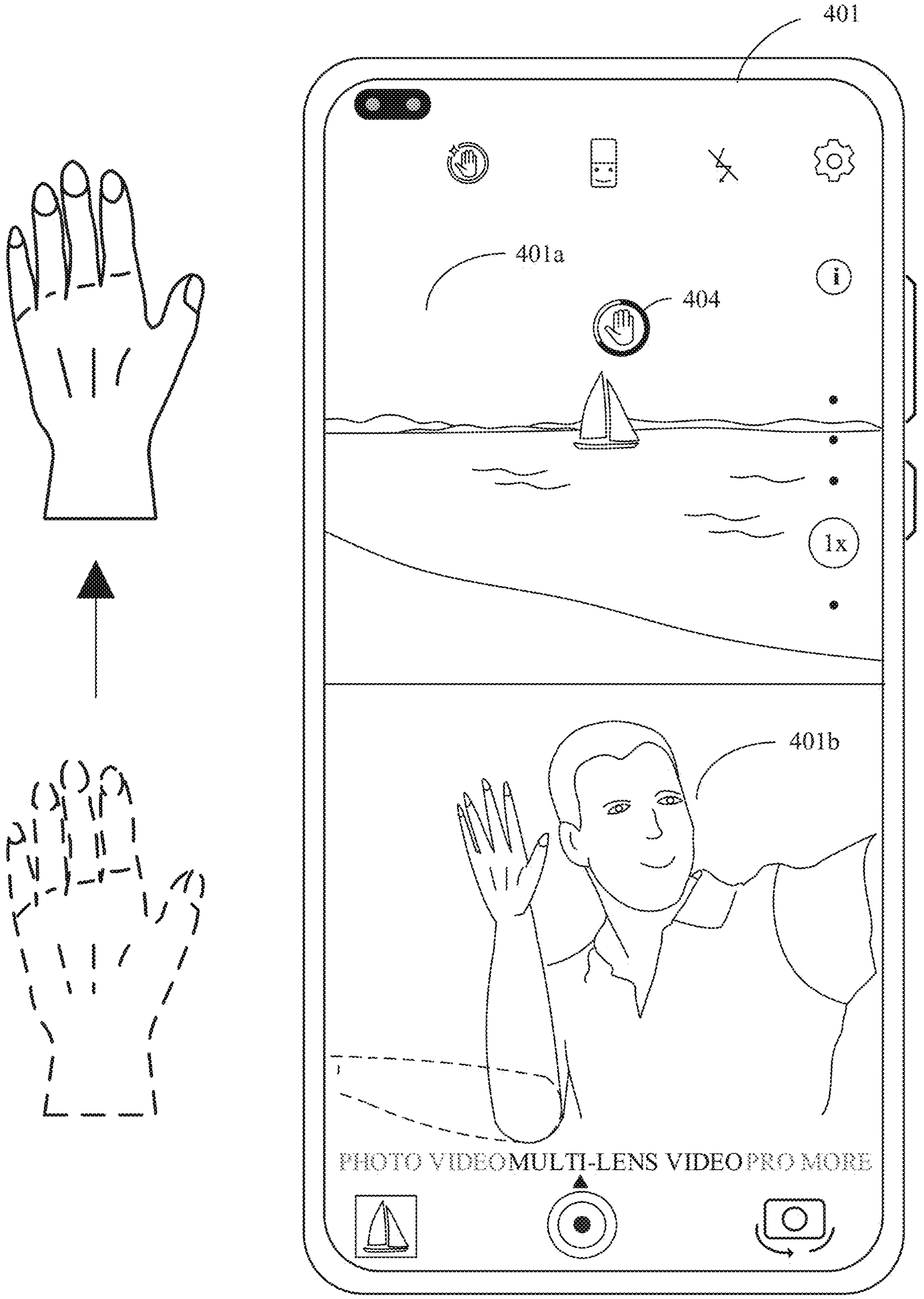
Figure 10D:
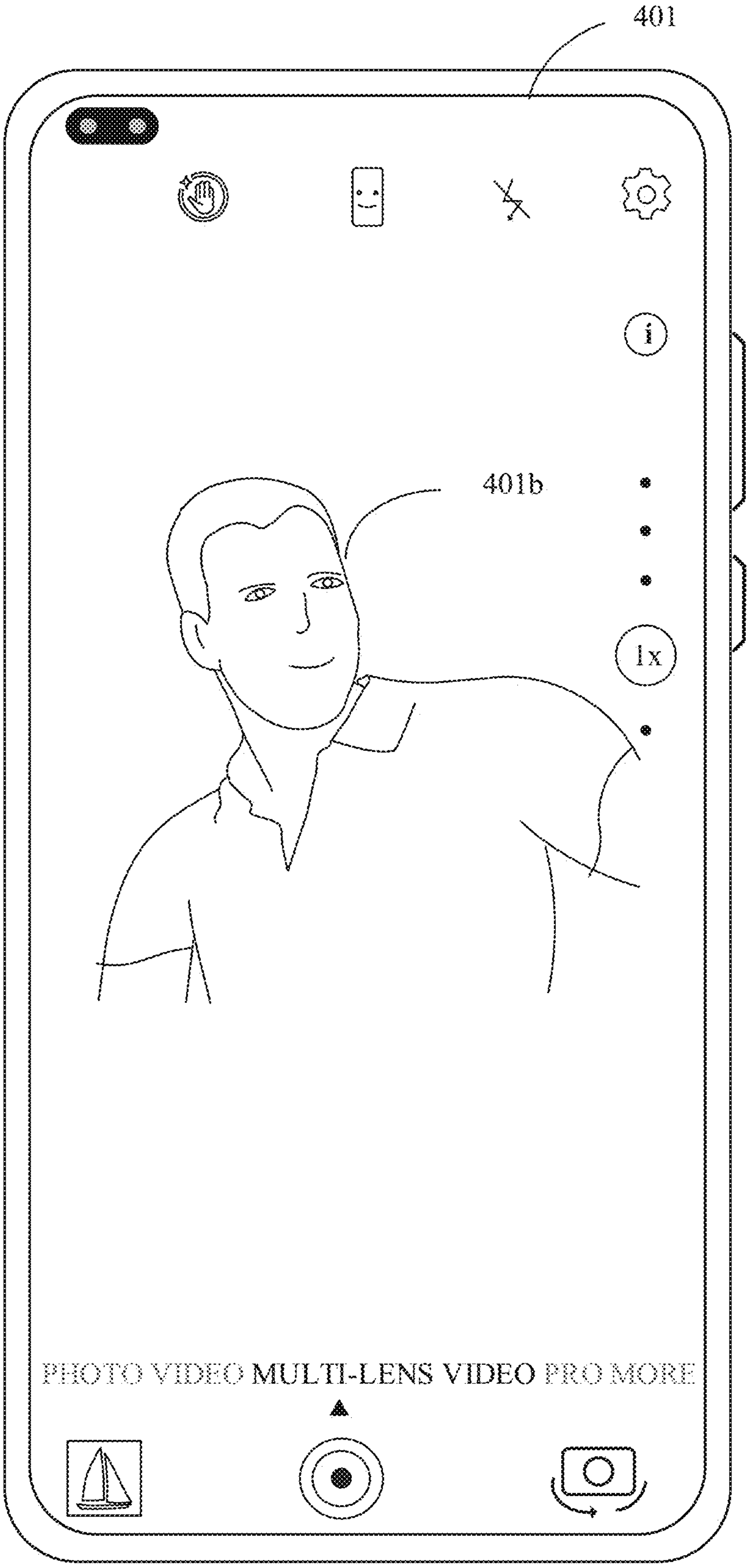

As shown in FIG. 10C, if the user wishes the electronic device to be switched from the front-facing and rear-facing photographing mode to the front-facing photographing mode, when the electronic device displays the photographing preview interface 401 shown in FIG. the user can face the display screen and enter a mid-air gesture of "moving the palm from bottom to top". In response to detecting the mid-air gesture of "moving the palm from bottom to top" entered by the user, the electronic device may switch the photographing mode from the front-facing and rear-facing photographing mode to the front-facing photographing mode, and display the photographing preview interface 401 shown in FIG. 10D. As shown in FIG. 10D, after the electronic device is switched to the front-facing photographing mode, the image 401*b* collected by the front-facing camera may be displayed in the photographing preview interface 401.

It should be noted that, based on the photographing preview interface 401 shown in FIG. 10B, when detecting a mid-air gesture of "moving the palm from top to bottom" entered by the user, the electronic device may display, in the photographing preview interface 401, the image 401*a* collected by the rear-facing camera.

Based on the photographing preview interface 401 shown in FIG. 10B, the electronic device may be switched from the front-facing and rear-facing photographing mode to the picture-in-picture photographing mode when detecting a mid-air gesture of "holding out the palm and then making a fist" entered by the user.

Based on the photographing preview interface 401 shown in FIG. 10B, the electronic device can switch display positions of the image 401*a* and the image 401*b* when detecting a mid-air gesture of "turning the palm over to the back of the hand" entered by the user. After the electronic device switches the display positions of the images, positions of the image 401*a* and the image 401*b* are interchanged, that is, the position of the image 401*a* changes from the original top of the screen to the bottom of the screen, and the position of the image 401*b* changes from the original bottom of the screen to the top of the screen.

It should be noted that a principle and content of switching between the photographing modes when the electronic device is vertically placed are similar to the principle and the content of switching between the photographing modes when the electronic device is horizontally placed, and details are not described herein again.

It can be learned from the foregoing photographing method that, the user can switch the photographing mode of the electronic device by using the mid-air gesture, so that the image displayed in the photographing preview interface can be switched between an image photographed by one camera and images photographed by a plurality of cameras, or display positions of a plurality of images displayed in the photographing preview interface can be switched. In particular, for a scenario in which one camera such as the front-facing camera is used for photographing, the user generally performs photographing by stretching the arm or using a selfie stick. In this case, if the user wants to switch the photographing mode or start/stop recording, after the photographing method provided in this embodiment of this application is implemented, the user does not need to repeatedly hold the electronic device close to the user and then touch the screen of the electronic device with a finger to adjust the photographing mode of the electronic device, so that the user can conveniently switch the photographing mode by using the mid-air gesture, to improve human-computer interaction efficiency.

Figure 11:
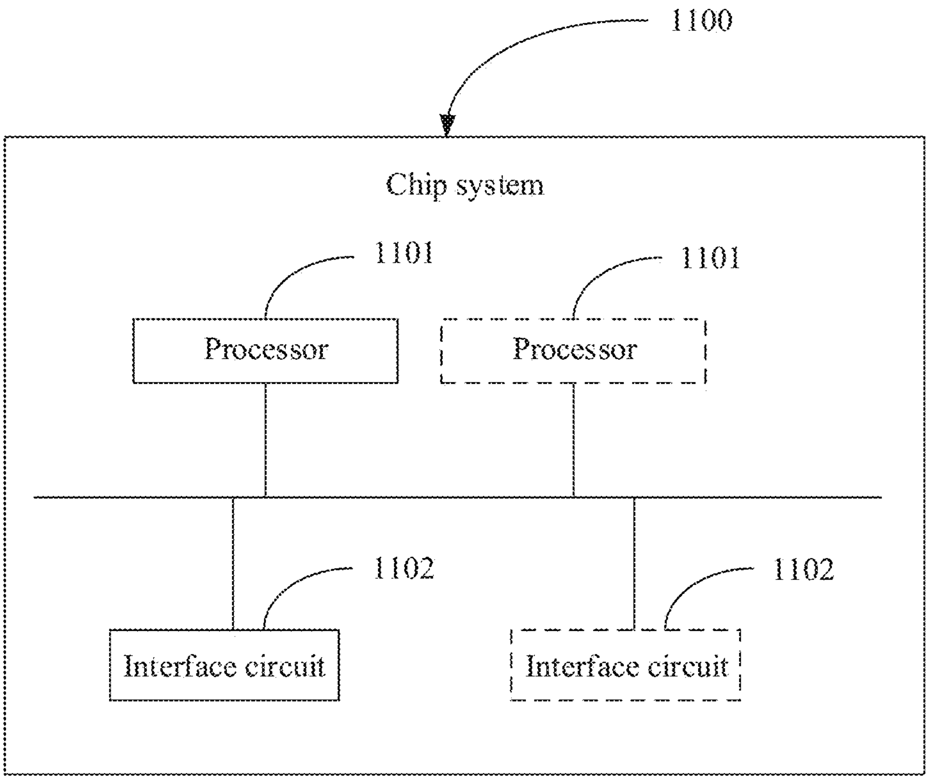
FIG. 11 is a schematic diagram of a structure of a chip system according to an embodiment of this application.

This application further provides a chip system 1100. As shown in FIG. 11, the chip system includes at least one processor 1101 and at least one interface circuit 1102. The processor 1101 and the interface circuit 1102 may be interconnected by using a line. For example, the interface circuit 1102 may be configured to receive a signal from another apparatus (such as a memory of an electronic device). For another example, the interface circuit 1102 may be configured to transmit a signal to another apparatus (such as the processor 1101).

For example, the interface circuit 1102 may read instructions stored in the memory of the electronic device, and send the instructions to the processor 1101. When the instructions are executed by the processor 1101, the electronic device may perform steps in the foregoing embodiments.

The foregoing descriptions of the implementations allow a person skilled in the art to clearly understand that, for the purpose of convenient and brief description, division of the foregoing functional modules is only used as an example for description. In actual application, the foregoing functions can be allocated to different functional modules and implemented as required, that is, an inner structure of an apparatus is divided into different functional modules to implement all or a part of the functions described above. For a specific working process of the system, apparatus, and unit described above, refer to a corresponding process in the foregoing method embodiments. Details are not described herein again.

In the embodiments of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, technical solutions of the embodiments of this application essentially, or a part contributing to the conventional technology, or all or a part of the technical solutions may be implemented in a form of a software product. The computer software product is stored in a storage medium, and includes several instructions for instructing a computer device (which may be a personal computer, a server, or a network device) or a processor to perform all or a part of the steps of the methods described in the embodiments of this application. The foregoing storage medium includes any medium that can store program code, for example, a flash memory, a removable hard disk drive, a read-only memory, a random access memory, a magnetic disk, or an optical disc.

The foregoing descriptions are merely specific implementations of the embodiments of this application, but are not intended to limit the protection scope of the embodiments of this application. Any change or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A photographing method, comprising:

displaying, by an electronic device, a photographing preview interface, wherein the electronic device comprises a display screen, a first camera, and a second camera, wherein the first camera and the second camera are located on different sides of the display screen, wherein the first camera and the display screen are located on a same side of the electronic device, wherein a first region of the photographing preview interface displays a first image collected by the first camera in real time, and wherein a second region of the photographing preview interface displays a second image collected by the second camera in real time;

in response to the first camera detecting a first mid-air gesture, entering, by the electronic device, a ready state in which the electronic device is ready to capture a subsequently detected mid-air gesture, and displaying, by the electronic device, a first identifier in the photographing preview interface; and based on the first camera detecting completion of a second mid-air gesture within a preset time after the first identifier is displayed, continuing, by the electronic device, to display the first image in the photographing preview interface and stopping, by the electronic device, displaying the second image;

wherein the stopping displaying the second image comprises the second image gradually decreasing during performance of the second mid-air gesture until the second image disappears from the photographing preview interface based on the completion of the second mid-air gesture.

2. The photographing method according to claim 1, further comprising:

based on the first camera not detecting a preset gesture, stopping displaying, by the electronic device, the first identifier after the preset time after the first identifier is displayed and exiting the ready state, wherein the preset gesture comprises the first mid-air gesture and the second mid-air gesture.

3. The photographing method according to claim 1, further comprising:

based on the first camera detecting a preset gesture within the preset time after the first identifier is displayed, stopping displaying, by the electronic device, the first identifier, wherein the preset gesture comprises the first mid-air gesture and the second mid-air gesture.

4. The photographing method according to claim 1, wherein the displaying, by the electronic device, the first identifier in the photographing preview interface comprises:

when displaying the first identifier in the photographing preview interface, detecting, by the electronic device, a preset gesture by using the first camera.

5. The photographing method according to claim 1, wherein the continuing, by the electronic device, to display the first image in the photographing preview interface comprises:

continuing, by the electronic device, to display the first image in a third region of the photographing preview interface, wherein the third region comprises the first region and the second region, and the first region and the second region do not overlap.

6. The photographing method according to claim 5, further comprising:

based on the first camera detecting a third gesture within the preset time after the first identifier is displayed, displaying, by the electronic device, the first image in a fourth region of the photographing preview interface, and displaying the second image in a fifth region of the photographing preview interface, wherein the fourth region is located in the fifth region, and the fifth region comprises the first region and the second region.

7. The photographing method according to claim 1, wherein the continuing, by the electronic device, to display the first image in the photographing preview interface comprises:

continuing, by the electronic device, to display the first image in a third region of the photographing preview interface, wherein the second region is located above the first region, and the third region is the same as the first region.

8. The photographing method according to claim 7, further comprising:

based on the first camera detecting a fourth gesture within the preset time after the first identifier is displayed, displaying, by the electronic device, the first image in a fourth region of the photographing preview interface, and displaying the second image in a fifth region of the photographing preview interface, wherein the fourth region and the fifth region do not overlap.

9. The photographing method according to claim 1, further comprising:

based on the first camera detecting a fifth gesture within the preset time after the first identifier is displayed, switching, by the electronic device, the first image displayed in the first region to the second image, and switching the second image displayed in the second region to the first image.

10. The photographing method according to claim 1, further comprising:

in response to the first camera detecting the first mid-air gesture again, redisplaying, by the electronic device, the first identifier in the photographing preview interface; and based on the first camera detecting a sixth gesture within the preset time after the first identifier is redisplayed, redisplaying, by the electronic device, the first image in the first region of the photographing preview interface, and redisplaying the second image in the second region of the photographing preview interface.

11. The photographing method according to claim 1, further comprising:

in response to the first camera detecting the first mid-air gesture again, redisplaying, by the electronic device, the first identifier in the photographing preview interface; and based on the first camera detecting the fifth gesture within the preset time after the first identifier is redisplayed, switching, by the electronic device, the first image displayed in the photographing preview interface to the second image.

12. The photographing method according to claim 1, wherein based on the electronic device not starting recording a video, the method further comprises:

in response to the first camera detecting the first mid-air gesture again, redisplaying, by the electronic device, the first identifier in the photographing preview interface; and based on the first camera detecting a seventh gesture within the preset time after the first identifier is redisplayed, starting recording, by the electronic device, a video.

13. The photographing method according to claim 12, wherein the starting recording, by the electronic device, the video comprises:

displaying, by the electronic device, a countdown in the photographing preview interface; and after the countdown ends, starting recording, by the electronic device, the video.

14. The photographing method according to claim 1, wherein based on the electronic device recording a video, the method further comprises:

in response to the first camera detecting the first mid-air gesture again, redisplaying, by the electronic device, the first identifier in the photographing preview interface; and based on the first camera detecting an eighth gesture within the preset time after the first identifier is redisplayed, stopping recording, by the electronic device, the video.

15. The photographing method according to claim 1, wherein the electronic device does not start recording a video or is recording a video.

16. An electronic device, comprising:

a display screen;

a first camera;

a second camera;

a processor; and a memory, wherein the processor is coupled to the memory, the memory stores program instructions, and when the program instructions stored in the memory are executed by the processor, the electronic device is configured to perform operations comprising:

displaying a photographing preview interface, wherein a first region of the photographing preview interface displays a first image collected by the first camera in real time, and wherein a second region of the photographing preview interface displays a second image collected by the second camera in real time;

in response to the first camera detecting a first mid-air gesture, entering a ready state in which the electronic device is ready to capture a subsequently detected mid-air gesture, and displaying a first identifier in the photographing preview interface; and based on the first camera detecting completion of a second mid-air gesture within a preset time after the first identifier is displayed, continuing to display the first image in the photographing preview interface and stopping displaying the second image;

wherein the stopping displaying the second image comprises the second image gradually decreasing during performance of the second mid-air gesture until the second image disappears from the photographing preview interface based on the completion of the second mid-air gesture.

17. A non-transitory computer-readable storage medium storing computer instructions, wherein when the computer instructions are run on an electronic device, the electronic device performs:

displaying a photographing preview interface, wherein a first region of the photographing preview interface displays a first image collected by the first camera in real time, and wherein a second region of the photographing preview interface displays a second image collected by the second camera in real time;

in response to the first camera detecting a first mid-air gesture, entering a ready state in which the electronic device is ready to capture a subsequently detected mid-air gesture, and displaying a first identifier in the photographing preview interface; and based on the first camera detecting completion of a second mid-air gesture within a preset time after the first identifier is displayed, continuing to display the first image in the photographing preview interface and stopping displaying the second image;

wherein the stopping displaying the second image comprises the second image gradually decreasing during performance of the second mid-air gesture until the second image disappears from the photographing preview interface based on the completion of the second mid-air gesture.

* * * * *